US010733164B2

United States Patent
Hopcroft et al.

(10) Patent No.: US 10,733,164 B2
(45) Date of Patent: Aug. 4, 2020

(54) UPDATING A BIT VECTOR SEARCH INDEX

(71) Applicant: MICROSOFT TECHNOLOGY LICENSING, LLC, Redmond, WA (US)

(72) Inventors: Michael Joseph Hopcroft, Kirkland, WA (US); Robert Lovejoy Goodwin, Mercer Island, WA (US); Fan Wang, Redmond, WA (US); Andrija Antonijevic, Bellevue, WA (US); Denis V. Deyneko, Richmond (CA); Utkarsh Jain, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 991 days.

(21) Appl. No.: 15/186,219

(22) Filed: Jun. 17, 2016

(65) Prior Publication Data

US 2016/0378808 A1    Dec. 29, 2016

Related U.S. Application Data

(60) Provisional application No. 62/183,556, filed on Jun. 23, 2015.

(51) Int. Cl.
  *G06F 16/22* (2019.01)
  *G06F 16/93* (2019.01)
  (Continued)

(52) U.S. Cl.
  CPC ...... *G06F 16/2237* (2019.01); *G06F 16/2272* (2019.01); *G06F 16/2282* (2019.01);
  (Continued)

(58) Field of Classification Search
  CPC .................................................. G06F 16/2237
  (Continued)

(56) References Cited

U.S. PATENT DOCUMENTS

| 4,817,036 A | 3/1989 | Millett et al. |
| 5,649,181 A | 7/1997 | French et al. |

(Continued)

FOREIGN PATENT DOCUMENTS

| EP | 157771 A2 | 7/2005 |
| WO | 3001720 A2 | 1/2003 |
| WO | 2011035389 A1 | 3/2011 |

OTHER PUBLICATIONS

Risvik, et al., "Maguro, a System for Indexing and Searching Over Very Large Text Collections", In Proceedings of the Sixth ACM International Conference on Web Search and Data Mining, Feb. 4, 2013, 10 pages.

(Continued)

*Primary Examiner* — Kimberly L Wilson
(74) *Attorney, Agent, or Firm* — Shook, Hardy & Bacon LLP

(57) ABSTRACT

The technology described herein provides for indexing information in a bit vector search index. The bit vector search index comprises a data structure for indexing data about terms from a corpus of documents. The data structure includes a number of bit vectors. Each bit vector comprises an array of bits and corresponds to a different set of terms. Bits in the bit vector are used to represent whether at least one document corresponding to the bit includes at least one term from the set of terms corresponding to the bit vector. The bit vector search index is stored by first indexing information about documents using bit vectors on a first (Continued)

accumulation buffer storage device. When a threshold is satisfied, the information is transferred to bit vectors on a subsequent storage device.

20 Claims, 34 Drawing Sheets

(51) Int. Cl.
    G06F 16/33        (2019.01)
    G06F 16/2453     (2019.01)
    G06F 16/31        (2019.01)

(52) U.S. Cl.
    CPC ...... *G06F 16/24542* (2019.01); *G06F 16/328* (2019.01); *G06F 16/334* (2019.01); *G06F 16/93* (2019.01)

(58) Field of Classification Search
    USPC ......................................................... 707/745
    See application file for complete search history.

(56) References Cited

U.S. PATENT DOCUMENTS

| | | |
|---|---|---|
| 5,701,469 A | 12/1997 | Brandli et al. |
| 5,752,051 A | 5/1998 | Cohen |
| 5,963,935 A | 10/1999 | Ozbutun et al. |
| 6,128,613 A | 10/2000 | Wong et al. |
| 6,141,656 A | 10/2000 | Ozbutun et al. |
| 6,216,125 B1 | 4/2001 | Johnson |
| 6,282,540 B1 | 8/2001 | Goldensher et al. |
| 6,341,281 B1 | 1/2002 | MacNicol et al. |
| 6,353,825 B1 | 3/2002 | Ponte |
| 6,480,835 B1 | 11/2002 | Light |
| 6,523,026 B1 | 2/2003 | Gillis |
| 6,578,040 B1 | 6/2003 | Syeda-Mahmood |
| 6,654,742 B1 | 11/2003 | Kobayashi et al. |
| 6,675,159 B1 | 1/2004 | Lin et al. |
| 6,785,677 B1 | 8/2004 | Fritchman |
| 6,847,966 B1 | 1/2005 | Sommer et al. |
| 6,879,976 B1 | 4/2005 | Brookler et al. |
| 6,941,315 B2 | 9/2005 | Goldstein et al. |
| 7,174,346 B1 | 2/2007 | Gharachorloo et al. |
| 7,212,531 B1 | 5/2007 | Kopelman et al. |
| 7,293,016 B1 | 11/2007 | Shakib et al. |
| 7,328,204 B2 | 2/2008 | Coady |
| 7,426,507 B1 | 9/2008 | Patterson |
| 7,440,968 B1 | 10/2008 | Oztekin et al. |
| 7,536,408 B2 | 5/2009 | Patterson |
| 7,702,614 B1 | 4/2010 | Shah et al. |
| 7,739,277 B2 | 6/2010 | Meyerzon et al. |
| RE41,523 E * | 8/2010 | Retika ....................... G06F 3/14 |
| | | 345/558 |
| 7,818,316 B2 | 10/2010 | Moore et al. |
| 7,917,480 B2 | 3/2011 | Dean et al. |
| 7,966,327 B2 | 6/2011 | Li et al. |
| 8,046,370 B2 | 10/2011 | Wen et al. |
| 8,051,080 B2 | 11/2011 | Kraft et al. |
| 8,090,723 B2 | 1/2012 | Cao et al. |
| 8,176,052 B2 | 5/2012 | Inouye et al. |
| 8,527,496 B2 | 9/2013 | Wable et al. |
| 8,533,206 B1 | 9/2013 | Guha et al. |
| 8,560,550 B2 | 10/2013 | Patterson |
| 8,620,900 B2 | 12/2013 | Luk |
| 8,620,907 B2 | 12/2013 | Risvik et al. |
| 8,650,171 B2 | 2/2014 | Sacco |
| 8,682,901 B1 | 3/2014 | Cao et al. |
| 8,713,024 B2 | 4/2014 | Risvik et al. |
| 8,738,595 B2 | 5/2014 | Pfeifle |
| 8,799,264 B2 | 8/2014 | Gehrke et al. |
| 8,914,338 B1 | 12/2014 | Wallace et al. |
| 9,122,741 B1 * | 9/2015 | McAlister ........... G06F 16/2228 |
| 9,396,254 B1 | 7/2016 | Forman |
| 9,875,192 B1 * | 1/2018 | Allen ..................... G06F 16/128 |
| 9,971,771 B2 | 5/2018 | Ryger et al. |
| 2002/0095397 A1 | 7/2002 | Koskas |
| 2002/0169764 A1 | 11/2002 | Kincaid et al. |
| 2003/0135495 A1 | 7/2003 | Vagnozzi |
| 2004/0024778 A1 | 2/2004 | Cheo |
| 2004/0225865 A1 * | 11/2004 | Cox .................... G06F 16/2455 |
| | | 712/34 |
| 2005/0004943 A1 | 1/2005 | Chang |
| 2005/0086234 A1 | 4/2005 | Tosey |
| 2005/0138000 A1 | 6/2005 | Roux et al. |
| 2005/0144162 A1 | 6/2005 | Liang |
| 2005/0198076 A1 | 9/2005 | Stata et al. |
| 2005/0262062 A1 | 11/2005 | Xia |
| 2006/0020607 A1 | 1/2006 | Patterson |
| 2006/0026190 A1 | 2/2006 | Fortnan et al. |
| 2006/0047636 A1 | 3/2006 | Mohania et al. |
| 2006/0101060 A1 | 5/2006 | Li et al. |
| 2006/0117002 A1 | 6/2006 | Swen |
| 2006/0143171 A1 | 6/2006 | Doerre et al. |
| 2007/0016602 A1 * | 1/2007 | McCool ................ G06F 16/335 |
| 2007/0050381 A1 | 3/2007 | Hu et al. |
| 2007/0078849 A1 | 4/2007 | Slothouber |
| 2008/0059187 A1 | 3/2008 | Roitblat et al. |
| 2008/0071739 A1 | 3/2008 | Kumar et al. |
| 2008/0109395 A1 | 5/2008 | Loeb |
| 2008/0140616 A1 | 6/2008 | Encina et al. |
| 2008/0154879 A1 | 6/2008 | Lin |
| 2008/0177734 A1 | 7/2008 | Schwenke et al. |
| 2008/0270374 A1 | 10/2008 | Li et al. |
| 2009/0012956 A1 | 1/2009 | Wen et al. |
| 2009/0037390 A1 | 2/2009 | Handley |
| 2009/0070312 A1 | 3/2009 | Patterson |
| 2009/0193406 A1 | 7/2009 | Williams |
| 2009/0313202 A1 | 12/2009 | Grabarnik et al. |
| 2010/0161623 A1 | 6/2010 | Torbjornsen |
| 2010/0169343 A1 | 7/2010 | Kenedy et al. |
| 2010/0299316 A1 | 11/2010 | Faerber et al. |
| 2010/0299367 A1 | 11/2010 | Chakrabarti et al. |
| 2011/0040742 A1 | 2/2011 | Moore et al. |
| 2011/0075734 A1 * | 3/2011 | Sakazume .............. H04N 19/70 |
| | | 375/240.12 |
| 2011/0123021 A1 | 5/2011 | Tepper |
| 2011/0218989 A1 | 9/2011 | Luo |
| 2011/0295845 A1 | 12/2011 | Gao et al. |
| 2011/0295850 A1 | 12/2011 | Tankovich et al. |
| 2011/0313980 A1 | 12/2011 | Faerber et al. |
| 2012/0130981 A1 | 5/2012 | Risvik et al. |
| 2012/0130997 A1 | 5/2012 | Risvik et al. |
| 2012/0173510 A1 | 7/2012 | Risvik et al. |
| 2012/0179712 A1 | 7/2012 | Bestgen et al. |
| 2012/0303633 A1 | 11/2012 | He et al. |
| 2012/0310874 A1 | 12/2012 | Dantressangle et al. |
| 2013/0132398 A1 * | 5/2013 | Pfeifle ..................... G06F 16/29 |
| | | 707/745 |
| 2013/0138629 A1 | 5/2013 | Rehmattullah |
| 2013/0262485 A1 | 10/2013 | Li et al. |
| 2014/0032564 A1 | 1/2014 | Sankar et al. |
| 2014/0032567 A1 | 1/2014 | Assadollahi et al. |
| 2014/0046921 A1 | 2/2014 | Bau |
| 2014/0114927 A1 | 4/2014 | Anderson |
| 2014/0181052 A1 | 6/2014 | Moore et al. |
| 2014/0250141 A1 | 9/2014 | Pfeifle |
| 2015/0154497 A1 | 6/2015 | Braziunas et al. |
| 2015/0186471 A1 | 7/2015 | Yammahi et al. |
| 2015/0324373 A1 | 11/2015 | Tyercha et al. |
| 2015/0324399 A1 | 11/2015 | Tyercha et al. |
| 2016/0055248 A1 * | 2/2016 | Goel ..................... G06F 17/277 |
| | | 707/770 |
| 2016/0210353 A1 | 7/2016 | Holmes et al. |
| 2019/0205305 A1 | 7/2019 | Hopcroft et al. |

OTHER PUBLICATIONS

Kane-Esrig, et al., "The Relevance Density Method in Information Retrieval", In Proceedings of Fourth International Conference on Computing and Information, May 28, 1992, 5 pages.

(56) References Cited

OTHER PUBLICATIONS

Kantor, et al., "Testing the Maximum Entropy Principle for Information Retrieval", In Journal of the American Society for Information Science, vol. 49, Issue 6, May 1, 1998, 10 pages.
Nair, et al., "A Unified Approach to Learning Task-Specific Bit Vector Representations for Fast Nearest Neighbor Search", In Proceedings of the 21st International Conference on World Wide Web, Apr. 16, 2012, 10 pages.
Jardak, et al., "Distributed Information Storage and Collection for WSNs", In Proceedings of IEEE Internatonal Conference on Mobile Adhoc and Sensor Systems, Oct. 8, 2007, 9 pages.
Judic, Liva, "Google Search Index Gets Caffeine Shot", Published on: Jun. 9, 2010 Available at: http://searchenginewatch.com/article/2050822/Google-Search-Index-Gets-Caffeine-Shot.
Goodwin, Danny, "Bing Unleashing Tiger to Speed Search Results", Published on: Sep. 30, 2011 Available at: http://searchenginewatch.com/article/2113363/Bing-Unleashing-Tiger-to-Speed-Search-.
Manmatha, et al. "Using Models of Score Distributions in Information Retrieval", In Proceedings of the 24th ACM SIGIR Conference on Research and Development in Information Retrieval, May 2001, 6 pages.
Kitto, et al., "A Quantum Information Retrieval Approach to Memory", In Proceedings of the International Joint Conference on Neural Networks, Jun. 10, 2012, 8 pages.
Goldstein, et al., "Redundant Bit Vectors for Quickly Searching High-Dimensional Regions", In Proceedings of the First international conference on Deterministic and Statistical Methods in Machine Learning, Sep. 7, 2004, 22 pages.
Yang, et al., "Parallel Intersecting Compressed Bit Vectors in a High Speed Query Server for Processing Postal Addresses", In Proceedings of Second International Symposium on High-Performance Computer Architecture, Feb. 3, 1996, 10 pages.
Vo, et al., "DBV-Miner: A Dynamic Bit-Vector Approach for fast Mining Frequent Closed Itemsets", In Proceedings of Expert Systems with Applications, vol. 39, Issue 8, Jun. 15, 2012, pp. 7196-7206.
Duan, et al., "BBHON: An Indexing Framework for Multi-dimensional Data Based on Bit Vector", In Journal of Computational Information Systems, vol. 9, Issue 24, Dec. 15, 2013, pp. 10141-10151.
Moffat, et al., "Hybrid Bitvector Index Compression", Published on: Dec. 2007, 7 pages.
Bast, et al., "IO-Top-k at TREC 2006: Terabyte Track", In Proceedings of the Fifteenth Text Retrieval Conference, Nov. 14, 2006, 5 pages.
MacDonald, et al., "About Learning Models with Multiple Query Dependent Features", In Journal of ACM Transactions on Information Systems, vol. 31, Issue 3, Jul. 2013, 43 pages.
Fagin, et al., "Searching the Workplace Web", In Proceedings of the 12th international conference on World Wide Web, May 20, 2003, 21 pages.
Ding, et al., "Faster Top-k Document Retrieval Using Block-Max Indexes", In Proceedings of the 34th International ACM SIGIR Conference on Research and Development in Information Retrieval, Jul. 24, 2011, 10 pages.
Qin, et al., "LETOR: A Benchmark Collection for Learning to Rank for Information Retrieval", In Proceedings of Information Retrieval, vol. 13, No. 4, Aug. 2010, 19 pages.
Kane, et al., "Distribution by Document Size", In Proceedings of 11th International Workshop on Large-Scale and Distributed Systems for Information Retrieval, Feb. 28, 2014, 6 pages.
Kulkarni, Anagha, "Efficient and Effective Large-scale Search", In Thesis, Aug. 19, 2014, 167 pages.
"Solr Sharding and Idf", Retrieved on: Aug. 19, 2014, Available at: http://qnalist.com/questions/624206/solr-sharding-and-idf.
Brown, Greg Ichneumon, "Scaling Elasticsearch Part 2: Indexing", Published on: Feb. 6, 2014, Available at: http://gibrown.wordpress.com/2014/02/06/scaling-elasticsearch-part-2-indexing/.

"Solr in AWS: Shards & Distributed Search", Published on: Jan. 12, 2013, Available at: http://pristinecrap.com/2013/01/12/solr-in-aws-shards-distributed-search/.
Anand, et al., "Temporal Index Sharding for Space-Time Efficiency in Archive Search", In Proceedings of the 34th International ACM SIGIR Conference on Research and Development in Information Retrieval, Jul. 25, 2011, 44 pages.
"Distributed Search for Solr", Published on: Feb. 27, 2008, Available at: https://yonik.wordpress.com/2008/02/27/distributed-search-for-solr/.
"How to Configure Number of Shards per Cluster in Elasticsearch", Published on: Aug. 18, 2014, Available at: http://stackoverflow.com/questions/23926644/how-to-configure-number-of-shards-per-cluster-in-elasticsearch.
Berglund, Per, "Shard Selection in Distributed Collaborative Search Engines", In Thesis in Computer Science, Jun. 2013.
Wang, et al., "Semplore: A scalable IR approach to search the Web of Data", In Proceedings of the Web Semantics: Science, Services and Agents on the World Wide Web, vol. 7, Issue 3, Sep. 2009, 12 pages.
Lempel, et al., "Just in Time Indexing for up to the Second Search", In Proceedings of the sixteenth ACM conference on Conference on information and knowledge management, Nov. 6, 2007, 10 pages.
"Non final office action issued in U.S. Appl. No. 15/186,201", dated Jun. 29, 2018, 18 Pages.
"Non Final Office Action issued in U.S. Appl. No. 15/186,223", dated May 31, 2018, 25 Pages.
"Non Final Office Action issued in U.S. Appl. No. 15/186,226", dated Apr. 16, 2018, 8 Pages.
"Non Final Office Action Issued in U.S. Appl. No. 15/186,223", dated Mar. 21, 2019, 18 Pages.
Second Written Opinion Issued in PCT Application No. PCT/US2016/038761, dated May 15, 2017, 10 Pages.
Second Written Opinion Issued in PCT Application No. PCT/US2016/038751, dated May 19, 2017, 12 Pages.
"Second Written Opinion Issued in PCT Application No. PCT/US2016/038773", dated May 24, 2017, 11 Pages.
Second Written Opinion Issued in PCT Application No. PCT/US2016/038724, dated Jun. 13, 2017, 12 Pages.
Second Written Opinion Issued in PCT Application No. PCT/US2016/038782, dated Jun. 28, 2017, 10 Pages.
"Second Written Opinion Issued in PCT Application No. PCT/US2016/038777", dated May 31, 2017, 8 Pages.
"Non Final Office Action Issued in U.S. Appl. No. 15/186,204", dated Oct. 5, 2018, 17 Pages.
"Notice of Allowance Issued in U.S. Appl. No. 15/186,210", dated Oct. 24, 2018, 9 Pages.
"Final Office Action Issued in U.S. Appl. No. 15/186,223", dated Nov. 8, 2018, 29 Pages.
"Non Final Office Action Issued in U.S. Appl. No. 15/186,199", dated Jan. 25, 2019, 21 Pages.
International Preliminary Report on Patentability Issued in PCT Application No. PCT/US2016/038724, dated Sep. 6, 2017, 13 Pages.
International Preliminary Report on Patentability Issued in PCT Application No. PCT/US2016/038751, dated Sep. 6, 2017, 13 Pages.
International Preliminary Report on Patentability Issued in PCT Application No. PCT/US2016/038773, dated Sep. 6, 2017, 10 Pages.
International Preliminary Report on Patentability Issued in PCT Application No. PCT/US2016/038782, dated Sep. 18, 2017, 12 Pages.
International Preliminary Report on Patentability Issued in PCT Application No. PCT/US2016/038777, dated Sep. 6, 2017, 9 Pages.
International Preliminary Report on Patentability Issued in PCT Application No. PCT/US2016/038761, dated Sep. 6, 2017, 11 Pages.
International Search Report Issued in PCT Application No. PCT/US2016/038777, dated Oct. 26, 2016, 15 Pages.
Classification Searching with Keywords, Retrieved from <<http://help.acclaimip.com/m/acclaimip_help/l/182468-classification-searching-with-keywords>> Oct. 7, 2016, 5 Pages.

(56) References Cited

OTHER PUBLICATIONS

Classification Searching with Keywords, Retrieved from <<http://web.archive.org/web/20150305025721/http://help.acclaimip.com/m/acclaimip_help/l/182468-classification-searching-with-keywords>> Mar. 5, 2015, 8 Pages.
International Search Report and Written Opinion Issued in PCT Application No. PCT/US2016/038767, dated Oct. 26, 2016, 12 Pages.
Berry, et al., "Matrices, Vector Spaces, and Information Retrieval", In the proceeding of SIAM review, vol. 41. No. 2, Jan. 1, 1999, pp. 335-362.
International Search Report and Written Opinion Issued in PCT Application No. PCT/US2016/038751, dated Oct. 26, 2016, 14 Pages.
International Search Report and Written Opinion Issued in PCT Application No. PCT/US2016/038761, dated Oct. 26, 2016, 14 Pages.
International Search Report and Written Opinion Issued in PCT Application No. PCT/US2016/038725, dated Oct. 26, 2016, 13 Pages.
International Search Report and Written Opinion Issued in PCT Application No. PCT/US2016/038724, dated Oct. 26, 2016, 14 Pages.
"Final Office Action Issued in U.S. Appl. No. 15/186,199", dated May 15, 2019, 28 Pages.
"Final Office Action Issued in U.S. Appl. No. 15/186,204", dated May 20, 2019, 17 Pages.
"International Search Report and Written Opinion Issued in PCT Application No. PCT/US2016/038773", dated Jan. 26, 2017, 20 Pages.
"International Search Report and Written Opinion Issued in PCT Application No. PCT/US2016/038764", dated Jan. 26, 2017, 22 Pages.
"International Search Report and Written Opinion Issued in PCT Application No. PCT/US2016/038782", dated Jan. 26, 2017, 21 Pages.
"Final Office Action Issued in U.S. Appl. No. 15/186,201", dated Jan. 10, 2019, 20 Pages.
"Notice of Allowance Issued in U.S. Appl. No. 15/186,213", dated Oct. 15, 2019, 10 Pages.
"Final Office Action Issued in U.S. Appl. No. 15/186,223", dated Jul. 17, 2019, 22 Pages.
"Non Final Office Action Issued in U.S. Appl. No. 15/186,204", dated Jan. 9, 2020, 17 Pages.
"Non-Final Office Action Issued in U.S. Appl. No. 15/186,196", dated Apr. 13, 2020, 16 Pages.

\* cited by examiner

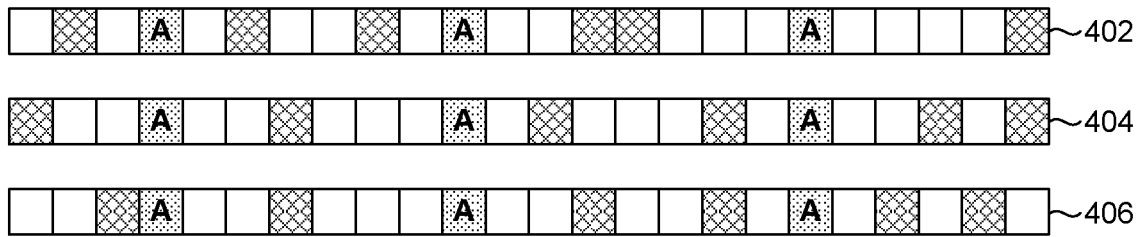
FIG. 4A
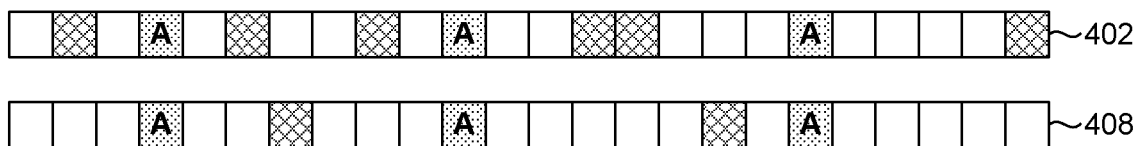
FIG. 4B
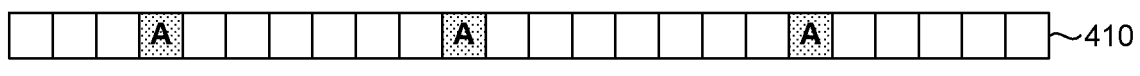
FIG. 4C
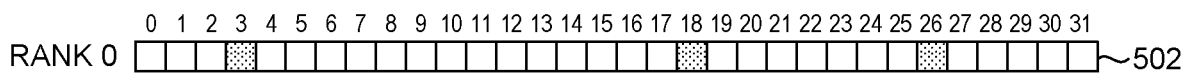
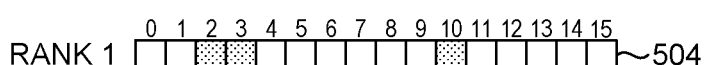
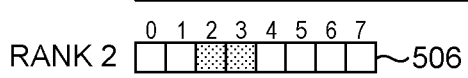
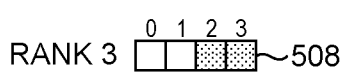
FIG. 5

FIG. 7

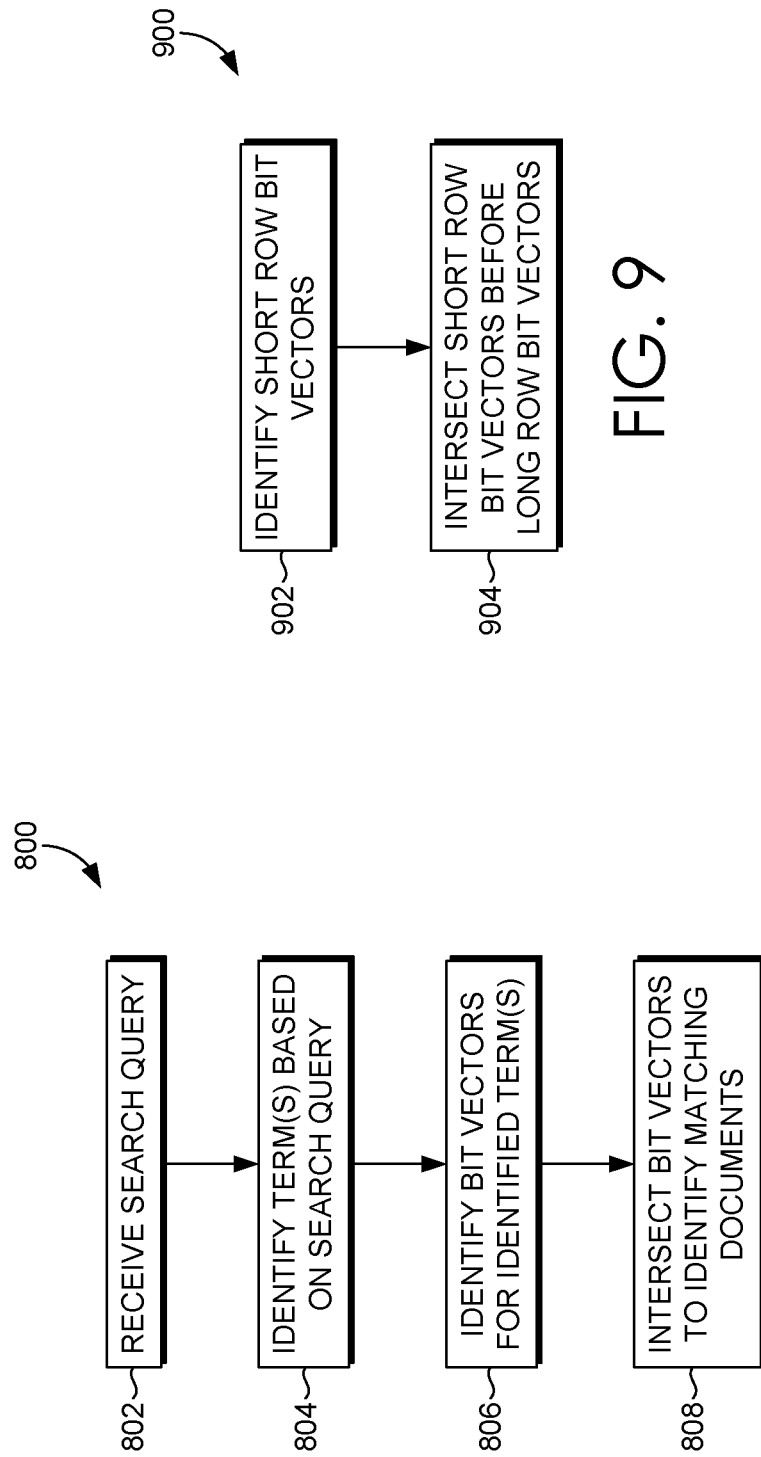

"Easy Street" (IDF = 4.07)
Easy (IDF = 1.27)
Street (IDF = 1.14)
FIG. 20A
"Easy Street" (IDF = 4.07)
2002
2004
2006
2008
2010
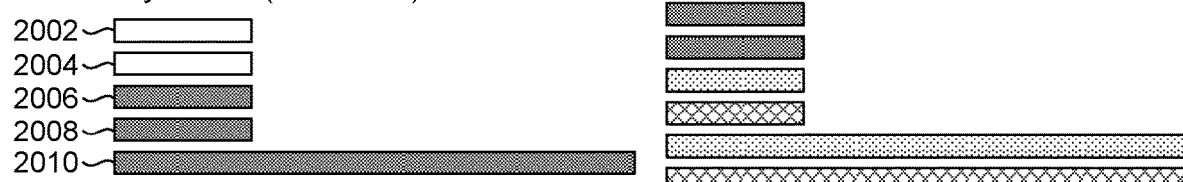
Easy (IDF = 1.27)
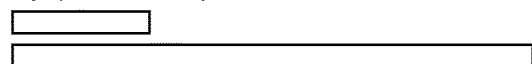
Street (IDF = 1.14)
FIG. 20B

FIG. 21

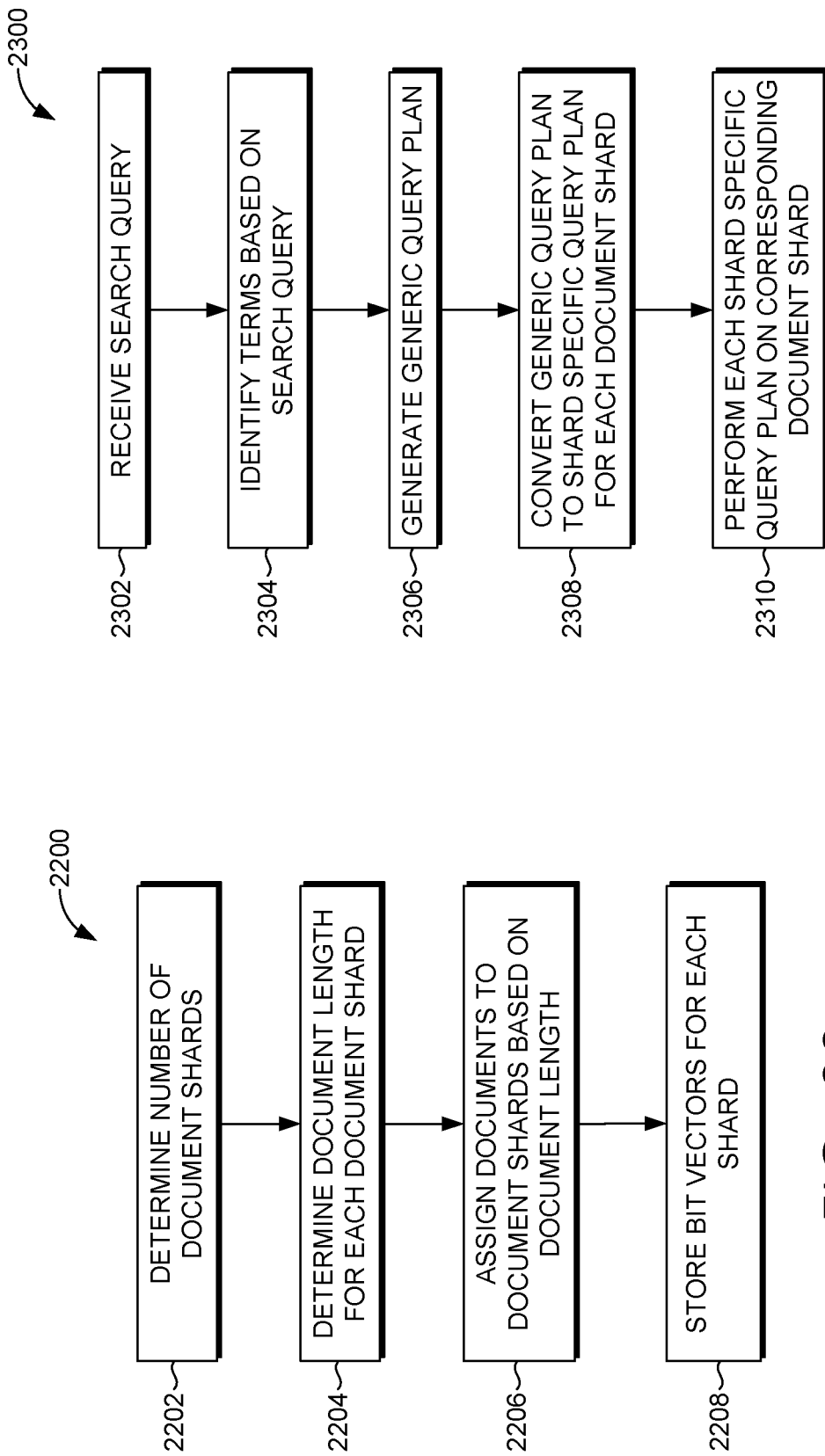

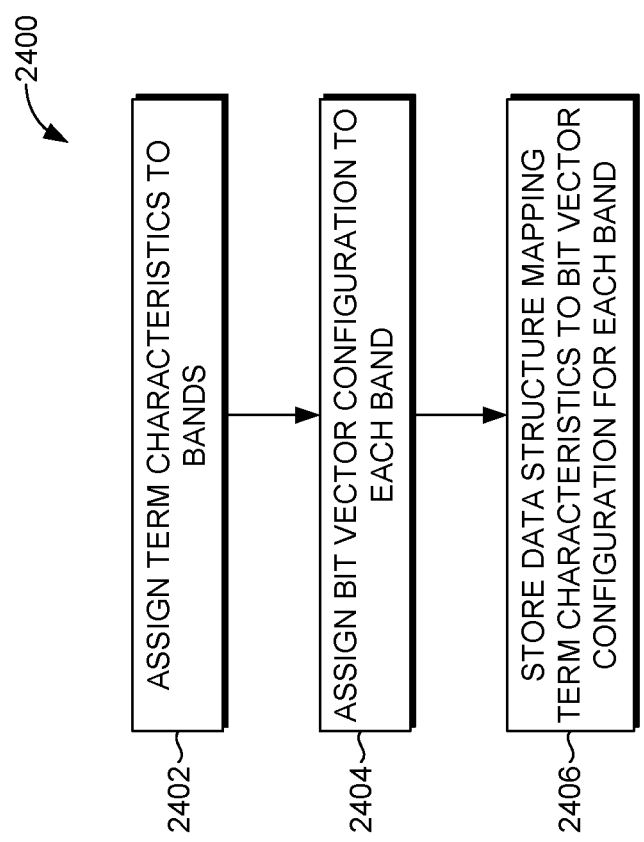

|   | A | B | C | D |
|---|---|---|---|---|
| 1 | 0 | 1 | 2 | 3 |
| 2 | 4 | 5 | 6 | 7 |
| 3 | 8 | 9 | 10 | 11 |
| 4 | 12 | 13 | 14 | 15 |

*FIG. 32A.*

|   | A | B | C | D | E |
|---|---|---|---|---|---|
| 1 | 0 | 1 | 2 | 3 | 4 |
| 2 | 5 | 6 | 7 | 8 | 9 |
| 3 | 10 | 11 | 12 | 13 | 14 |
| 4 | 15 | 16 | 17 | 18 | 19 |

*FIG. 32B.*

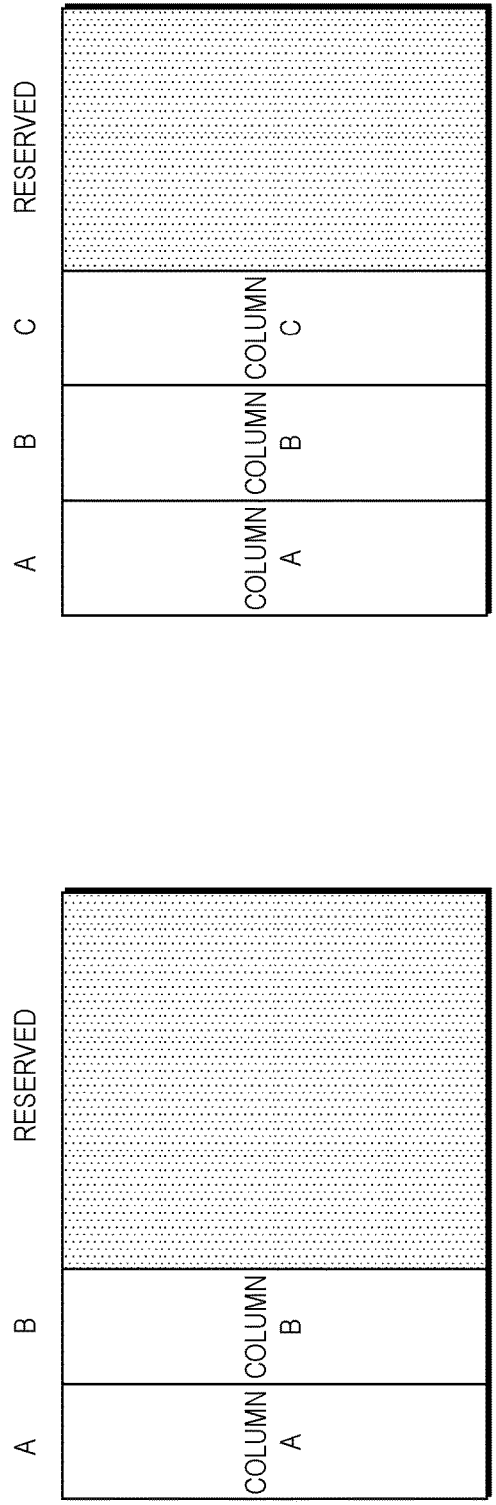
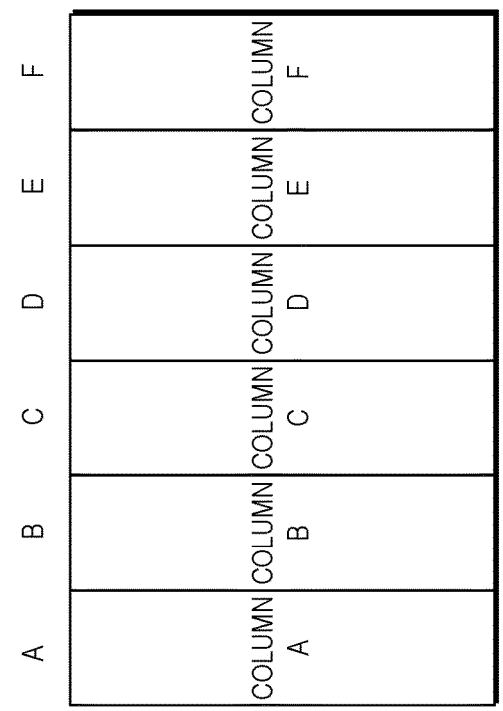
FIG. 33A.
FIG. 33B.
FIG. 33C.

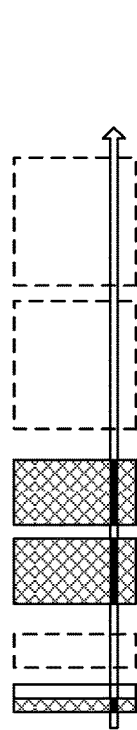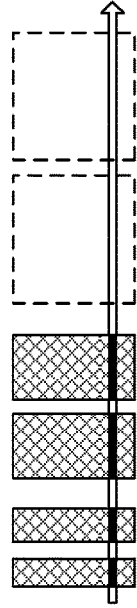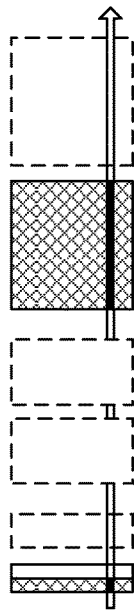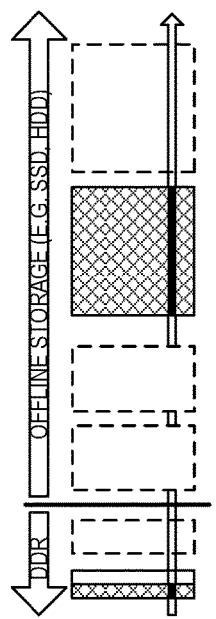
FIG. 35F.  FIG. 35G.  FIG. 35H.  FIG. 36.
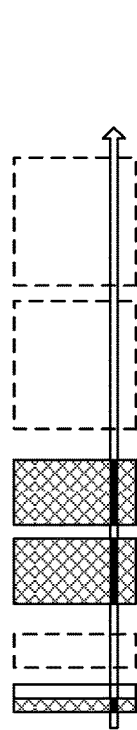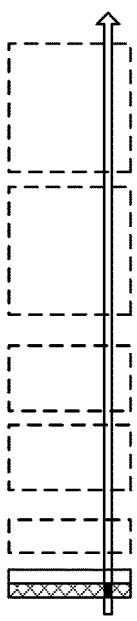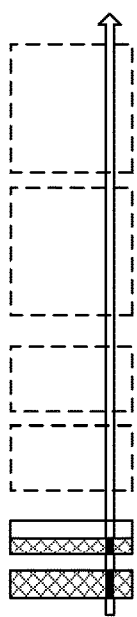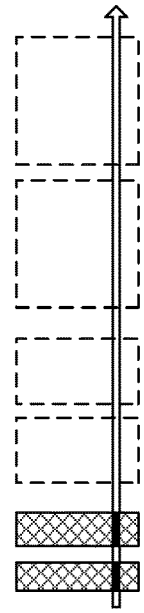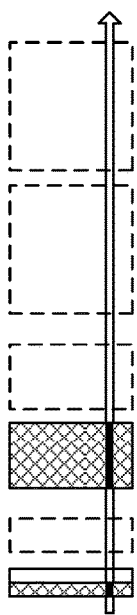
FIG. 35A.  FIG. 35B.  FIG. 35C.  FIG. 35D.  FIG. 35E.

UPDATING A BIT VECTOR SEARCH INDEX

CROSS-REFERENCE TO RELATED APPLICATIONS

This application claims the benefit of U.S. Provisional Application No. 62/183,556, filed Jun. 23, 2015, which is hereby incorporated herein by reference in its entirety.

BACKGROUND

The amount of available information and digital content on the Internet and other electronic sources continues to grow rapidly. Given the vast amount of information, search engines have been developed to facilitate searching for electronic documents. In particular, users or computers may search for information and documents by submitting search queries, which may include, for instance, one or more words. After receiving a search query, a search engine identifies documents that are relevant based on the search query.

At a high level, search engines identify search results by ranking documents' relevance to a search query. Ranking is often based on a large number of document features. Given a large set of documents, it's not feasible to rank all documents for a search query as it would take an unacceptable amount of time. Therefore, search engines typically employ a pipeline that includes preliminary operations to remove documents from consideration for a final ranking process. This pipeline traditionally includes a matcher that filters out documents that don't have terms from the search query. The matcher operates using a search index that includes information gathered by crawling documents or otherwise analyzing documents to collect information regarding the documents. Search indexes are often comprised of posting lists (sometimes called an inverted index) for the various terms found in the documents. The posting list for a particular term consists of a list of the documents containing the term. When a search query is received, the matcher employs the search index to identify documents containing terms identified from the search query. The matching documents may then be considered by one or more downstream processes in the pipeline that further remove documents and ultimately return a set of ranked search results.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The technology described herein provides techniques for updating a bit vector search index. The bit vector search index is a data structure that uses bit vectors to index information about terms contained in documents. Each bit vector comprises an array of bits that stores information for a collection of terms. Each bit position (or bit) in a bit vector indicates whether one or more documents contain one or more terms from a collection of terms. Additionally, a term can be included in multiple bit vectors. In accordance with the technology described herein, techniques are provided for updating the bit vector search index using what is referred to herein as "accumulation buffers" to index documents to larger, slower storage devices to offset inefficiencies. Generally, documents are initially indexed in bit vectors in an accumulation buffer. Once a threshold is met (e.g., time-based; document-based), information is transferred from the accumulation buffer to another storage device. Any number and size of accumulation buffers may be employed to index documents to a final storage device depending on design goals.

BRIEF DESCRIPTION OF THE DRAWINGS

Aspects of the technology provided herein are described in detail below with reference to the attached drawing figures, wherein:

FIG. 4A-4C are diagrams illustrating intersecting bit vectors to identify documents that include a term in accordance with an aspect of the technology described herein;

FIG. 5 is a diagram illustrating bit vectors with different numbers of documents per bit in accordance with an aspect of the technology described herein;

FIG. 7 is a diagram illustrating a simplified search index 700 using bit vectors in accordance with an aspect of the technology described herein;

FIG. 8 is a flow diagram illustrating a method for a matcher to identify documents that match terms from a search query in accordance with an aspect of the technology described herein;

FIG. 9 is a flow diagram illustrating a method for intersecting bit vectors using short bit vectors first in accordance with an aspect of the technology described herein;

FIGS. 20A-20B are diagrams illustrating an example of using bit vectors for a phrase in accordance with an aspect of the technology described herein;

FIG. 21 is a diagram providing an example of a long document;

FIG. 22 is a flow diagram illustrating a method for generating shards for a search index using bit vectors in accordance with an aspect of the technology described herein;

FIG. 23 is a flow diagram illustrating a method for performing a search using multiple shards in accordance with an aspect of the technology described herein;

FIG. 24 is a flow diagram illustrating a method for generating a data structure, such as a band table, mapping term characteristics to bit vector configurations in accordance with an aspect of the technology described herein;

FIGS. 32A and 32B are diagrams illustrating adding a document to an array;

FIGS. 33A-33C are further diagrams illustrating adding documents to an array;

FIGS. 35A-35H are diagrams illustrating writing documents to an array and copying documents from array to array;

FIG. 36 is a diagram illustrating storing different arrays on different types of storage;

DETAILED DESCRIPTION

Figure 1:
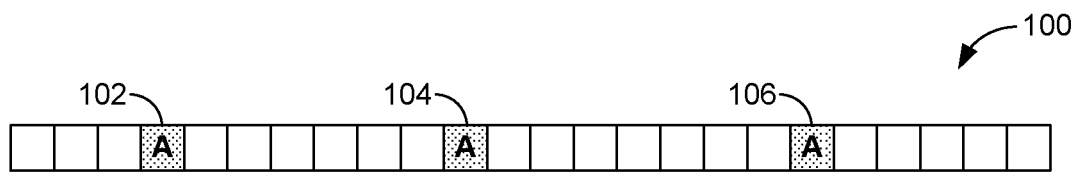
FIG. 1 is diagram illustrating bit vector for a single term in accordance with an aspect of the technology described herein.

The subject matter of aspects of the technology provided herein is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Each method described herein may comprise a computing process performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Alternatively, or in addition, the functionality described herein can be performed, at least in part, by one or more hardware logic components. For example, and without limitation illustrative types of hardware logic components that can be used include Field-programmable Gate Arrays (FPGAs), Application-specific Integrated Circuit (ASICs), Application-specific Standard Products (ASSPs), System-on-a-chip systems (SOCs), Complex Programmable Logic Devices (CPLDs), etc.

A number of metrics may be considered when evaluating the design of a search system. One metric is storage consumption used by the search system to index information regarding a corpus of documents. This metric may be a measure of the number of documents that can be indexed on each machine in the search system ("D"). Another metric is processing speed for search queries. This metric may be a measure of the number of queries per second processed by the search system ("Q"). Another consideration in the design of a search system is that it should always be available even though the search index needs to be periodically updated to index information about document changes and new documents. In some designs, search systems are updated by taking banks of index servers down to update them while leaving other banks running such that all banks are updated over time. With the continual increase of available documents on the Internet, the time to update the search index continues to rise to a point where current designs may become unfeasible. Finally, another design goal for a search system may to quickly update the search index with new documents as they become available. This is particularly desirable for indexing information such as news or social feeds in which users expect to see information in near real-time as the information becomes available.

When considering the above design metrics, the traditional use of posting lists (or inverted index) presents a number of drawbacks that impact both how many documents can be stored on machines in the search system (D) and the processing speed of queries (Q). Posting lists are kept sorted so that a join (or intersection) of two posting lists can be performed efficiently. However, re-sorting posting lists makes instant updating of information impractical, because a large amount of data must be rebuilt for every update. Thus, posting lists often require batch updating to amortize the sort costs over a larger number of updates. To speed up query processing, a number of complexities have been added to posting lists, such as skip lists that provide a way of skipping over documents when searching the posting lists for matching documents that contain search query terms. Additionally, because posting lists are typically sorted by document, if a new document is added, it may have to be inserted somewhere in the middle of the posting list. Given these complexities, posting lists may not allow for the quick insertion of new documents or document changes but may instead require the posting lists to be rewritten. Even if the design does facilitate insertion of new documents or document changes, it may be very complicated to insert it because of skip lists and/or other complexities added to the posting lists to facilitate query processing. As a result, the time to update a search index for a large corpus of documents, such as documents available via the Internet, may continue to increase to a point where it cripples the availability of the search system. Additionally, these issues negatively impact the ability of the search system to provide real-time search results for newly available information (e.g., news, social feeds, etc.).

Aspects of the technology described herein employ a number of techniques to produce large increases in efficiency over existing search systems (e.g., 2-3× over all search engines and 10× over search engines with instant update). This includes replacing posting lists with data structures that attempt to maximize the information density across an I/O channel. For instance, in today's Xeon computers, the limiting channel might be the path from memory to the CPU, where the memory could be, for instance, double data rate random-access memory (DDR RAM or DDR), solid-state drive (SSD), or hard disk drive (HDD). The organization of data is mostly optimized by entropy, in order to approach the theoretical maximum information density. Aspects of the technology described herein employ probabilistic approaches that allow false positive results to occur during the matching process. In other words, the matcher may return documents that don't contain terms from a search query. This is in contrast to posting lists, which are exact—the matcher will only return documents that contain terms from a search query. However, the resulting efficiency improvements are so profound with the techniques employed by various configurations described herein that, even when accounting for the cost to remove the false positives in a later stage, the total cost for matching is significantly reduced when compared to systems that utilize posting lists. Additionally, while the matcher may return false positives, it will not remove documents that are true matches (except when the NOT operator is used).

Figure 44:
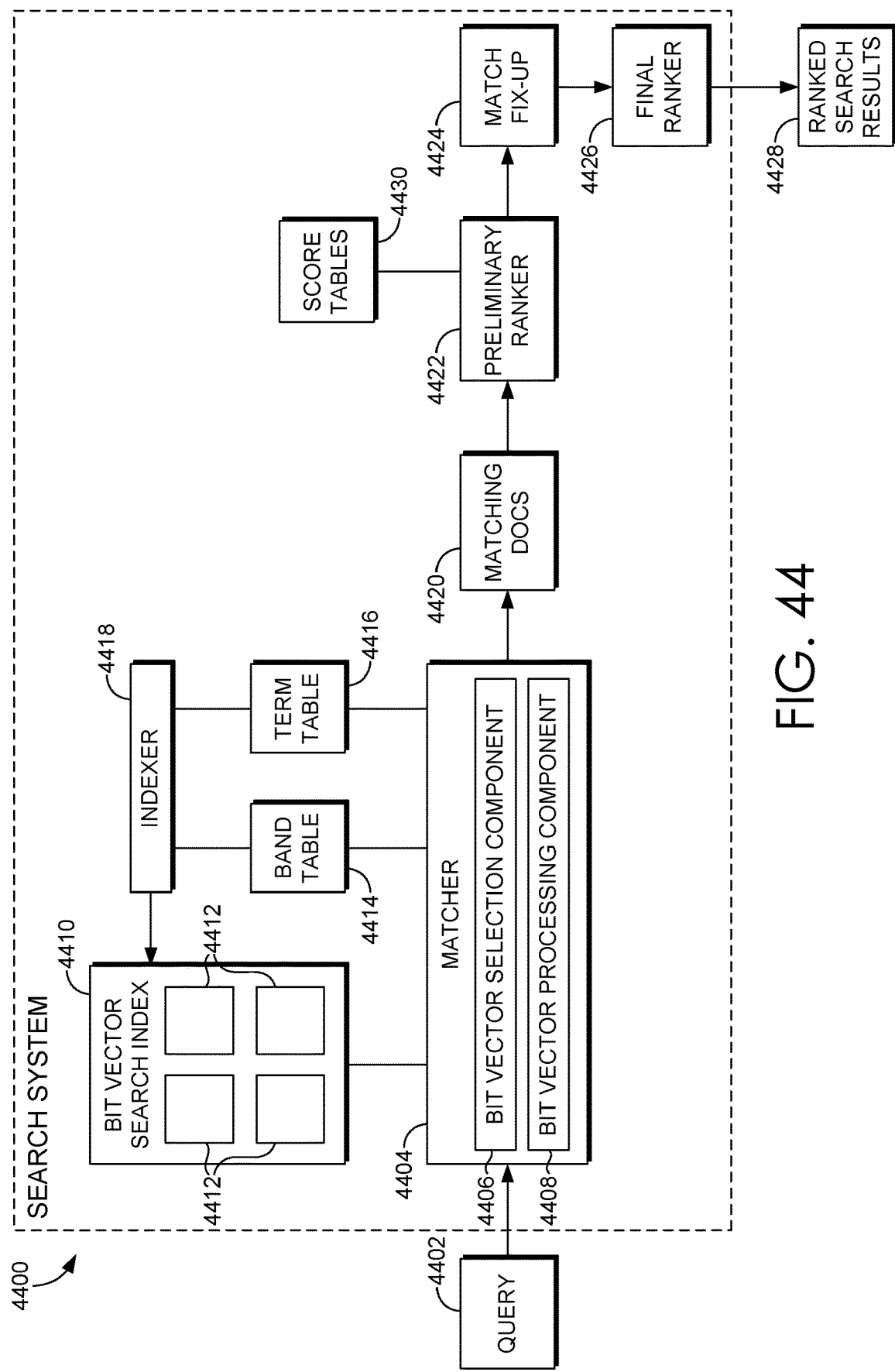
FIG. 44 is a block diagram illustrating an exemplary search system in which aspects of the technology described herein may be employed.

FIG. 44 provides a block diagram showing an exemplary search system 4400 providing an overview of features described herein. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory. Although FIG. 44 shows a search system 4400 with a number of different features, it should be understood that search systems may employ any of the features independent of other features discussed herein.

As shown in FIG. 44, the search system 4400 employs a bit vector search index 4410 instead of a search index using postings lists. The bit vector search index 4410 uses a number of bit vectors to represent indexed documents. As will be described in more detail below, a bit vector is an array of bits that stores information for a collection of terms. Each bit position (or bit) in a bit vector corresponds to an assertion of whether one or more documents contain one or more terms from a collection of terms. As used herein, a "document" refers to any electronic content item for which information may be indexed by a search system. An electronic content item is not limited to text and could include, for instance, images, audio, video, geographic data, etc. As used herein, a "term" corresponds to any assertion about a document, including the assertion that the document contains one or more specific words. In some instances, a term may be a single word; while in other instances, a term may be a multiword phrase. A "word" refers to any number of symbols (e.g., letters, numbers, punctuation, etc.) or any binary data (such as hash, index, id, etc.). In some configurations, a term may be a "metaword" that encodes other types of assertions beyond a word or collection of words. For instance, a term may correspond to the assertion that a document is written in French.

Because a bit vector may correspond to a collection of terms, the bit vector includes noise in the sense that it is unknown from a set bit in a single bit vector which of those terms is contained in a document corresponding to the set bit. To address this, a term may be included in multiple bit vectors. To identify documents containing a given term, bit vectors corresponding to that term are identified and intersected. Documents containing the term are identified as ones corresponding to a certain bit that is set in each of the bit vectors for the term. It should be noted that the majority of this description discusses intersection of bit vectors. However, configurations may also employ unions and negations, and as such, where an intersection is mentioned, a union or negation could be performed instead.

The bit vectors may include both long and short bit vectors. A long bit vector is a bit vector in which each bit corresponds to a single document. Therefore, a bit in a long bit vector indicates whether a document corresponding to that bit contains one or more of the terms corresponding to that bit vector. A short bit vector is a bit vector in which each bit corresponds to two or more documents. Therefore, a bit in a short bit vector indicates whether any of the two or more documents corresponding to that bit contains one or more of the terms corresponding to that bit vector. The search index may store varying lengths of short bit vectors (e.g., two documents per bit, four documents per bit, eight documents per bit, etc.).

Using a bit-vector based search index provides a number of benefits over posting lists. For instance, by using sequences of bits, the approach creates very high efficiencies by avoiding the complexities of posting lists including the need to sort documents and the use of skip lists. This allows, among other things, instant or near-instant update of the search index, preventing long downtimes to update the search index and facilitating the real-time or near real-time addition of new/changed documents (e.g., for news, social feeds, etc.). Additionally, the design of the system is configurable to meet Q and D design goals. For instance, the approach may provide extremely high Q without sacrificing D (i.e., high Q while D is comparable to existing systems). As another example, the approach may provide high D without sacrificing Q (i.e., high D while Q is comparable to existing systems).

In some configurations, the bit vector-based search index is divided into different shards 4412 as represented in FIG. 44. Each shard indexes a different collection of documents corresponding to a different range of document length (e.g., the number of unique terms indexed for a document). For instance, a first shard may index documents with 0-100 terms, a second shard could index documents with 101-200 terms, a third shard could index documents with 201-300 terms, etc. This addresses the issue that efficiencies are lost when documents of greatly varying length are stored together. For instance, if a very long document (i.e., many terms are indexed) is stored with a very short document (i.e., very few terms are indexed), the column for the long document will have many bits set, while the column for the short document will have very few bits set. As used herein, a "column" refers to the bits in each bit vector that corresponds to a given document or group of documents. This makes it difficult to maintain a uniform bit density (i.e., the percentage of bits set to "1") in the bit vectors. By grouping similar length documents in shards, the distribution of terms may be configured in a manner to better control the bit density.

The distribution of terms in a bit vector-based search index may be achieved in some configurations by assigning different bit vector configurations to different terms. A bit vector configuration for a term represents the number and length of bit vectors used for a term and may also specify the type of storage (e.g., DDR, SSD, HDD, etc.) for each bit vector. In accordance with some aspects of the technology described herein, terms may be grouped into bands based on term characteristics and each band may be assigned a particular bit vector configuration. This avoids the complexities of assigning a bit vector configuration on a per-term basis and avoids the inefficiencies of a one-size-fits-all solution using a single bit vector configuration for all terms. The mapping of term characteristics to bit vector configurations may be stored in a data structure by the search system 4400, such as in the band table 4414 shown in FIG. 44.

Some configurations address the identification of storage locations of bit vectors for terms. For instance, bit vector storage locations are identified when generating and updating the search index. Additionally, bit vector storage locations are identified when retrieving bit vectors for the purpose of identifying matching documents for a search query. In accordance with some aspects of the technology described herein, a hybrid approach for identifying bit vector storage locations is employed. An explicit mapping is provided for some terms. This may include, for instance, terms that occur most frequently in search queries and/or documents. The explicit mappings identify specific bit vector storage locations for each term. The explicit mappings may be stored in a data structure by the search system 4400, such as the term table 4416 shown in FIG. 44. For other terms, an ad hoc approach is employed. In particular, mapping algorithms may be provided for bands of terms that correspond to particular term characteristics. The mapping algorithms for each band may be employed for deriving the bit vector storage locations for terms that have term characteristics assigned to each corresponding band. Each mapping algorithm may determine storage locations, for instance, as a function of the hash of a term. The correspondence of mapping algorithms to term characteristics may be stored in a data structure by the search system 4400, such as in the band table 4414 shown in FIG. 44.

The band table 4414 and term table 4416 may be used by the search system 4400 at both index generation time and query time. As used herein, "index generation time" refers to processes to index information regarding documents in a search index. This includes initially generating the search index and incrementally updating the search index over time by adding/updating/removing documents. As used herein, "query time" refers to processing search queries to return search results. The band table 4414 and term table 4416 may be used by an indexer 4418 at index generation time to index information about documents in the bit vectors of the bit vector search index 4410. In particular, the band table 4414 and term table 4416 may be used to identify bit vector configurations for terms and identify bit vector locations for terms when adding document information to the bit vector search index 4410. At query time, the matcher 4404 may employ the band table 4414 and/or term table 4416 to identify bit vector locations for terms identified from a received search query.

The indexer 4418 may be operable to add and/or remove documents from the bit vector search index 4410. Adding documents to the bit vector search index 4410 may simply entail identifying a "column" for the document (i.e., a bit in each bit vector corresponding to the document) and setting bits in bit vectors corresponding to that column based on the presence of terms in the document. In some instances, faster storage devices (e.g., DDR RAM) may be employed to store bit vectors and documents may be indexed one at a time. In other instances, slower storage devices (e.g., SSD; HDD) may present some inefficiencies when writing bit vectors. Accordingly, some configurations employ what is referred to herein as "accumulation buffers" to index documents to slower storage devices to offset inefficiencies. Generally, documents may be initially indexed in bit vectors in an accumulation buffer. Once a threshold is met (e.g., time-based; document-based), information is transferred from the accumulation buffer to another storage device. Any number and size of accumulation buffers may be employed to index documents to a final storage device depending on design goals.

FIG. 44 illustrates a multistage approach to providing ranked searched results 4428 for a search query 4402. When the search query 4402 is received by the search system 4400, terms are identified based on the search query 4402. The terms may be terms exactly as included in the search query and/or terms derived based on the terms in the search query 4402. The matcher 4404 operates to identify a set of matching documents 4420 based on the terms from the search query 4402. The matcher 4404 includes a bit vector selection component 4406 that generally operates to select bit vectors for the terms from the bit vector search index 4410. The matcher 4406 also includes a bit vector processing component 4408 that operates to intersect (or perform a union or exclusion (e.g., not) on) the selected bit vectors in order to identify the set of matching documents 4420.

A number of techniques may be employed by the bit vector selection component 4406 in selecting bit vectors for intersection in order to control the matching documents returned. Some aspects of the technology described herein may employ what is referred to herein as "strengthening row" bit vectors in instances in which too many matching documents may be returned. A "strengthening row" bit vector is a bit vector that is added in addition to the term bit vectors for intersection in order to reduce the number of matching documents. As an example, a strengthening row bit vector may be based on static rank of documents. In particular, a bit vector may have bits set for documents with the highest static rank (e.g., the top 10% of documents based on static rank). Adding such a static rank bit vector would limit the matching documents to documents with the highest static rank that match the terms from the search query 4402. Another strengthening row bit vector that may be used is a bit vector that identifies terms in non-body locations (e.g., title or anchor text) in documents (as opposed to any location in the documents).

Another technique that may be used by the bit vector selection component 4406 in selecting bit vectors is referred to herein as row trimming/augmentation. A number of bit vectors are typically available for each term from a received search query, and the bit vectors may be stored in different types of storage (e.g., DDR, SSD, HDD, etc.). The bit vector selection component 4406 may decide which of the available bit vectors for the terms from the search query 4402 to select for intersection. The selection may be based on some relevance metric, an estimate of the number of matching documents expected to be returned, the type of storage at which each bit vector is located, and other considerations. Controlling the selection of which available bit vectors for intersection, the relevance of the matching documents (e.g., number of false positives) and the processing speed may be adjusted based on design goals for the search system 4400.

The set of matching documents 4420 returned by the matcher 4404 may include too many matching documents to feasibly send them all to a final ranker 4426, which may be expensive in the sense of the amount of processing required for each document. Additionally, because the bit vector search index provides a probabilistic approach, some of the matching documents 4420 may be invalid matching documents (i.e., false positives) in the sense that those documents don't contain terms from the search query. Accordingly, the search system 4400 may employ one or more stages between the matcher 4404 and the final ranker 4426 to remove matching documents from consideration before reaching the final ranker 4426.

One or more preliminary rankers, such as the preliminary ranker 4422, may provide less expensive ranking of documents to more quickly remove some documents from consideration. Typically, preliminary rankers may employ information from posting lists. Because the search system 4400 does not employ posting lists, other approaches may be employed. In accordance with some aspects of the technology described herein, score tables 4430 may be used by the preliminary ranker for scoring matching documents based on their relevance to a search query. A score table for a document stores pre-computed data used to derive a frequency of terms and other information in the document. Accordingly, the preliminary ranker 4422 may employ the score table for each matching document and the terms from the search query 4402 to determine a score for each matching document. The lowest scoring documents may then be removed from further consideration.

The search system 4400 may also employ a match fix-up stage to remove invalid matching documents. Generally, a match fix-up component 4424 may employ a representation of each document to identify valid matching documents and invalid matching documents. The representation may be, for instance, a forward index that stores a list of terms for each document. Any invalid matching documents may be removed by the match fix-up component 4424 such that they are not considered by the final ranker.

Search Index Using Bit Vectors

The search index in aspects of the technology described herein employs bit vectors instead of posting lists traditionally used by search indexes. A bit vector comprises an array of bits (i.e., ones and zeroes). In its simplest form, a bit vector may correspond to a particular term and each bit corresponds to particular document. A bit being set for a document indicates the document contains the term. Conversely, a bit not being set for a document indicates the document does not contain the term.

FIG. 1 conceptually illustrates a bit vector 100 for a term A. Each of the 24 blocks shown in FIG. 1 corresponds to a bit in the array, each bit corresponding to a different document. Accordingly, the bit vector 100 encodes information regarding whether each of 24 documents contains the term A. In the present example, the blocks 102, 104, 106 marked with the letter A represent bits that have been set, thereby indicating the documents corresponding to those bits contain the term A. Therefore, the bit vector 100 identifies three documents, in the set of 24 documents, that contain the term A. Conceptually, the bit vector 100 is shown as a row, and the terms "bit vector" and "row" may be used interchangeably herein.

In practice for a search engine that indexes a large collection of documents, using a bit vector to represent a single term would be impractical. In particular, the bit vector would include a very large number of bits corresponding to the large collection of documents, and the entire array of bits would need to be scanned to find bits that have been set. For many terms, the bit vector would be very sparse (i.e., only a small percentage of the bits are set) since only a small fraction of the indexed documents contain the term. As a result, the bit vector would not present a compact solution, and as a result, it would take a large of amount of storage to store the index and processing a search query would take an unacceptable amount of time.

Figure 2:
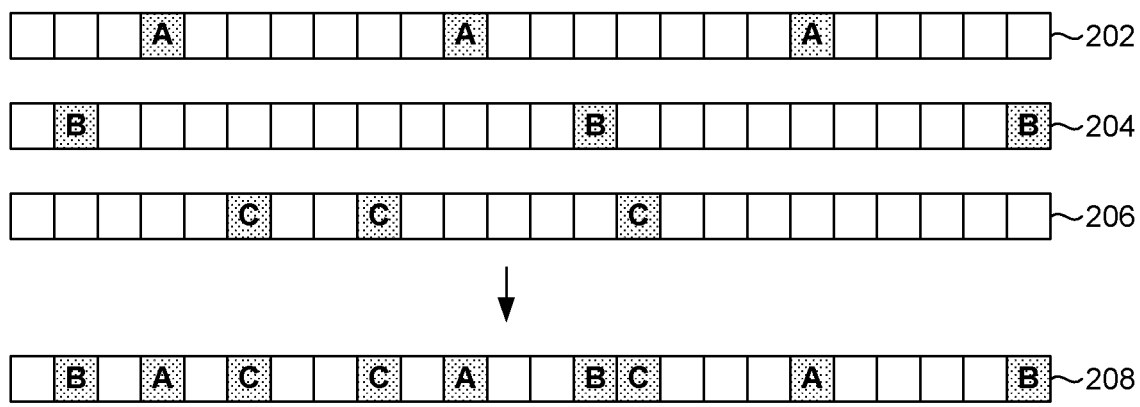
FIG. 2 is a diagram illustrating a bit vector for a combination of three terms in accordance with an aspect of the technology described herein.

To address this issue of sparseness, a technique referred to herein as "row sharing" is used in which multiple terms are included in a bit vector to increase the bit density of the bit vector (i.e., the percentage of bits set for the bit vector). Conceptually, this may be done by taking a bit vector for each of the terms and creating a union of those bit vectors. For instance, FIG. 2 illustrates a bit vector 202 for the term A, a bit vector 204 for the term B, and a bit vector 206 for the term C. A bit vector 208 that contains the terms A, B, and C could be generated as a union of the bit vectors 202, 204, and 206. As can be seen from FIG. 2, each of the bit vectors 202, 204, 206 only have three bits set and are sparse compared to the bit vector 208, which has nine bits set. As such, combining the three terms in a single bit vector increases the bit density. Instead of having three bits set as in each of the bit vectors 202, 204, and 206, the bit vector 208 has nine bits set.

One consequence of including multiple terms in a bit vector is that a single bit vector does not provide enough information to determine which term a document contains based on a bit being set in the bit vector for that document. In the example of FIG. 2 in which the bit vector includes terms A, B, and C, a bit being set for a document indicates the document contains A, or B, or C, or some combination of those terms. However, it can't be determined from the single bit in the bit vector which of the terms the document contains. Therefore, a mechanism is needed to determine which term the document contains.

Figure 3:
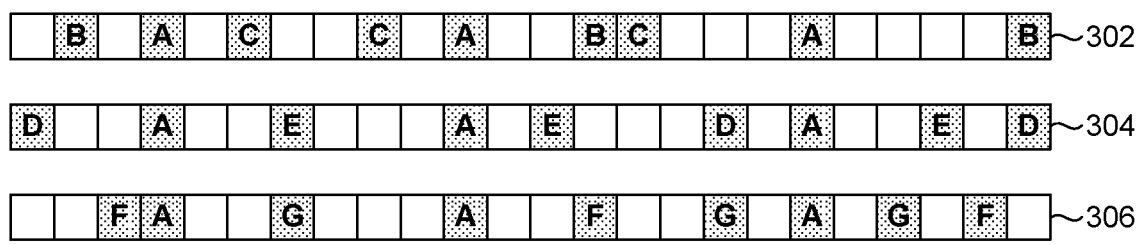
FIG. 3 is a diagram illustrating including terms in multiple bit vectors in accordance with an aspect of the technology described herein.

Aspects of the technology described herein address this issue created from having multiple terms in a bit vector by including a term in multiple bit vectors with different terms. This technique is referred to herein as "term copies." FIG. 3 illustrates the concept of term copies. As shown in FIG. 3, three bit vectors 302, 304, and 306 each include the term A. However, the other included terms differ among the three bit vectors 302, 304, and 306. In particular, in addition to term A, bit vector 302 includes terms B and C, bit vector 304 includes terms D and E, and bit vector 306 includes terms F and G.

The identification of which documents contain a particular term may be determined by a technique referred to herein as "row intersections" in which bit vectors that contain a term are intersected. Intersecting the bit vectors removes noise (i.e., bits set based on the presence of other terms) to identify which documents contain the desired term. Continuing the example of FIG. 3, FIG. 4A is another representation of the term A being included with other terms in three bit vectors 402, 404, and 406. As such, there are three bit vectors with a correlated signal (i.e., the presence of the term A) and uncorrelated noise (the presence of other terms—B, C, D, E, F, G). In the example of FIG. 4A, the noise bits are shown with hatching.

Some of the noise may be removed by intersecting bit vector 404 and bit vector 406. The result of the intersection is a bit vector 408 shown in FIG. 4B with bits set only in locations in which bits were set for both bit vectors 404 and 406. This includes the fourth, seventh, eleventh, sixteenth, and eighteenth positions. Intersecting this bit vector 408 with the bit vector 402 results in a bit vector 410 shown in FIG. 4C that includes bits set only in locations in which bits were set for both bit vectors 408 and 402. As represented in FIG. 4C, the bit vector 410 includes bits set for the fourth, eleventh, and eighteenth positions. These correspond to the documents that contain the term A. Accordingly, by identifying the bit vectors that include the term A and intersecting those bit vectors, the documents containing term A are identified. While FIGS. 4A-4C provide a simplified example in which only documents containing a particular term are identified (i.e., no false positives), in practice, row intersections may be designed to exponentially reduce noise (i.e., false positives), although some false positives may be present following the row intersections.

If a large number of documents are indexed and each bit of the bit vectors corresponds to a single document, the bit vectors will be long arrays and intersecting the bit vectors may be overly time-consuming. To address this issue, bit vectors may be employed that include multiple documents per bit. In a bit vector with multiple documents per bit, a bit is set if one or more of the documents sharing the bit contain one of the terms for the bit vector.

FIG. 5 illustrates the concept of bit vectors with different numbers of documents per bit. Initially, the bit vector 502 illustrates the previously discussed bit vectors in which each bit corresponds to a single document. A bit vector, such as the bit vector 502, in which there is one document per bit is referred to herein as a "long row" bit vector. As shown in FIG. 5, the bit vector 502 includes 32 bits corresponding to 32 documents. Bits have been set for the fourth, nineteenth, twenty-fifth, and twenty-seventh documents.

The bit vectors 504, 506, 508 are referred to herein as "short row" bit vectors because each bit includes two or more documents, thereby providing shorter arrays of bits. The bit vector 504 includes two documents per bit (16 total bits), the bit vector 506 includes four documents per bit (eight total bits), and the bit vector 508 includes eight documents per bit (four total bits). Each of the bit vectors 504, 506, 508 shown in FIG. 5 corresponds to the terms and documents from the bit vector 502. Each bit in a shorter bit vector corresponds to multiple bits from a longer bit vector. For instance, for the bit vector 504 (2 documents per bit), the first bit (bit position 0) corresponds to the bit positions 0 and 16 in the bit vector 502, and the second bit (bit position 1) corresponds to bit positions 1 and 17 in the bit vector 502, etc. For the bit vector 506 (4 documents per bit), the first bit (bit position 0) corresponds to bit positions 0, 8, 16, and 24 in the bit vector 502, and the second bit (bit position 1) corresponds to bit positions 1, 9, 17, and 25 in the bit vector 502, etc. For the bit vector 508 (8 documents per bit), the first bit (bit position 1) corresponds to bit positions 0, 4, 8, 12, 16, 20, 24, and 28 in the bit vector 502, and the second bit (bit position 0) corresponds to bit positions 1, 5, 9, 13, 17, 21, 25, and 29 in the bit vector 502, etc.

The bits in each of the bit vectors 504, 506, 508 are set if one of the corresponding bits are set in the bit vector 502. The following are examples to illustrate this. Because neither bit 0 nor bit 16 is set in the bit vector 502, bit 0 in the bit vector 504 is not set. However, because at least one of bits 2 and 18 is set in the bit vector 502 (i.e., bit 18 is set), bit 2 is set in the bit vector 504. In the bit vector 506, bit 3 is set because at least one of bits 3, 11, 19, and 27 in the bit vector 502 is set (i.e., bit 3 is set). Bit 2 in the bit vector 508 is set because at least one of bits 2, 6, 10, 14, 18, 22, 26, and 30 in the bit vector 502 is set (i.e., bits 18 and 26 are set).

As used herein, short row bit vectors may be referred to as "rank-n" bit vectors if the bit vectors have $2^n$ document per bit. For example, the bit vector 502 may be referred to as a rank-0 bit vector (because it contains $2^0=1$ document per bit), the bit vector 504 may be referred to as a rank-1 bit vector (because it contains $2^1=2$ documents per bit), the bit vector 506 may be referred to as a rank-2 bit vector (because it contains $2^2=4$ documents per bit), and the bit vector 508 may be referred to as a rank-3 bit vector (because it contains $2^3=8$ documents per bit).

Figure 6:
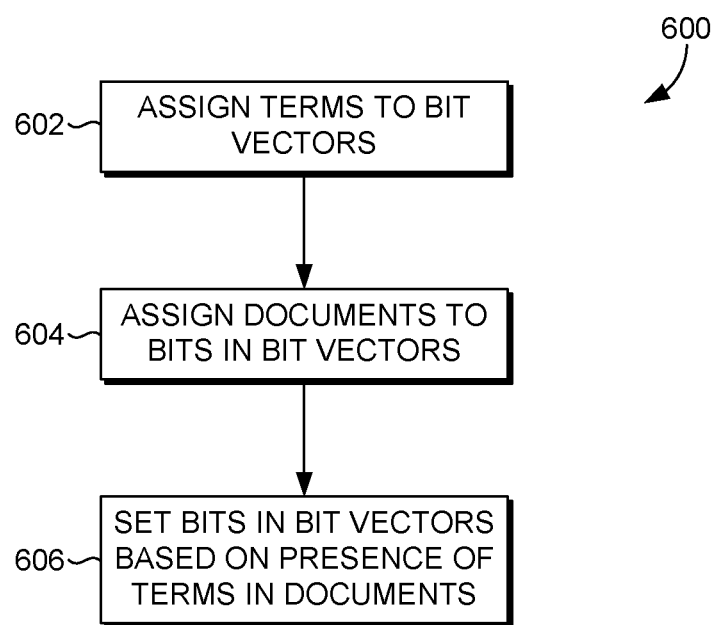
FIG. 6 is a flow diagram illustrating a method for generating a search index using bit vectors in accordance with an aspect of the technology described herein.

Turning now to FIG. 6, a flow diagram is provided that illustrates a method 600 for generating a search index using bit vectors. The method 600 may be performed at least in part, for instance, using the indexer 4418 of FIG. 44. As shown at block 602, terms are assigned to bit vectors. As discussed above, each term may be assigned to multiple bit vectors. Additionally, multiple terms are assigned to at least some of the bit vectors; although some bit vectors may have only a single term assigned. Some of the bit vectors are established as long row bit vectors with each bit corresponding to a single document and some of the bit vectors are established as short row bit vectors with each bit corresponding to multiple documents.

Documents are assigned to bit positions in the bit vectors, as shown at block 604. In long row bit vectors, each document corresponds to a single bit position in the bit vectors. In short row bit vectors, multiple documents correspond to each bit position. A document is assigned to a bit position in a short row bit vector corresponding to the bit position assigned to the document in long row bit vectors. It should be understood that any of a variety of different approaches may be employed to define bit correspondences between ranks. In some configurations, bit correspondences between ranks are based on the following equations:

Bit $i$ of quadword $j$ in a row of rank $r$ maps to bit $i$ of quadword $\left[\frac{j}{2}\right]$ in a row of rank $r+1$.  Equation 1

Bit i of quadword j in a row of rank r corresponds to bit i in quadwords 2j and 2j+1 in a row of rank r−1.  Equation 2:

As shown at block 606, bits are set in the bit vectors based on the presence of terms in the documents. For each document, the terms contained in the document are identified, bit vectors corresponding to each term are identified, and the bits assigned to the document in each of those bit vectors are identified and set. In some instances, a bit may have already been set when processing a different term and/or document.

Figure 7:
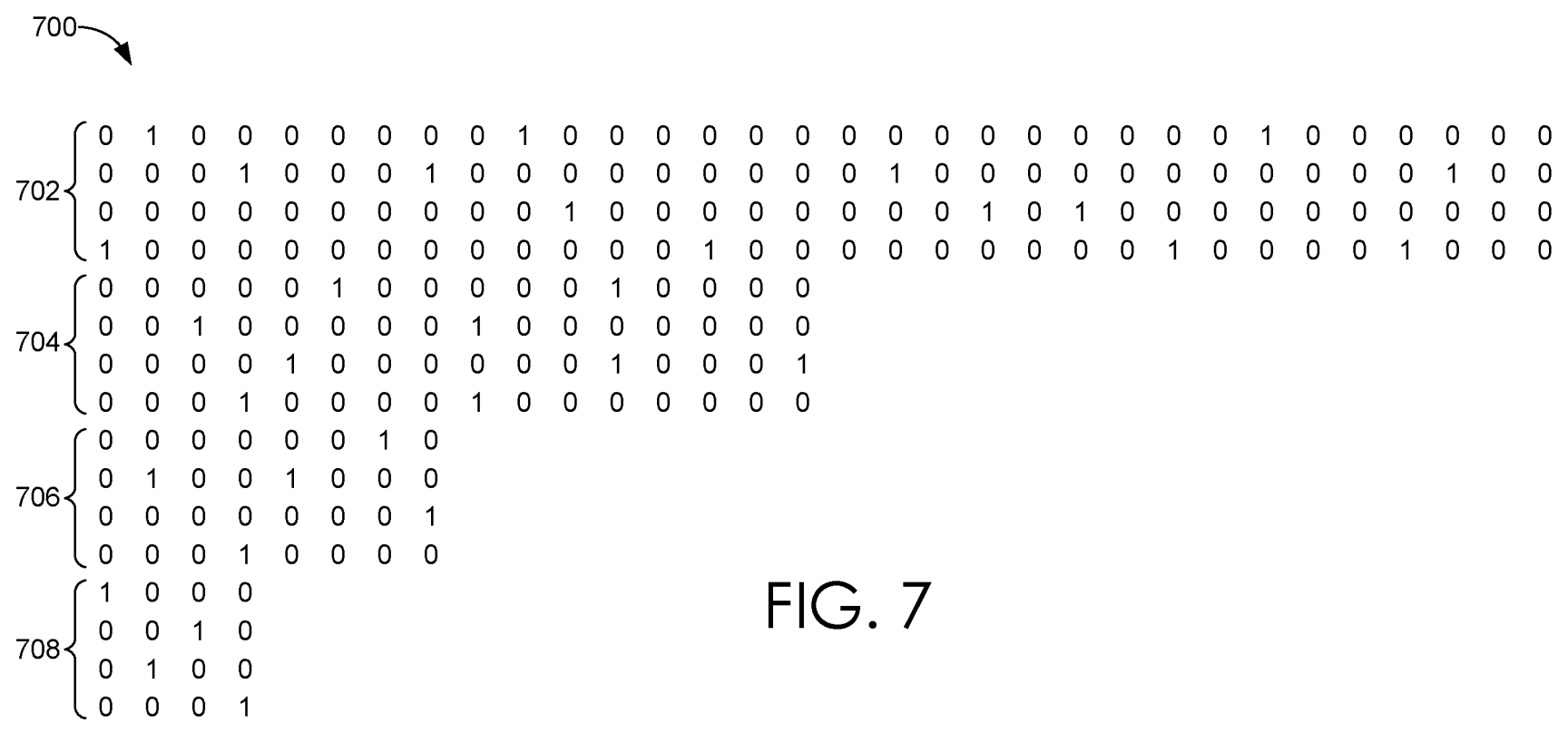

FIG. 7 illustrates an example of a very simple search index 700 using bit vectors. The search index 700 stores 16 bit vectors, each bit vector comprising an array of bits. The bit vectors include four long row bit vectors 702 with each bit corresponding to a single document. As can be seen in FIG. 7, each long row bit vector 702 includes 32 bits such that the search index 700 indexes information for 32 documents. The search index 700 also stores a number of short row bit vectors. In particular, the search index 700 stores four rank-1 bit vectors 704 (i.e., two documents per bit), four rank-2 bit vectors 706 (i.e., four documents per bit), and four rank-3 bit vectors 708 (i.e., eight documents per bit).

Each bit vector may correspond to multiple terms. Additionally, each term may be included in at least one long row bit vector and at least one short row bit vector. Accordingly, each bit in a long row bit vector represents whether a particular document contains at least one term from a set of terms corresponding to the bit vector. Each bit in a short row bit vector represents whether at least one of a set of documents contains at least one term from a set of terms corresponding to the bit vector. As can be understood from FIG. 7 and the above discussion, each bit vector includes bits that are consecutive in storage to represent which documents contain one or more of the terms represented by the bit vector. In contrast, bits for a document indicating which terms the document contains are spread out amongst bit vectors and therefore are non-consecutive in storage. This approach supports serving search queries since the bits for a bit vector corresponding to a term from a query are consecutive in storage and therefore may be quickly retrieved.

Term Distribution in Search Index

The distribution of terms in a search index using bit vectors is configurable based on the desired design optimization of the search index, including storage requirements (e.g., the number of documents that can be stored on each machine) and processing speed (e.g., the number of queries that can be performed per second). Generally, it is desirable to reduce storage requirements and increase processing speed. However, as discussed in further detail below, there are tradeoffs in storage requirements and processing speed with various term distribution aspects.

One term distribution aspect involves the number of terms to include in each bit vector. More terms per bit vector allows for more documents to be stored per machine, thereby reducing overall storage requirements. However, more terms per bit vector generally increases the noise, reducing processing speed since additional processing is required to remove the noise when performing search queries.

Another term distribution aspect is the number of copies of each term to include in the search index (i.e., how many bit vectors contain information about a specific term). Noise created by including multiple terms in a bit vector can later be removed if terms are stored in multiple bit vectors. However, increasing the number of bit vectors including a particular term increases storage requirements. Additionally, increasing the number of bits vectors including a particular term reduces processing speed since more intersections must be performed.

A further term distribution design aspect is the mixture of long row bit vectors (i.e., one document per bit) versus short row bit vector (i.e., multiple documents per bit). Shorter bit vectors increase processing speed since there is less memory to scan when performing row intersections. However, shorter bit vectors increase noise because, for a given set bit, it is unknown which document actually contains a term. The mixture of long and short row bit vectors doesn't impact storage requirements.

The following provides exemplary rules of thumb for term distribution in accordance with one implementation. In accordance with the present example, if a 10% bit density and a 10:1 ratio of signal to noise is desired, the number of intersections is equal to the inverse document frequency (IDF) for a term (except for a term with an IDF of 1, in which the signal to noise ratio is 1.0). The IDF of a term may be determined by taking the logarithm of the total number of documents divided by the number of documents containing the term. For instance, a term appearing once in every 10,000 documents has an IDF of four. When bit vectors that have 10% of bits set are intersected together, the bits are relatively close together—usually/often in the same byte. However, by the time four of those rows have been intersected together, the bits are far enough apart that they are farther apart than a processor/CPU cache line (i.e., 64 bytes=512 bits; although this may be different in different CPUs). As a result, for a certain number of intersections (e.g. 4 in this example), the entire bit vector is scanned and every single bit is accessed in order to perform intersections. However, after enough intersections are completed, the bits are far enough apart that probing can be done into random locations in the remaining bit vectors to be interested (i.e., it is not necessary to scan through all cache lines, although probing a single bit in a cache line will still cause the entire cache line to be read from memory. A certain minimum number of bit vectors must be intersected in their entirety, but after intersecting that certain number of bit vectors, the cost of additional intersections drops dramatically (to one cache miss per set bit vs cache misses required to read an entire row). One take away from this is that arbitrarily long sequences of intersections have about the same cost to process as simple queries. This is because the cost for each query is dominated by the first N intersections in which all bits from bit vectors are accessed. After those N intersections, the number of additional bit vectors that are intersected doesn't add much cost because few cache lines are read in those rows. Since these first N intersections requiring reading the bit vectors in their entirety and terms may be stored in a combination of long and short bit vectors, it may be desirable to use the shortest bit vectors possible for those first N intersections since it costs less to scan a shorter bit vector. Therefore, the design of the search index may maximize the number of short bit vectors in which a term is included. However, at least one long bit vector (i.e., rank-0) bit vector may be used to get down to the resolution of a single document.

By way of example to illustrate, suppose the term "snoqualmie" has an IDF of 4 (meaning it appears once in about every 10,000 documents). 1000 terms with an IDF of 4, like the term "snoqualmie," could be combined into a single bit vector to get a 10% bit density. To drive the false positive rate to 10% of the signal, 4 intersections of 5 bit vectors would be required to drive the noise down to 1/100,000. Therefore, the term "snoqualmie" could be stored in 5 rows. Since short rows are faster to scan, but at least one long row is needed, the term would likely be mapped to 4 short bit vectors and one long bit vector.

Matcher Algorithm

When a search engine employing a bit vector-based search index receives search queries, a matcher may employ bit vectors to identify a set of documents that contain terms from the search queries. In a common scenario, bit vectors that correspond to terms contained in and/or derived from the search queries are intersected to identify matching documents (unions and negations are also possible, but may be less common). A matcher plan or query plan (used interchangeably herein) is developed based on the search query in order to determine how to identify bit vectors for intersection and/or determining the order in which to perform bit vectors intersections, as will be described in more detail below. The matching documents identified from the matching process may then be analyzed in one or more subsequent processes that rank the matching documents.

Turning to FIG. 8, a flow diagram is provided that illustrates a method 800 for a matcher to identify documents that match terms from a search query. The method 800 may be performed at least partially, for instance, using the matcher 4404 of FIG. 44. Initially, as shown at block 802, a search query is received. One or more terms are identified from the search query, as shown at block 804. It should be understood that throughout this description, when terms are identified from a search query, the terms may include the exact terms contained in the received search query. Alternatively or additionally, the terms may include other terms identified from query augmentation. The other terms may include, for instance, correct spellings for misspelled terms, alternative forms of terms, and synonyms.

Bit vectors corresponding to the one or more terms from the search query are identified, as shown at block 806. Each term may be included in multiple bit vectors, and each bit vector or a portion of the bit vectors containing each term may be identified. The bit vectors are intersected to identify matching documents, as shown at block 808. The bit vectors associated with a single term are intersected to identify documents matching that term. Bit vectors associated with distinct terms are combined using a combination of intersection, union, and negation, as specified by the query.

In some instances, matching documents may be identified by intersecting all identified bit vectors. In other instances, matching documents may be identified by intersecting different subsets of identified bit vectors. This depends on how the query is formulated by the matcher. For instance, if a query only contains "and" operators, all bit vectors are intersected. As a specific example, suppose a query is performed to identify documents that contain "large" and "collection." In this case, bit vectors containing the term "large" would be intersected with bit vectors containing the term "collection." Documents corresponding to bits set in each of those bit vectors are determined to be matching documents. If a query containing an "or" operator is performed, matching documents may be identified by intersecting different subsets of bit vectors. For example, suppose a query is performed to identify documents that contain "large" or "larger" in conjunction with "collection." Matching documents may be identified from both the intersection of bit vectors containing the term "large" with bit vectors containing the term "collection" and from the intersection of bit vectors containing the term "larger" with bit vectors containing the term "collection."

In some configurations, the bit vectors identified for a search query may be intersected in any order at block 808 of FIG. 8. However, in other configurations, the order in which the bit vectors are intersected may be configured to provide more efficient processing. As discussed previously, the bit vectors for each term may include both short row bit vectors and long row bit vectors. Additionally, as discussed above, for initial intersections, each bit in the intersected bit vectors is processed. However, after a certain number of intersections, there is no need to scan the entire bit vectors when performing additional intersections. Instead, those additional intersections may be performed, for instance, by probing random locations in the bit vectors. Accordingly, some configurations may improve the efficiency of the intersection process by initially intersecting short rows. FIG. 9 provides a flow diagram showing a method 900 for intersecting bit vectors using short bit vectors first. The method 900 may be performed at least partially, for instance, using the matcher 4404 of FIG. 44. As shown at block 902, short row bit vectors are identified from the set of bit vectors to be intersected. At least a portion of the short row bit vectors are intersected before intersecting any long row bit vectors, as shown at block 904. In some configurations, all short row bit vectors are intersected before intersecting long row bit vectors. In other configurations, some long row bit vectors may be processed before some short row bit vectors. When intersections are subsequently performed in which each bit needs to be processed, the short row and long row bit vectors may be intersected in any order. Any and all such variations are contemplated to be within the scope of aspects of the technology described herein.

Figure 10:
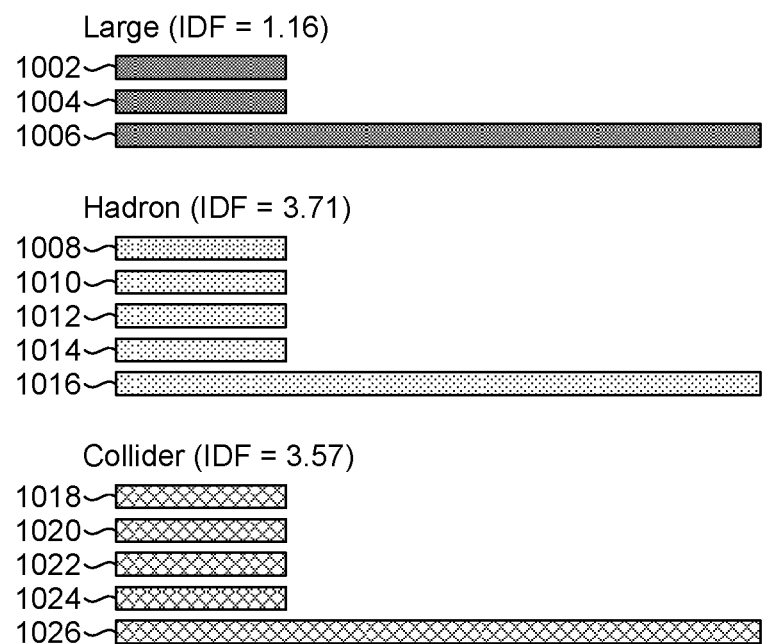
FIG. 10 is a diagram illustrating an example of bit vectors available for terms from a search query in accordance with an aspect of the technology described herein.

By way of example to illustrate the processing of intersecting short row bit vectors first, suppose a query is performed for the terms "large" and "hadron" and "collider." As shown in FIG. 10, the term "large" has an IDF of 1.16 and is included in two short row bit vectors 1002, 1004 and one long row bit vector 1006. The term "hadron" has an IDF of 3.71 and is included in four short row bit vectors 1008, 1010, 1012, 1014 and one long row bit vector 1016. The term "collider" has an IDF of 3.57 and is included in four short row bit vectors 1018, 1020, 1022, 1024 and one long row bit vector 1026.

Figure 11:
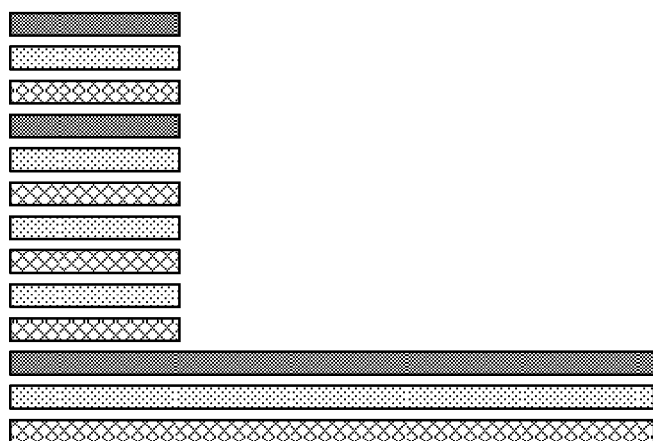
FIG. 11 is a diagram illustrating ordering the bit vectors for intersection in accordance with an aspect of the technology described herein.

As shown in FIG. 11, the matcher may logically arrange the bit vectors for intersection with the short bit vectors first followed by the long row bit vectors. In the example of FIG. 11, the short row bit vectors from the three terms have been alternated. However, it should be understood that the short row bit vectors may be ordered in any manner. For instance, the short row bit vectors for the term "large" may be arranged first followed by the short row bit vectors for the term "hadron" followed by the short row bit vectors for the term "collider."

In the example shown in FIG. 11, the matcher intersects each of the short row bit vectors and then intersects the result with the long row bit vectors. When intersecting bit vectors of the same length, a bit from the first bit vector is intersected with the corresponding bit in the second bit vector (e.g. the first bits are intersected, the second bits are intersected, the third bits are intersected, etc.). For instance, these intersections may be performed 64 bits at a time by the CPU. However, when intersecting bit vectors of different lengths, a bit from the shorter bit vector corresponds to multiple bits in in the longer bit vector. For instance, when intersecting a short row bit vector having four documents per bit with a long row bit vector having one document per bit, a bit from the short row bit vector is separately intersected with each of four corresponding bits in the long row bit vector.

As noted previously, some queries may be processed that require different subsets of bit vectors to be intersected. For example, suppose the search query "large hadron collider" is augmented to form the query "(large or larger) and hadron and (collider or collide)." This query would involve the following combinations of bit vector intersections: (1) large and hadron and collider; (2) large and hadron and collide; (3) larger and hadron and collider; and (4) larger and hadron and collide. When performing such queries, the bit vector intersections may be ordered such that intersections common to multiple bit vector intersection combinations are performed first and the results of these common intersections saved so they may be reused.

Figure 12:
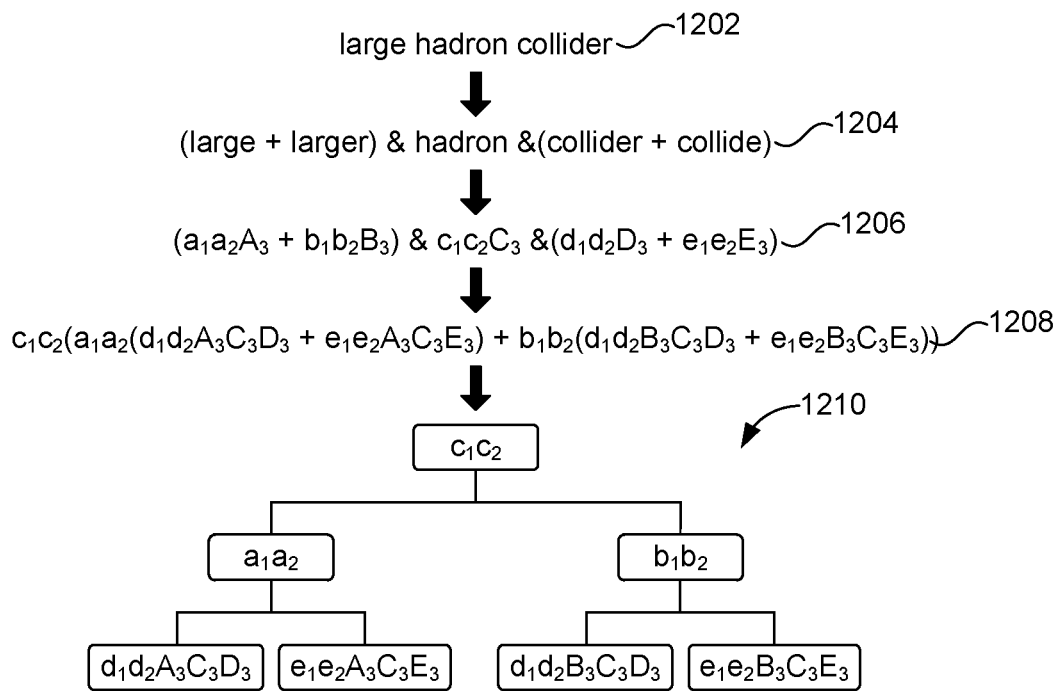
FIG. 12 is a diagram illustrating forming a query plan in accordance with an aspect of the technology described herein.

FIG. 12 illustrates the concept of ordering bit vector intersections such that intersections common to multiple bit vector combinations are performed first and the results reused. As shown in FIG. 12, the search query "large hadron collider" 1202 is processed to form the query "(large or larger) and hadron and (collider or collide)" 1204. In the present example, each term includes two short rows and one long row. As such, the augmented query 1204 could be represented with the bit vectors for each term as shown in the expression 1206 in which: "A" and "a" corresponds to the term "large;" "B" and "b" corresponds to the term "larger;" "C" and "c" corresponds to the term "hadron;" "D" and "d" corresponds to the term "collider;" and "E" "e" corresponds to the term "collide." Short row bit vectors are denoted by lower case, and long row bit vectors are denoted by upper case. For instance, $a_1$ and $a_2$ correspond with two short row bit vectors for the term "large," and $A_1$ corresponds to a long row bit vector for the term "large."

The expression 1206 can be written to form the expression 1208 by pulling short row bit vectors and those bit vectors for terms common to combinations to the left. For instance, the term "hadron" (represented by "c" in the expression 1208) is included in all combinations, while the terms "large" and "larger" (represented by "a" and "b" in the expression 1208) are each included in two combinations. Note that the terms "collider" and "collide" (represented by "d" and "e" in the expression 1208) are also each included in two combinations such that, in an alternative formulation, the locations in the expression 1208 for "a" and "b" could be exchanged with "c" and "d" and vice versa.

Figure 13:
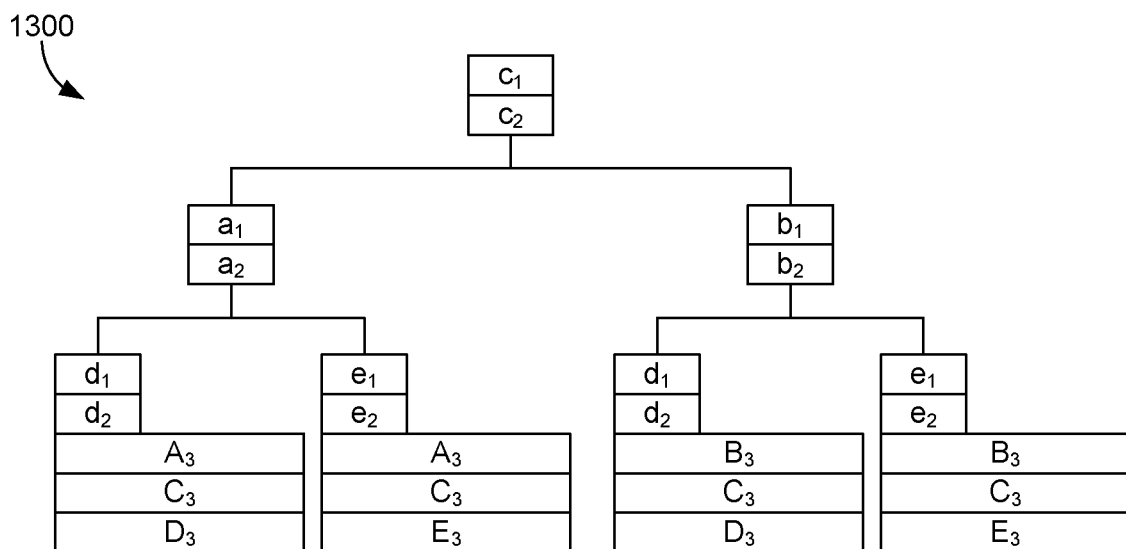
FIG. 13 is a diagram illustrating a tree for a query plan in which each block corresponds to a bit vector in accordance with an aspect of the technology described herein.
Figure 14:
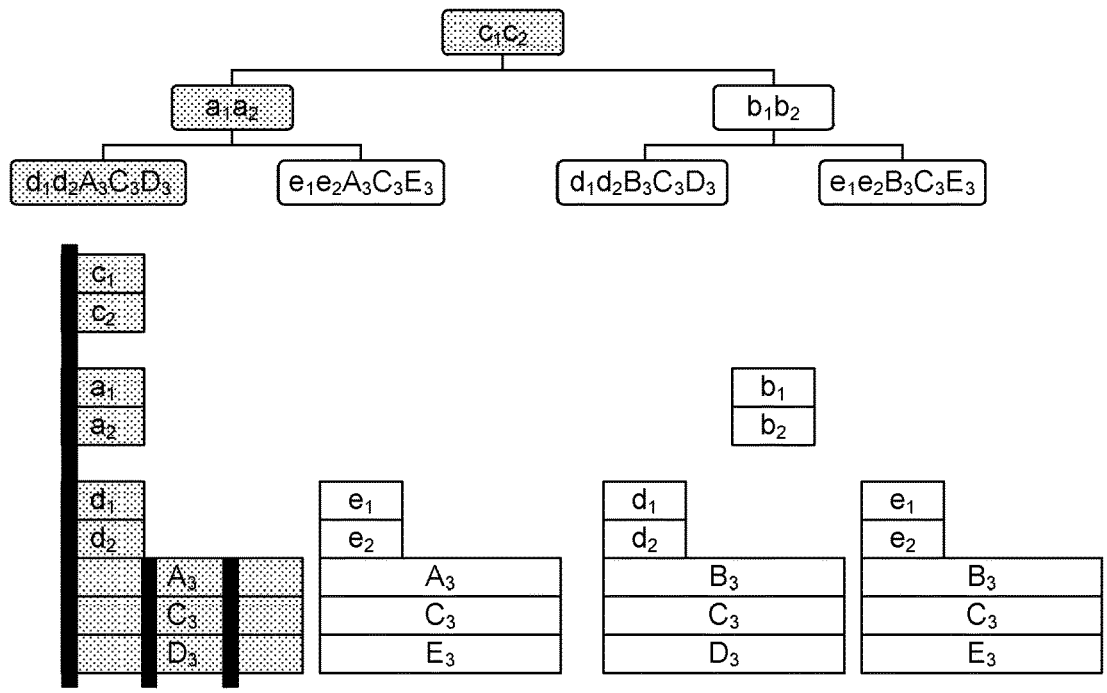
FIGS. 14-17 are diagrams illustrating intersections of bit vectors in accordance with the tree for the query plan of FIG. 13 in accordance with an aspect of the technology described herein.

The expression 1208 could be represented using a tree 1210, which could also be shown as the tree 1300 in FIG. 13 in which each block corresponds to a bit vector. Representing the expression 1208 as in the tree 1300 illustrates the order in which the intersections are performed. As shown in FIG. 14, the two short row bit vectors for the term "hadron" ($c_1$ and $c_2$) are initially intersected and the results may be saved. This allows the results from that intersection to be reused as will be discussed below. The results are further intersected with the two short row bit vectors for the term "large" ($a_1$ and $a_2$) and the results may be saved. This allows the results from the intersections of these four bit vectors to be reused as will be discussed below. Those results are further intersected with the short row bit vectors for the term "collider" ($d_1$ and $d_2$) and the long row bit vectors for each of those three terms ($A_3$, $C_3$, and $D_3$). A set of documents matching the terms "large," "hadron," and "collider" are found from these intersections.

Figure 15:
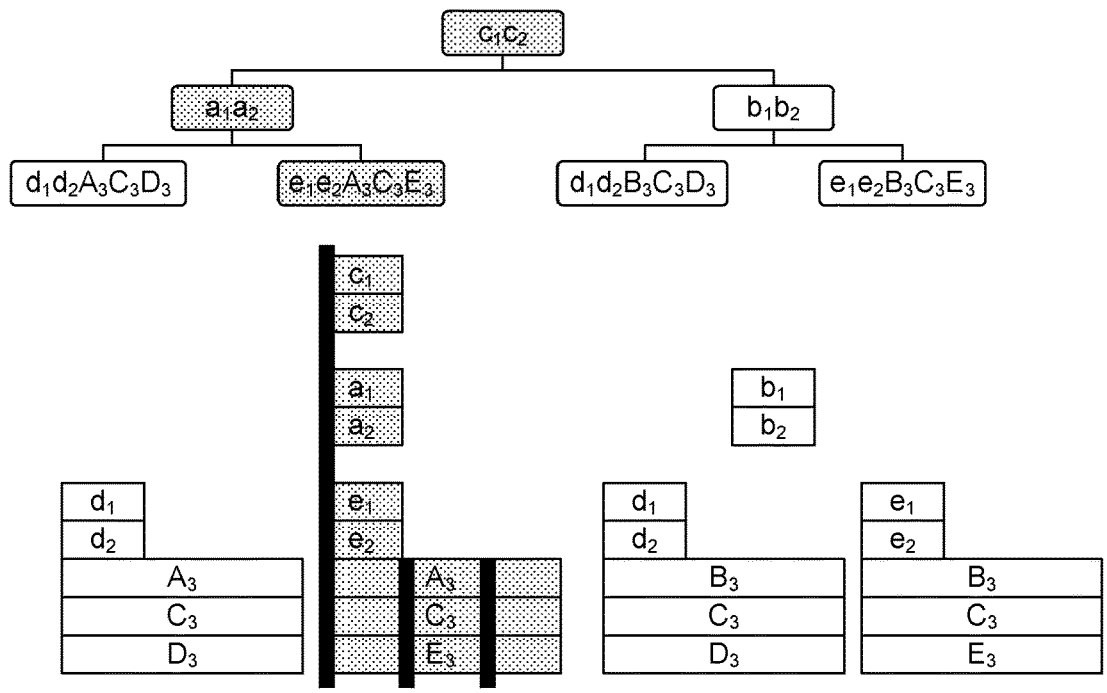

As shown in FIG. 15, the results from the intersections of the short row bit vectors for the terms "hadron" and "large" ($c_1$, $c_2$, $a_1$, and $a_2$) generated as discussed above with reference to FIG. 14 may be reused and intersected with the short row bit vectors for the term "collide" ($e_1$ and $e_2$) and the long row bit vectors for the three terms ($A_3$, $C_3$, and $E_3$). A set of documents matching the terms "large," "hadron," and "collider" are found from these intersections.

Figure 16:
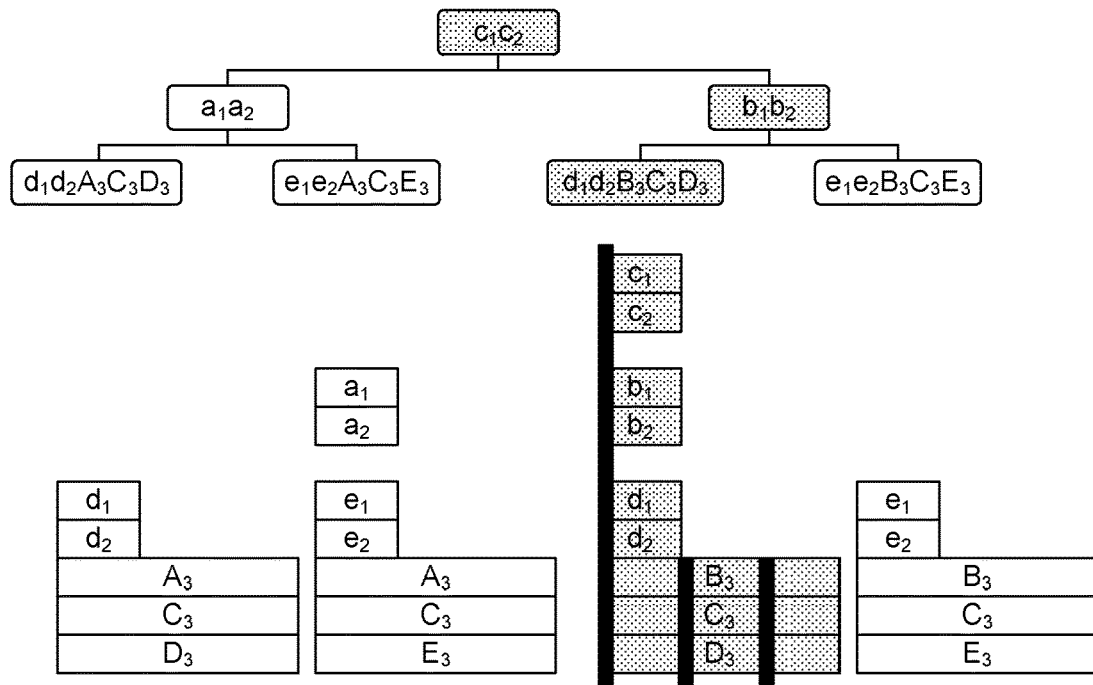

As shown in FIG. 16, the results from the intersections of the short row bit vectors for the term "hadron" ($c_1$ and $c_2$) generated as discussed above with reference to FIG. 14 may be reused and intersected with the short row bit vectors for the term "larger" ($b_1$ and $b_2$) and the results may be saved so they may be reused as will be discussed below. Those results may be further intersected with the short row bit vectors for the term "collider" ($d_1$ and $d_2$) and the long row bit vectors for the three terms ($B_3$, $C_3$, and $D_3$). A set of documents matching the terms "larger," "hadron," and "collider" are found from these intersections.

Figure 17:
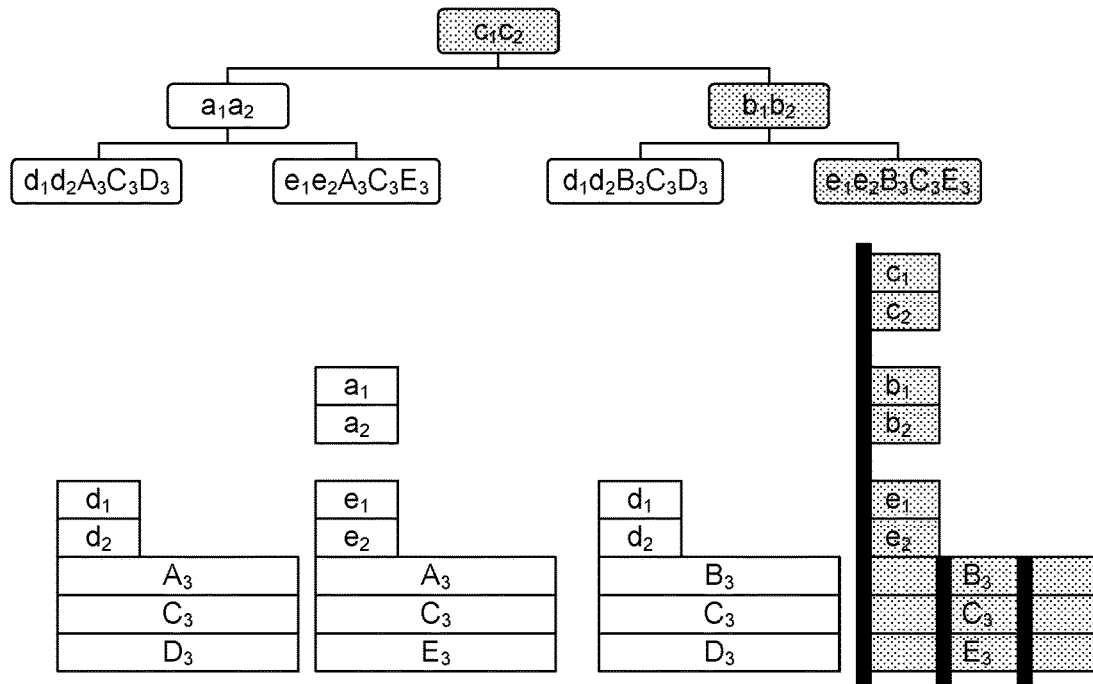

As shown in FIG. 17, the results from the intersections of the short row bit vectors for the terms "hadron" and "larger" ($c_1$, $c_2$, $b_1$, and $b_2$) generated as discussed above with reference to FIG. 16 may be reused and intersected with the short row bit vectors for the term "collide" ($e_1$ and $e_2$) and the long row bit vectors for the three terms ($B_3$, $C_3$, and $E_3$). A set of document matching the terms "larger," "hadron," and "collide" are found from these intersections.

Figure 18:
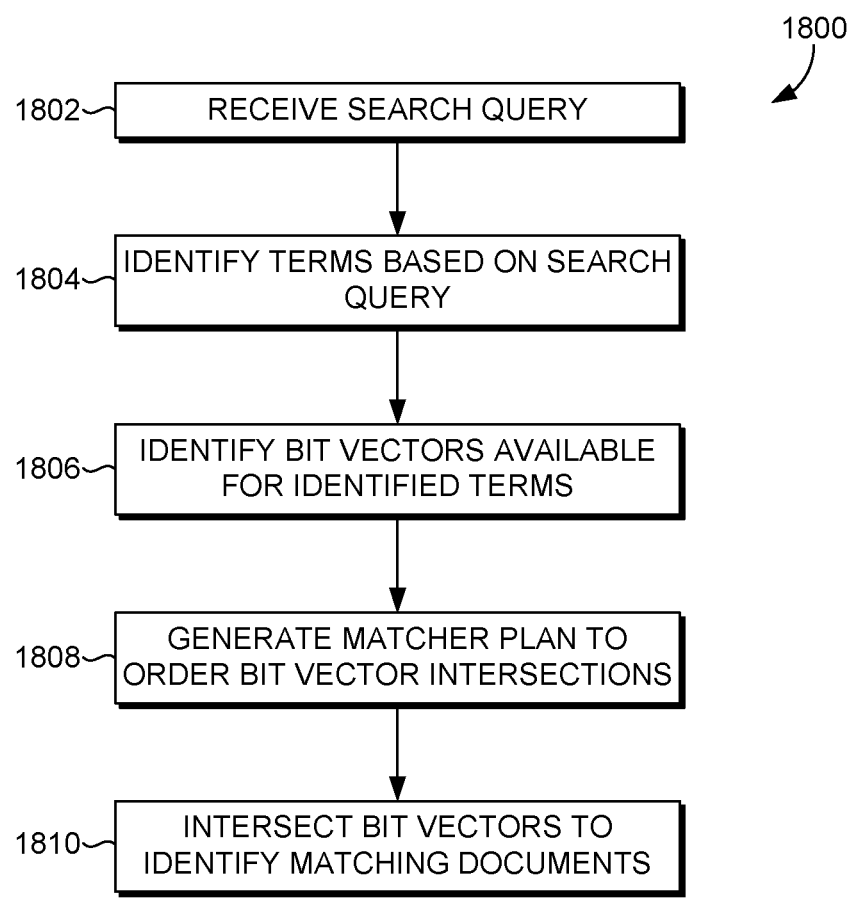
FIG. 18 is a flow diagram illustrating a method for a matcher to generate a matcher plan that provides an efficient order for intersecting bit vectors in accordance with an aspect of the technology described herein.

FIG. 18 provides a flow diagram that illustrates a method 1800 for a matcher, such as the matcher 4404 of FIG. 44, to generate a matcher plan that provides an efficient order for intersecting bit vectors. Initially, as shown at block 1802, a search query is received. Terms are identified from the search query, as shown at block 1804.

Available bit vectors corresponding to the one or more terms from the search query are identified, as shown at block 1806. Each term may be included in multiple bit vectors, and each bit vector or a subset of the bit vectors containing each term may be identified. This may involve, for instance, identifying how many short bit vectors are available for each term, the length of each short bit vector, and how many long bit vectors are available for each term.

A matcher plan is generated at block 1808 to provide an order for intersecting bit vectors for each of the terms. The order of the matcher plan may be generated to provide for efficient matching, as described above. For instance, short bit vectors may be intersected before long bit vectors. As another example, the bit vector intersections may be ordered with intersections common to multiple bit vector intersection combinations being performed first and the results of the intersections saved so they may be reused. The bit vectors are intersected at block 1810 to identify matching documents.

Compiling Query Plans to Machine Code

A matcher plan (or query plan) generated for a given search query may provide a tree of nodes with various operations, such as "and," "or," and "not" operations, and identify bit vectors to intersect. Running such a matcher plan may involve applying all those operations to identified bit vectors. One approach to processing the matcher plan may be to interpret the tree, meaning that the tree would be traversed and each node evaluated. However, there can be significant overhead in traversing that tree and evaluating each node. Consider a hypothetical example where the tree is interpreted. In such an example, there would be some cost associated with determining the type of each node as it is visited, which is a step necessary in understanding how to evaluate the node. There would also be some cost associated with storing and enumerating the set of children associated with each node. Each of those actions takes time to process and creates overhead.

The cost of the actual work done at nodes to intersect bit vectors is relatively small. For instances, the work may consist of only two instructions—ANDing a value into an accumulator and branching to terminate evaluation if the accumulator is zero. The cost of determining the node type and how many children nodes there are for the node is actually higher than the cost of the bit vector intersection. Therefore, this presents a circumstance in which the overhead of interpretation is greater than the actual work (i.e., intersecting bit vectors). Furthermore, to process the matcher plan, the tree may be evaluated many times (e.g., thousands or even millions of times) such that each node may be repeatedly analyzed during the processing, creating additional overhead.

To address this issue, the matcher plan may be compiled into machine language. In particular, a JIT (just in time) compiler may be used that processes a matcher plan to generate machine code. For example, in search systems that employ x64-based processors (e.g., XEON processors), the JIT compiler may compile the matcher plan to x64 code. The JIT compiler is done at the time a search query is received from a user. The process of performing a query in such configurations may comprise receiving a search query, generating a matcher plan based on the search query, and converting the matcher plan into machine code.

When a matcher plan is JIT compiled, the process may include walking over the matcher plan similar to the way an interpreter would. The fundamental difference, though, is the JIT compiler only examines each node once because it outputs the code the process should do as it walks over the tree. That code can then be repeatedly run (e.g., thousands or even millions of times) and running the code doesn't have the overhead of the evaluation method used by the interpreter.

Processors have a variety of resources available to them (e.g., bus between processor and memory, fixed size cache inside processor that holds data brought in from memory, certain number of processor cores with a certain number of transistors that can do a certain amount of work, etc.). Typically, for any give program, speed is limited by one of the resources. The reason it's limited by one of the resources is that as soon as it's limited by that resource, it's not going fast enough to be limited by the next most precious resource. Different programs are limited by different things. A fundamental limitation of big index search is accessing a lot of data. In general with processors that exist today, the fundamental limit is how quickly data can be moved through the processor by the memory bus. With posting lists, the complexity of the algorithm leads to a situation in which the CPU becomes saturated before the memory bus. A value of some aspects of the technology described herein is that the code is simple enough that data can be processed by the CPU faster than the memory bus can supply the data, and as a result, the memory bus can be saturated.

Thus, in some aspects of the technology described herein, one design goal may be to saturate the memory bus, which means there's a certain amount of information to bring into the algorithm and the goal is to have the system limited by the amount of information and the ability of the memory bus to bring in information to the processor. This design goal would avoid being limited by the overhead of processor instructions. In other words, the goal is to have the processor waiting on memory and not the other way around. Even though processors are getting more and more cores, it's still hard to keep the memory bus saturated, as the memory busses are getting faster and wider. As a result, the number of instructions between each memory bus access may be limited to as few as two or three instructions in order to saturate the memory bus. JIT compiling the matcher plan provides machine code that limits the number of instructions to help achieve this goal.

It should be noted that the use of JIT compilation to help achieve the design goal of saturating the memory bus may be useful in systems employing certain existing processors, such as XEON x64 processors. However, other hardware designs may be employed, such as field-programmable gate arrays. Because the cost structures of other hardware designs may be different, JIT compilation may not be as useful for those designs.

Query IDF Boosting

As discussed previously, search systems typically employ a matcher that identifies documents containing query terms (i.e., "matching documents") followed by a ranker that ranks at least some of the matching documents. One of the variables that impacts the run time of searches performed by such search systems is the number of matching documents returned by the matcher. If a large number of matching documents is returned, it may take an unacceptable amount of time to rank each of those documents.

Accordingly, the performance of a search system for a given query may be viewed as a function of the number of matching documents that may be returned by the matcher for the query. One way to view this is by reference to the IDF of the query. The IDF of a query may be determined by taking the logarithm of the total number of indexed documents divided by the number of matching documents for the query. For instance, a query that has an IDF of four would return one matching document out of every 10,000 documents in the corpus. For a given search query, the IDF of the query represents the number of possible matching documents from a corpus of documents.

A search system employing a search index with bit vectors in accordance with aspects of the technology described herein may perform well for search queries that result in an acceptable number or percentage of matching documents. What is considered an acceptable number or percentage of matching documents may be configurable based on the design optimizations of the search system. In some configurations, this corresponds to queries with an IDF of about 4 or greater (i.e., 1 in 10,000 or fewer documents match the queries). For such search queries, ranking may be inexpensive enough that the matcher may process the search queries and return matching documents without any modifications to the matching process.

For search queries that would return an unacceptable number or percentage of matching documents (e.g., queries with an IDF of less than 4), some configurations employ techniques to reduce the number of matching documents. These techniques are referred to herein as "query IDF boosting" as a reduction in matching documents for a search query results in a higher IDF for the query. A general technique that may be employed by some configurations to reduce the number of matching documents for a search query is to intersect one or more additional bit vectors during the matching process for the search query. These additional bit vectors are referred to herein as "strengthening row" bit vectors since the additional bit vectors strengthen the matching process by reducing the number of matching documents (i.e., boosting the IDF of the query).

In some aspects of the technology described herein, a strengthening row bit vector may be based on static rank of documents. As is known in the art, static rank refers to document ranking features that are independent of the search query. For instance, one static rank feature often used by search engines is ranking a document based on the number of other documents that contain hyperlinks to the document. The more links to the document may be viewed as being indicative of higher importance and therefore a higher rank. Because static ranks of documents are query independent, they can be determined at index generation time when information about a document is being added.

To support query IDF boosting, a bit vector may be added to the search index to identify documents that have the highest static rank in the document corpus. This static rank bit vector may be generated by determining the static rank of documents in the corpus. Based on the static rank, a certain number or percentage of documents with the highest static rank may be identified. For instance, the top 10% static rank documents may be identified or documents with static rank score above a selected static rank score threshold. A bit vector is generated in which bits are set for each of the highest static rank documents (e.g., the top 10% static rank documents), while bits are left cleared for the other documents (e.g., the remaining 90% of the documents). As such, when a search query is performed, if the matcher determines that an unacceptable number of matching documents will be returned, the matcher may also intersect the static rank bit vector. Since bits are set for only the highest static rank documents in the static rank bit vector, intersecting that bit vector will result in only documents from the highest static rank documents that match the terms in the search query to be returned as matching documents. In essence, using the static rank bit vector limits the pool of possible documents to the highest static rank documents.

Another query IDF boosting approach is to use strengthening rows for non-body information. Generally, terms for a document may be identified in variety of different locations. Terms may be identified from the body of the document, but terms may also be identified from other non-body locations. For instance, non-body locations for a document may contain anchor text (i.e., the text of a hyperlink within another document that links to the document), the URL of the document, the title of the document (i.e., the words that are presented in a title bar of a browser), and search information such as the terms of search queries that resulted in the document being selected from search results by a user and terms included in a snippet (i.e., summary/synopsis) of the document.

Non-body information is often viewed as providing a better indicator of relevance than body information. Accordingly, limiting a matcher to only non-body information reduces the result set while yielding documents are likely more relevant. In accordance with some aspects of the technology described herein, non-body information may be indexed in bit vectors. This may be done by identifying terms that appear in non-body locations and indexing those terms with information identifying the terms as non-body terms (i.e., terms appearing in a non-body location). As a result, the bit vectors index information identifies not only terms generally (i.e., terms from body and non-body locations) but also non-body terms (i.e., terms only in non-body locations). The general terms and non-body terms may be distributed throughout the search index. For instance, a particular bit vector may include both general terms and non-body terms.

In accordance with some aspects of the technology described herein, when a search query is performed, the matcher initially intersects bit vectors for general terms (i.e., terms from body and non-body locations) corresponding to terms from the query to estimate the number of matching documents that will be returned. If the matcher estimates that an unacceptable number of matching documents will be returned, the matcher identifies and intersects bit vectors for non-body terms corresponding to terms from the query. In essence, this limits the matching documents to documents that contain the query terms in non-body locations.

Figure 19:
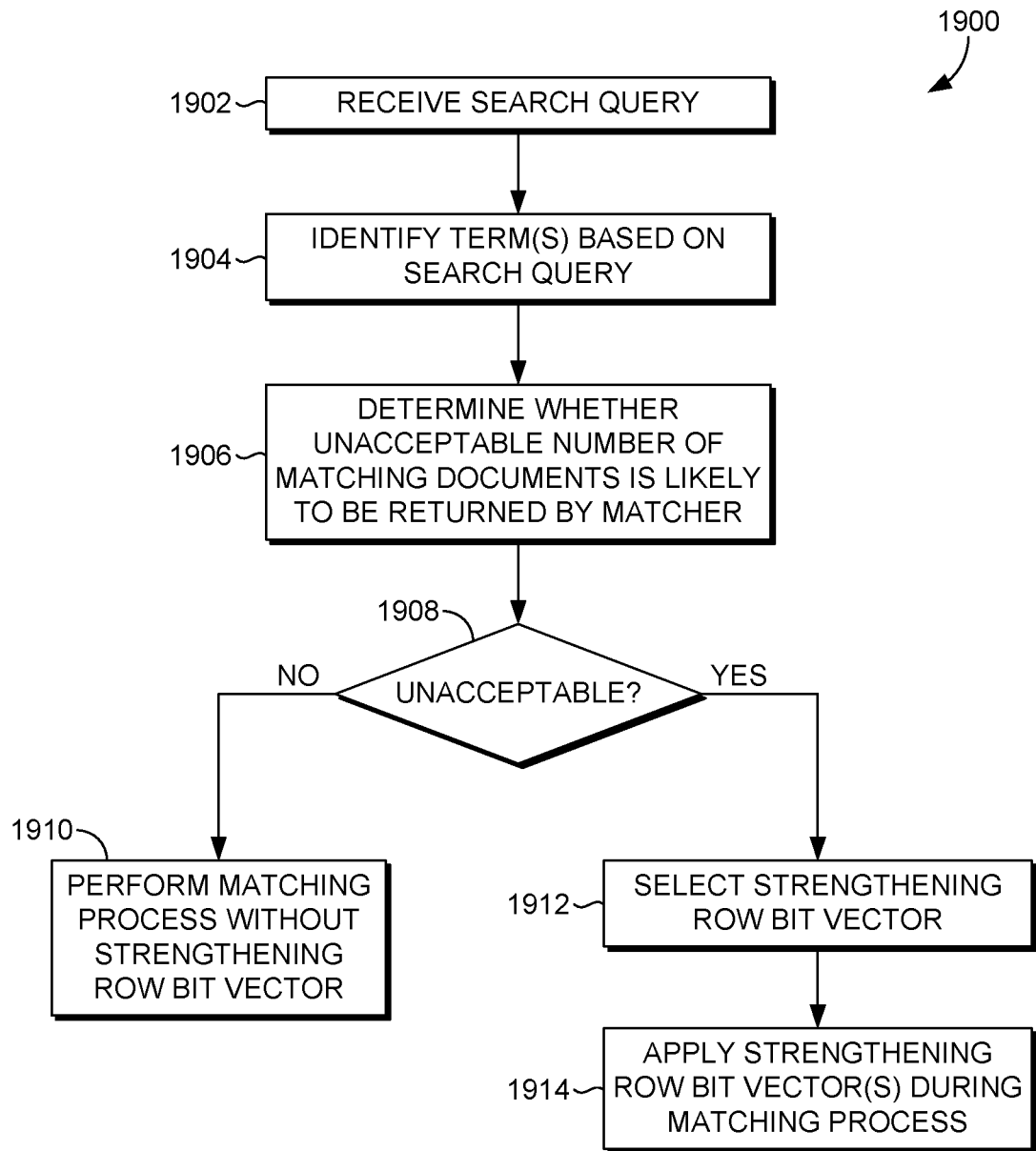
FIG. 19 is a flow diagram illustrating a method for matching documents using strengthening rows in accordance with an aspect of the technology described herein.

Referring to FIG. 19, a flow diagram is provided that illustrates a method 1900 for matching documents using strengthening rows. The method 1900 may be performed at least partially, for instance, using the matcher 4404 of FIG. 44. As shown at block 1902, a search query is received. One or more terms are determined based on the search query, as shown at block 1904. The one or more terms may comprise terms explicitly set forth in the search query and/or terms determined based on terms in the search query (e.g., misspellings, alternative forms, synonyms, etc.).

A determination is made at block 1906 regarding whether the matcher is likely to return an unacceptable number of matching documents for the search query. The determination may be based on any combination of methods in accordance with different aspects of the technology described herein. In some configurations, the determination is based on the IDF of terms from the search query. In some configurations, the determination is based on sampling. As an example to illustrate, the determination may be made by beginning the matching process by identifying bit vectors for the terms identified at block 1904 and intersecting those bit vectors. The bit vectors identified and intersected at this point may include bit vectors with general terms (i.e., terms from body and non-body locations) corresponding to the terms identified at block 1904. During the matching process, the number of matching documents likely to be returned may be estimated based on the percentage of documents being returned as matching. This could involve running the full plan over a fraction of the index and then using the observed match rate to predict a total number of matches that would be returned if ran over the entire index.

If it is determined at block 1908 that an acceptable number of matching documents is likely to be returned, the matching process may be performed without using any strengthening row bit vectors to reduce the number of matching documents, as shown at block 1910. Alternatively, if it is determined at block 1908 that an unacceptable number of matching documents is likely to be returned, one or more strengthening row bit vectors may be selected at block 1912 and intersected to reduce the number of matching documents, as shown at block 1914.

Any number and type of strengthening row bit vectors may be selected and intersected. For instance, a static rank bit vector may be selected and intersected to restrict possible matching documents to the top static rank documents. As another example, bit vectors having non-body terms corresponding to the terms identified at block 1904 may be intersected to restrict possible matching documents to documents that contain the terms in non-body locations. This may be done for all terms identified at block 1904 or only a subset of the terms. It should be understood that other types of strengthening row bit vectors may be selected and intersected during the matching process to reduce the number of matching documents.

In some aspects of the technology described herein, the number and/or type of strengthening row bit vectors to intersect may be selected based on the estimated number of matching documents. Also, different terms may have more or less strengthening rows compared to other terms from the search query. Different strengthening row approaches may provide different reductions in matching documents. For queries that will likely result in a higher number of matching documents, strengthening rows that provide a greater reduction of matching documents may be selected. For instance, based on the estimated number of matching documents, a static rank bit vector, one or more bit vectors with non-body terms, or both a static rank bit vector and one or more bit vectors with non-body terms may be selected and intersected.

While the method 1900 of FIG. 19 shows only a single determination regarding whether the number of matching documents is likely to be unacceptable, the determination may be made repeatedly as the matching process continues. For instance, an initial determination may indicate that an acceptable number is likely to be returned. However, upon further matching, it may be determined that an unacceptable is now likely, and strengthening rows may be selected based on that redetermination.

Some search queries may have such low IDFs (i.e., return a particularly large number of matching documents) that strengthening row approaches may not sufficiently limit the number of matching documents. For such search queries, the search engine may cache search results for those search queries. Therefore, when a search query is received that is cached, the cached search results are simply retrieved.

Accordingly a variety of different techniques may be employed during the matching process to control the number of matching documents returned. The techniques may be selected based on an estimated number of matching documents determined for the given search query. By way of example only and not limitation, one specific configuration employs different techniques for search queries based on different ranges of IDF. In this example configuration, search queries with an IDF less than 2, cached results are used. For search queries with an IDF between 2 and 3, a static row bit vector and one or more bit vectors with non-body terms are intersected. For search queries with an IDF between 3 and 4, bit vectors with non-body terms are intersected. Finally, for search queries with an IDF over 4, the matching process is performed without any strengthening row bit vectors being added to reduce the number of matching documents.

Phrases in Search Index

Some search queries include specific phrases. Phrases are an important concept for search engines because documents that have a collection of terms in different locations of the documents may not be as relevant as documents that contain the phrase. For instance, consider the phrases: "The The" (a band) and "to be or not to be." While the terms included in these phrases are common, the phrases themselves are considerably rarer.

Generally, if information is not indexed that allows for the identification of phrases in documents, the matcher may identify documents that contain the terms of the phrase but not the phrase. If the ranker also doesn't consider phrases, the documents without the phrase may by ranked higher than other documents that contain the phrase although the documents that contain the phrase may be considered better results from the user's perspective. Additionally, if not limited to a maximum number, the number of documents sent by the matcher to the ranker may be large, resulting in an unacceptable amount of time to rank all the documents. Alternatively, if a limit is placed on the number of documents sent to the ranker, the matcher may select documents that contain the terms in different locations while excluding documents that contain the phrase.

A posting list system has the option to use positional posting lists that store information regarding not only the presence of a term in a document but the position of the term in the document. Therefore, phrases may be identified by using the position information to determine words are adjacent and therefore form a phrase. However, a large amount of storage is required to store the positional information, and it is CPU intensive to collate the positions of terms to discover phrases.

The bit vector approach employed by aspects of the technology described herein does not store positional information in the index and therefore cannot identify phrases using the same approach as in a positional posting list system. As a result, aspects of the technology described herein may instead store phrases in bit vectors to allow for the identification of documents that contain phrases set forth in search queries. As used herein, a phrase refers to any combination of two or more words, such as an n-gram, an n-tuple, a k-near n-tuple, etc. An n-gram is a sequence of "n" number of consecutive or almost consecutive terms. An n-gram is said to be "tight" if it corresponds to a run of consecutive terms and is "loose" if it contains terms in the order they appear in the document, but the terms are not necessarily consecutive. Loose n-grams are typically used to represent a class of equivalent phrases that differ by insignificant words (e.g., "if it rains I'll get wet" and "if it rains then I'll get wet"). An n-tuple, as used herein, is a set of "n" terms that co-occur (order independent) in a document. Further, a k-near n-tuple, as used herein, refers to a set of "n" terms that co-occur within a window of "k" terms in a document.

Phrases may be stored in bit vectors similar to the discussion above for terms. As a result, each bit vector in an index may store any combination of terms and phrases. A difference between phrases and terms, though, is that phrases don't need to be stored in as many bit vectors as for terms. Instead, a phrase may be stored, for instance, in a single short row bit vector. Because a phrase contains information that overlaps significantly with the terms in the phrase, intersecting the bit vectors for the terms and a bit vector for the phrase may allow for identification of documents containing the phrase. This is based on the concept of strengthening row bit vectors discussed above with reference to query IDF boosting. For phrases, a weaker query would be simply intersecting bit vectors for the individual terms. However, the query may be strengthened by also intersecting one or more bit vectors for the phrase. This makes phrases inexpensive to store in a search index using bit vectors and provides an advantage over other approaches, such as positional posting lists, which require a significant amount of storage to account for phrases.

FIG. 20A provides an example to illustrate the concept of using bit vectors containing a phrase as strengthening row bit vectors. The present example illustrates a query for the phrase "easy street." The terms "easy" and "street" are both very common with an IDF of 1.27 and 1.14, respectively. Because the terms are common, they don't need many bit vectors to encode information for the terms. In the present example, a rule of thumb in which the number of bit vectors for a term is the IDF rounded up has been used such that the terms "easy" and "street" are each included in two bit vectors. Additionally, each term is included in one short row bit vector and one long row bit vector.

The phrase "easy street" is less common with an IDF of 4.07. If the same rule of thumb were used, the phrase would be included in five bit vectors, consisting of four short row bit vectors and one long row bit vector. If that many bit vectors were used for phases, a considerable amount of storage would be required for phrases. However, the bit vectors for "easy street" have a lot of commonality with the bit vectors for "easy" and the bit vectors for "street."

As shown in FIG. 20B, if a query is performed for "easy street," the bit vectors for "easy" and "street" are used since, at a minimum, documents matching the query must contain those terms. As can be seen in FIG. 20B, the bit vectors from those terms provide intersections of four bit vectors, which is sufficient to remove noise. As a result, five bit vectors for "easy street" are not needed to identify matching documents. Instead, only two bit vectors are used to identify matching documents containing the phrase "easy street." Therefore, the search index doesn't need store the three bit vectors 2006, 2008, 2010 for the phrase "easy street." Instead, the search index only stores the two short row bit vectors 2002, 2004.

Shards in Search Index

Documents indexed by search engines typically vary greatly in length, where length of a document is measured by the number of unique words in the document. On one end of the spectrum, a document may contain only a single word; while on the other end of the spectrum, a document (e.g., a dictionary) could conceivably have almost every word. In the context of using bit vectors to index documents, short documents have a small percentage of bits set across the bit vectors, while long documents have a large percentage of bits set. One issue that is created for bit vectors is that efficiencies are lost when dealing with documents of sufficiently varying length. The desired bit density is achieved for one length only. Too much variance in document length drives bit density to be too high in some places and too low in others.

Figure 21:
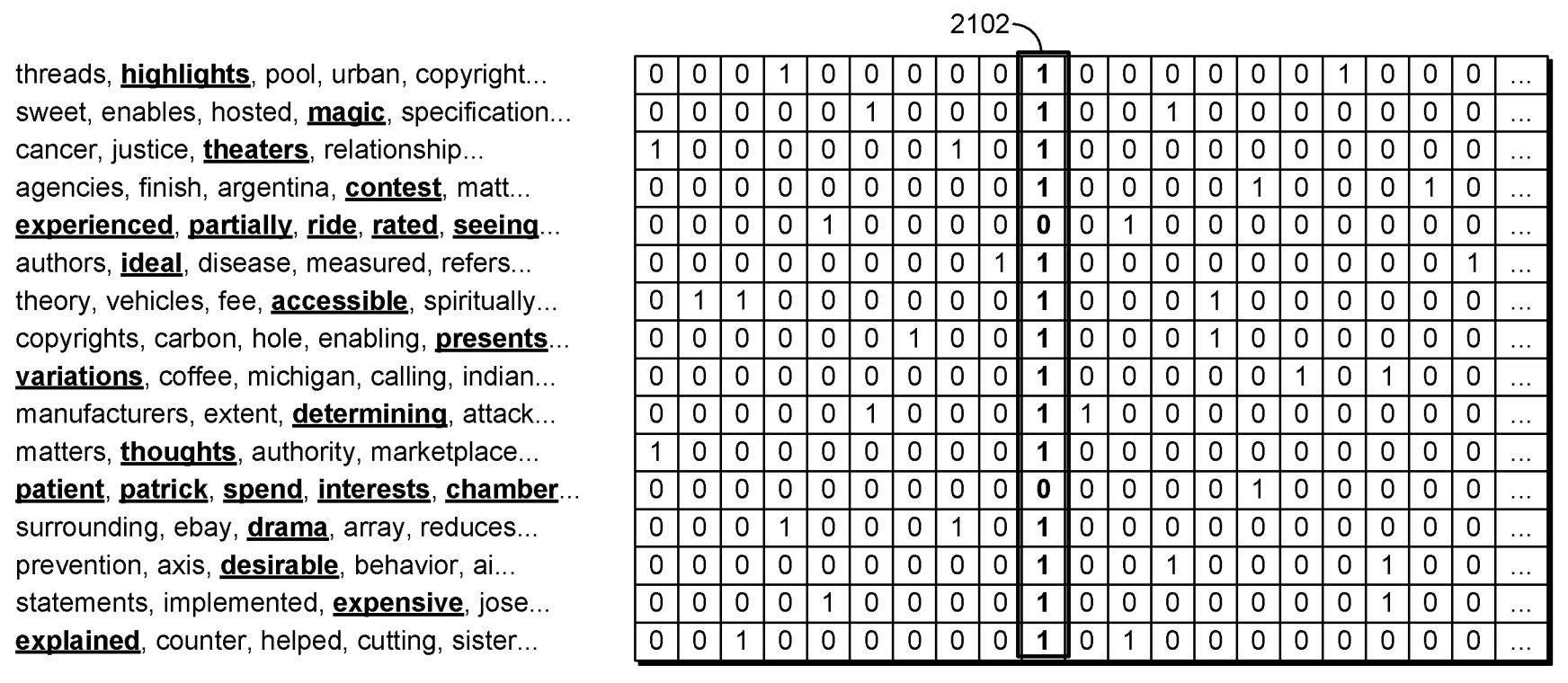

By way of illustration, FIG. 21 illustrates a portion of a search index showing only long row bit vectors (i.e., one document per bit). The highlighted column 2102 corresponds to a long document. As can be seen in FIG. 21, almost all bits are set based on the presence of the underlined terms, which appear in the document. Although most of the bits are set for the long document, there are many terms (i.e., the non-underlined terms in FIG. 21) that are not present in the document. As a result, search queries that include terms not in the document (i.e., the non-underlined terms in FIG. 21) but sharing a bit vector with a term in the document will match to the long document even though the long document is not a true match for the term. As can be understood, the likelihood of false positives goes up with documents that create greater than target bit density.

Some configurations address this issue of varying document lengths by breaking/partitioning the index into different sections or "shards" of the search index. Each shard indexes documents with lengths corresponding to a different range of document length. For instance, documents with 0-100 terms may be assigned to a first shard, documents with 101-200 terms could be assigned to a second shard, documents with 201-300 terms could be assigned to a third shard, etc.

By providing different shards, documents within each shard are within a range of document length that prevents inefficiencies created by a wide discrepancy in document length. Each shard may have different term assignments to bit vectors to control bit densities in each column (i.e., the percentage of bits sets in each column). On shards with longer documents, fewer terms may be shared in bit vectors to control the column bit density. In other words, the longer shards may have fewer terms per bit vector. Conversely, on shards with shorter documents, more terms may be shared in bit vectors (i.e., higher terms per bit vector).

FIG. 22 illustrates a method 2200 for generating shards for a search index using bit vectors. The method 2200 may be performed at least partially, for instance, using the indexer 4418 of FIG. 44. As shown in block 2202, the number of shards to use is determined. Additionally, as shown at block 2204, the range of document lengths is determined for each shard. Although the determination of the number of shards and the range of document lengths for each shard are shown as separate blocks in FIG. 22, it should be understood that those design parameters may be determined in a single process. Based on the document length ranges, documents are assigned to each shard according to their lengths, as shown at block 2206. The search index is generated by storing bit vectors for each shard on computer storage media, as shown at block 2208. Each shard stores bit vectors that index terms for documents having document lengths within the document length range for each shard.

In some configurations, the determination of the number of shards to employ and the document length range of each shard may be based on two considerations. The first consideration is that there is a fixed overhead per shard as each query needs to be performed on each shard. As such, it is undesirable to have too many shards.

The second consideration is that there is cost associated with the amount of storage wasted by having documents of varying length. In particular, given a desired column bit density (e.g., 10%), if the longest document in a shard yields the desired column bit density (i.e., 10%), the shorter documents will have a lower column bit density. Any document with a column bit density below the desired column bit density represents wasted storage. The greater the variation in document length in a shard, the greater the amount of wasted storage.

A cost function may be generated as a function of the two above considerations. In particular, the cost function is calculated as the number of shards multiplied by some weight factor plus the cost of wasted storage created based on varying document lengths in each shard. The weighting applied to the number of shards may be configurable based on the relative importance of the cost of processing required for additional shards (i.e., a speed cost) versus the cost of wasted storage from having larger variations in document lengths in the shards (i.e., a storage cost). The cost of wasted storage may be computed, for instance, as an approximation based on the total memory consumed (Longest Length·Number of Documents) or more particularly using the following equation:

$$\text{Longest Length·Number of Documents} - \Sigma \text{Document Lengths} \quad \text{Equation 3:}$$

Solving the cost function may be viewed as an optimization problem. As such, a variety of different algorithms may be employed to solve the cost function to optimize the number of shards and the range of document lengths for each shard. In some configurations, the cost function is solved as an all pairs shortest path problem.

When a search is received, a query may be performed on each of the shards. The query on each shard returns a set of documents, which are combined to provide a set of matching documents.

In some configurations, some of the work of preparing the query for each shard may be shared. Generally, bit vectors for the same terms are intersected for each of the shards. The main difference among the shards is the mapping of terms to bit vectors. For instance, a term in one shard may be included in three bit vectors. For another shard, the term may be included in seven bit vectors that are completely different from the bit vectors in the first shard. Because the main difference for querying the different shard is the mapping of terms to bit vectors, the structure of the query and the query processing prior to converting terms to actual bit vectors may be reused across the shards.

FIG. 23 illustrates a method 2300 for performing a search using multiple shards. The method 2300 may be performed at least partially, for instance, using the matcher 4404 of FIG. 44. As shown at block 2302, a search query is received. One or more terms are identified for the search query, as shown at block 2304. The one or more terms may comprise terms explicitly set forth in the search query and/or terms determined based on terms in the search query (e.g., misspellings, alternative forms, synonyms, etc.).

A generic query plan is generated based on the identified terms, as shown at block 2306. The generic query plan may generally set forth a process for intersecting bit vectors containing terms from the search query. The generic query plan is converted to a shard specific query plan for each shard, as shown at block 2308. Each shard specific query plan is then performed on each corresponding shard to identify matching documents for the search query, as shown at block 2310.

Converting the generic query plan into each shard specific query plan is similar through most stages on each shard. Generally, after the query is parsed, a set of terms is identified and the terms are mapped to a set of bit vectors for each shard. The main thing that's different between the shards is the mappings from terms to bit vectors are different. For example, a term in one shard may be in three bit vectors (e.g., row 7, 10, and 15). In another shard, the term may appear in 10 bit vectors, which may be totally different rows from the first shard. Everything before converting terms to rows may be reused across all the shards. Even if the mappings from terms to rows are different across the shards, the structure of the query may remain the same. In other words, for every term, there is a set of short row(s) and long row(s) and the way the short rows are pulled to the left and the long rows to the right is the same across the shards although the number of rows and the identifier of rows are different.

In some configurations, the generic query plan may include a maximum number of short rows for each term and a maximum number of long rows for each term. The planner may initially be run without a specific mapping between terms and rows (rows are essentially virtual rows with no mapping to physical rows in index). The plan for a specific shard may be generated by replacing each of these virtual rows with a physical row specific for that shard. On each different shard, a different set of physical rows would be used. When the generic query plan has a maximum number of short and long rows, not all shards may use all of these virtual rows (i.e., plan rows). To address this, as virtual rows are replaced with physical rows, unused virtual rows are replaced with physical rows that do not impact semantics of the Boolean expression of the query may be used as filler rows. For example, physical rows that have all ones or duplicates of one or more of the physical rows already included could be used for those extra rows.

So a generic query plan can very quickly be customized for each of the shards. In some configurations, the matching engine gets two inputs: code that's been compiled that runs and a table that has pointers to all the rows it should use for a given shard. Therefore, "customizing" a generic plan for each shard may simply involve providing a different table of rows for each shard (i.e., the same code is used for each shard). In this way, the entire query pipeline all the way down to the matcher may be generic with respect to shards with the difference between shards being expressed as a table with pointers to rows. As a result, much of the planning work is reused.

One cost of the above approach of reusing the query plan for the shards is that the generic query plan may reference more rows than actually needed for some shards since the generic query plan is intended to accommodate the maximum number of rows a shard may need, which means for some shards, there is some wasted effort to intersect placeholder or filler rows that are all ones or are duplicates of previously used rows. However, this may be acceptable for a number of reasons. The cost of the matcher is mainly scanning the first few (e.g., four) rows, such that additional row scanning/intersections don't add significant cost. Additionally, if the approach simply reuses the row used last, cost of intersecting that row is low because the row is already in the processor cache.

Band Table

The frequency with which each term appears in a document corpus may vary widely. Some terms are extremely common, while other terms are extremely rare, even to the point of appearing once in the document corpus. As discussed previously, the number of bit vector intersections required for a given term to reduce noise to an acceptable level varies with term frequency. Generally, common terms (i.e., terms with a high frequency in the document corpus) need fewer bit vector intersections, while rare terms (i.e., terms with a low frequency in the document corpus) need more bit vector intersections.

When building a bit vector search index, a number of different approaches may be taken for determining the bit vector configuration for terms in accordance with various aspects of the technology described herein. As used herein, the "bit vector configuration" for a term sets forth the number and length of bit vectors used for the term. The bit vector configuration may also identify the class(es) of storage (e.g., RAM, SSD, and/or HDD) on which to store each bit vector in the configuration.

One approach that may be employed is a "one size fits all" approach in which all terms have the same bit vector configuration. However, this approach has some drawbacks. In particular, if the "one size fits all" bit vector configuration specifies a higher number of bit vectors to account for low frequency terms, storage is wasted as the higher number of bit vectors is not needed for higher frequency terms. For instance, suppose the rarest term in the index needs 10 bit vectors to adequately reduce noise for the term, and consequently 10 bit vectors are used for each term in the index. If the number of bit vectors needed for more common terms is much smaller, then using 10 bit vectors for each of those common terms wastes storage.

Alternatively, if the "one size fits all" bit vector configuration specifies a lower number of bit vectors, lower frequency terms may not have a sufficient number of bit vectors to adequately reduce noise. For instance, suppose the most common term only needs two bit vectors. For less common terms, using only two bit vectors would not adequately reduce noise and there would be an unacceptable number of false positives for those terms.

Another approach is using a custom bit vector configuration for each term. In other words, each term is treated individually when assigning bit vector configurations to the terms. While this is possible and may be employed in some aspects of the technology described herein, particularly when indexing a small corpus of documents with fewer distinct terms, it may not be practical for very large document collections with a large number of distinct terms. For instance, when dealing with a very large number of terms, the data structure required to map each term to its custom bit vector configuration would be massive.

Still another approach is to assign bit vector configurations to groups of terms clustered into different bands (i.e., equivalence classes) based on term characteristics and assigning a particular bit vector configuration to each band. In other words, a "band" is a group of terms that have similar enough term characteristics to be assigned the same bit vector configuration. For instance, the bit vector configuration for one band may specify two rank-6 bit vectors, one rank-3 bit vector, and one rank-0 bit vector. Each term that has characteristics matching those of that band will use that bit vector configuration. As used herein, a "band table" may be used to store mappings of term characteristics to bit vector configurations for each band employed by the search index. Any number of band tables may be employed by a search index. Additionally, any data structure may be used to store the mappings for the band table.

Any term characteristic that impacts the number and/or length of bit vectors and/or the class of storage used to store the bit vectors for each term may be used to define the bands. In some aspects of the technology described herein, the term characteristics may also be used at runtime when performing a query, and therefore the term characteristics may be limited to ones that may be quickly determined.

By way of example only and not limitation, bands may be defined by the following term characteristics: classification, gram size, IDF, IDF sum, and tier hint. Classification refers to the term's location in a document (sometimes referred to as the "stream"). These may include, for instance, the body, non-body, and metawords (words not displayed but added to/indexed with a document to provide metadata about the document such as the document's language). Gram size refers to the number of words for the term (e.g., one for a single-word term, two or more for a phrase). IDF refers to the term's frequency. Because each shard indexes a different collection of documents, the frequency of a particular term may vary among the shards. In some configurations, it is only feasible to determine the exact term frequency or a good approximation of the term frequency is only determined for the most common terms. For other terms, it is assumed that the term frequency is below some threshold term frequency, and this threshold term frequency is used a proxy for the term's frequency. The IDF sum is used for phrases to approximate the frequency of the phrases. It may be impractical to determine the actual frequency of all phrases. Instead, some configurations may combine the frequencies of the individual terms in the phrase to provide the IDF sum for the phrase. This is an approximation which serves to help partition phrases into groups. Tier hint is used to represent how frequent a term appears in search queries. This may help determine the class of storage to use. For instance, some terms are common in documents but rarely used in search queries. Rows for these terms may be stored on slower storage. It should also be noted that in configurations using shards, each shard may have a different term distribution so a given term may have a different bit vector configuration in each of the shards.

The bit vector configuration assigned to each band is configurable based on various design goals for the search index. In some configurations, the design goals may include balancing index storage consumption with relevance. Generally, increasing the number of bit vectors in bands increases relevance by allowing for more bit vector intersections to reduce noise but increases the storage requirements for the search index. Conversely, reducing the number of bit vectors for bands reduces storage but also reduces relevance.

Given these tradeoffs between storage and relevance, one approach to assigning the bit vector configurations to bands is to attempt to minimize total storage consumption while ensuring that relevance does not fall below some threshold. This may be viewed as a cost/benefit optimization problem in which the cost is the amount of storage consumed and the benefit is the relevance provided. While the cost of storing extra bit vectors is reasonably linear, the additional benefit provides rapidly diminishing returns after a point.

For a given bit vector configuration assignment to bands, the amount of storage consumed is relatively easy to compute for a corpus. The number of terms in a band may be approximated based on the frequencies of terms associated with the band. Additionally, the number of postings the terms contribute may be determined based on the frequency (e.g., IDF) of the terms. Given a particular bit vector configuration assignment to the bands, the amount of storage may be determined based on the number of postings in each band and the bit vector configurations in each band.

The relevance metric may be determined in a number of different ways in various aspects of the technology described herein. Relevance may be determined as an aggregate value, such as an average, observed in the context of a statistically significant corpus and a statistically significant query log. However, relevance may also consider minimum values, variances, nth-percentile values, and even complete distributions.

In some aspects of the technology described herein, the relevance metric may be based on the false positive rate expected for a given bit vector configuration assignment to the bands. The false positive rate reflects the number or percentage of matching documents expected to be returned by the matcher that don't actually match the query in the sense that the documents don't contain one or more terms from the query. For instance, if the bit vector intersections for a query yield 100 matching documents (i.e., 100 1-bits result from the intersections) and 20 of those matching documents are not actual matches, the false positive rate is 0.2 or 20 percent. The matching documents that are true matches are referred to herein as valid matching documents, while the matching documents that are not true matches are referred to herein as invalid matching documents.

While the false positive rate may be used as the relevance metric in some configurations, the false positive rate has some drawbacks. Generally, the false positive rate applies to the matcher only and may be inadequate for predicting end-to-end pipeline relevance. For example, the false positive rate doesn't account for matcher designs that limit the number of matching documents returned for each query. In instances in which the number of matching documents available in a corpus for a query is below the maximum number of documents returned by the matcher, the false positive rate will be high despite an appropriate result of matching documents. For instance, suppose a matcher is designed to return no more than five matching documents per query. In instances in which a query includes one or more rare terms, there may be only one matching document in the entire corpus. However, because the matcher is designed to return five matching documents, four of those documents are necessarily invalid matches. As a result, the false positive rate would be 80% although the matcher could not have returned a better set of matching documents.

The false positive rate also doesn't account for valid matching documents that are displaced by invalid matching documents. For instance, suppose again that a matcher is designed to return five matching documents for every query. In one instance, suppose a corpus has five matching documents for a first query and the matcher returns four valid matching documents and one invalid matching document for the first query. In another instance, suppose the corpus has four matching documents for a second query and the matcher returns the four valid matching documents and one invalid matching document for the second query. In both instances, the false positive rate is the same (20%). However, for the first query, one valid matching document was displaced by an invalid matching document; while for the second query, no valid matching documents were displaced. Although the false positive rates are the same, the set of matching documents from the second query present better relevance than the set of matching documents for the first query.

Accordingly, some configurations employ an error rate based on the fraction of valid matching documents that could have been returned by the matcher but were displaced by invalid matching documents. This error rate may serve as a better proxy for predicting overall pipeline relevance than the false positive rate. For instance, in the example above in which there is only one valid matching document in the corpus and the matcher must return five matching documents, the false positive rate was 80%. However, the error rate based on displaced valid matching documents would be zero, which more accurately reflects the relevance. In the example above in which a first query has one valid matching document displaced and the second query has no valid matching documents displaced, the false positive rate was 20% for both queries. However, the error rate based on displaced valid matching documents would be 20% for the first query and zero for the second query, which more accurately reflects the relevance.

In some aspects of the technology described herein, the search system may be configured such that an additional verification step is performed in which valid matching documents are retained and invalid matching documents are removed. This would remove the false positives returned by the matcher. For instance, the matcher could be configured to allow for a greater number of matching documents to be provided to the additional verification step. This may be acceptable if the verification step does not consume too much additional storage and/or require too much additional processing time. In such configurations, the relevance metric may be based on a "fix-up cost," which is the cost in additional storage and/or processing time required to identify and remove the invalid matching documents.

In order to optimize the bit vector configuration assignments to bands, a cost function may be employed that is a weighted sum of a relevance metric (e.g., false positive rate; error rate; fix-up cost; or other metric) and storage requirements. The weighting applied is configurable based on the relative importance of relevance and storage to the design of the search system. A variety of optimization algorithms may be employed that use the cost function to optimize the bit vector configurations assigned to each band. For instance, in some configurations, a gradient descent algorithm may be employed to quickly converge on a reasonable/locally optimal set of bit vector configuration assignments to bands.

FIG. 24 provides a flow diagram showing a method 2400 for generating a data structure, such as a band table, mapping term characteristics to bit vector configurations. As shown at block 2402, term characteristics are assigned to each of a number of bands. Additionally, as shown at block 2404, bit vector configurations are assigned to each band. The term characteristics and/or bit vector configurations may be assigned to each band as discussed hereinabove. For instance, a cost function may be employed to assign bit vector configurations to each band in manner that is optimized for design goals of balancing storage consumption with a relevance metric. A data structure is generated at block 2406 that maps term characteristics to a bit vector configuration for each band. The data structure may be used to identify bit vector configurations for terms for a number of purposes, such as, for instance, generating a bit vector-based search index, indexing information about documents in the search index, and accessing bit vectors for terms during a matching process for a search query.

Term Table

In addition to assigning bit vector configurations to terms, bit vector locations in storage are mapped to terms to allow for both indexing documents and performing queries in accordance with aspects of the technology described herein. When indexing a document, terms are identified in the document and the bit vector locations for those terms need to be identified to set the bits in the column for the document. When performing a search query, terms are identified from the query and the bit vector locations for those terms need to be identified for retrieving the bit vectors to perform bit vector intersections. Accordingly, in either case, given a term, the storage location of the bit vectors for the term need to be identified.

While the bit vector configuration for a term identifies the number and length of bit vectors to use for the term (and possibly the class of storage to use), a mapping can be used that identifies the actual/specific storage locations for those bit vectors. For instance, a bit vector configuration for a term may indicate to use three rank-6 bit vectors, 1 rank-3 bit vector, and 1 rank-0 bit vector. The mapping associates the term (or its hash) with the storage locations for each for those five bit vectors. The mapping of storage locations for terms is referred to herein as a "term table." Any number of term tables may be employed by a search index. Additionally, any data structure may be used to store the mappings for the term table.

One approach for mapping storage locations for terms is to provide explicit mappings that identify specific bit vector locations in storage for each indexed term. For a given term, an explicit mapping associates a term (or its hash) with bit vector identifiers, which may be pointers to locations in storage for the bit vectors for the term. If an explicit mapping is used for a term, identifying the bit vector locations for the term when indexing a document or performing a query involves looking up the mapping for the term and retrieving the specific bit vector locations identified by the mapping.

While it's possible to provide explicit mappings for all terms, especially for search indexes for a smaller set of documents with a smaller number of terms, it may be impractical to include explicit mappings for all terms in larger search indexes containing a large number of terms. Accordingly, another approach in some configurations is to not include explicit mappings for at least some terms, but instead use an "ad hoc" approach, in which algorithms are employed to derive the bit vector locations for terms. In accordance with some aspects of the technology described herein, algorithms are provided for each band that are used to determine bit vector locations based on a derivative of the term's hash. For instance, if the bit vector configuration for a band specifies three bit vectors, three algorithms may be provided that are each a function of the hash of a term. Accordingly, to find bit vector locations using an ad hoc approach for a term, the term's band is determined based on characteristics of the term, and algorithms specified for that band then may be employed to determine bit vector locations for the term. The algorithms for each band may be stored in the band table, term table, or some other data structure. The algorithms for a band may simply be different hash functions that are uncorrelated in the sense that if the various hash functions are applied to the same input value (i.e., the same term), there's a high probability a different result will be returned for each of the hash functions.

Some configurations employ both explicit mappings and an ad hoc approach for different terms in the search index. In particular, explicit mappings may be used for the most common terms in the search index, while an ad hoc approach may be used for the remaining terms.

Figure 25:
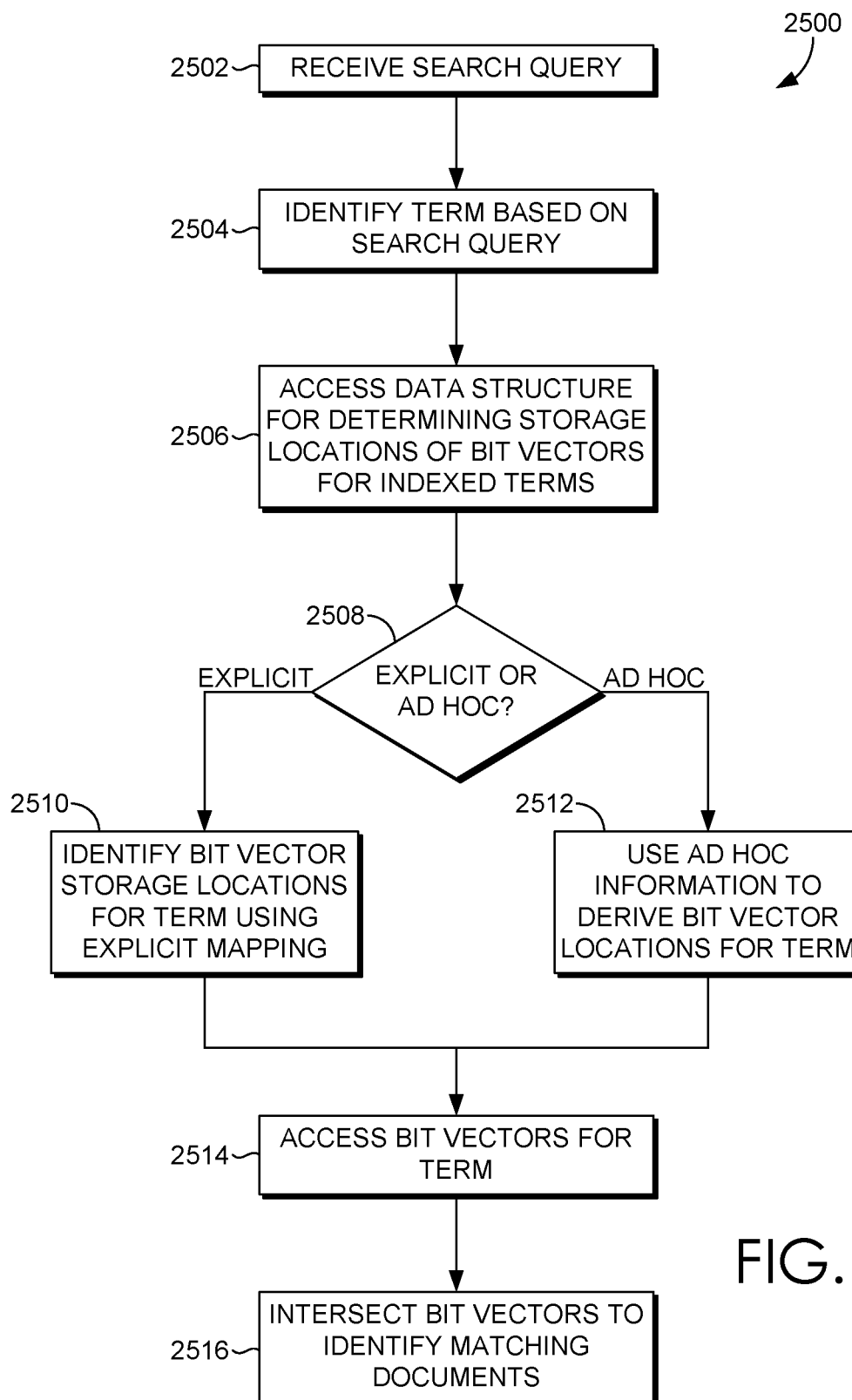
FIG. 25 is a flow diagram illustrating a method for determining bit vector storage locations using explicit mappings and ad hoc information in accordance with an aspect of the technology described herein.

Turning to FIG. 25, a flow diagram is provided that illustrates a method 2500 for determining bit vector storage locations using explicit mappings and ad hoc information. Initially, as shown at block 2502, a search query is received. The method 2500 may be performed at least partially, for instance, using the matcher 4404 of FIG. 44. One or more terms are identified from the search query, as shown at block 2504

One or more data structures are accessed at block 2506 to determine the storage locations of bit vectors for a term identified at block 2504. The data structures may include the band table and/or term table discussed above. In particular, the data structures provide explicit mappings for some terms in which the storage locations of bit vectors are explicitly identified for those terms. The data structures also store ad hoc information for deriving the storage location of bit vectors for other terms for which explicit mappings are not provided. The ad hoc information may provide mapping algorithms for determining the storage locations of bit vectors. Different mapping algorithms may be provided for different bands. As such, the ad hoc information may map term characteristics to mapping algorithms. In other words, different sets of term characteristics may be mapped to different mapping algorithms.

A determination is made at block 2508 regarding whether explicit mapping information or ad hoc information will be used to identify the storage locations of bit vectors for the term identified at block 2504. For instance, a term table may store explicit mappings. The term table may be checked to see if it includes the term. If so, the explicitly provided bit vector storage locations are identified, as shown at block 2510. If explicit mapping information is not available, ad hoc information is employed to derive the bit vector storage locations for the term, as shown at block 2512. This may involve determining term characteristics for the term and looking up mapping algorithms for those term characteristics. For instance, the mapping algorithms may be stored by a band table in which different mapping algorithms are set forth for different bands. The band for the term may be determined based on the term characteristics and mapping algorithms identified for that band. The mapping algorithms are then used to derive the bit vector storage locations.

Bit vectors for the term are accessed, as shown at block 2514. If multiple terms are identified at block 2504, the process of accessing bit vectors at blocks 2506, 2508, 2510, 2512, and 2514 is performed for each term. Bit vectors accessed are then intersected to identify matching documents for the search query, as shown at block 2516.

The term table may be populated with data in a number of ways in accordance with various aspects of the technology described herein. For instance, given a static corpus of documents that is being indexed, some statistics on the frequencies of terms in those documents could be determined by scanning the documents and counting up the terms and based on that information build a term table for that set of documents. However, the characteristics of documents on the web in aggregate are fairly stable so a random number of documents (e.g., 10 million documents) could be selected, term frequencies could be computed for that set of documents, a term table could be built that would fairly optimally store the postings from those documents and then you could use that term table for other documents.

When generating the explicit mappings for a term table, some configurations are directed to maintaining bit vector density (i.e., percentage of bits set in each bit vector) around some desired bit density. For instance, an algorithm could be used to generate explicit mappings that selects bit vectors for terms to achieve that desired bit density based on frequencies of terms in documents. The bit density of the bit vectors doesn't need to be exactly equal to the desired bit density; but instead, the approach is to attempt to stay near the desired bit density (e.g., some bit vectors may have slightly higher bit densities and some bit vectors may have slightly lower bit densities)

Row Trimming/Augmentation

When designing and building a search system using bit vectors, the amount of information stored the search index may be based on worst case queries. There are some queries that can be processed with only a small amount of indexed information. On the other end of the spectrum, there are queries that require large amounts information to be stored to handle the queries well.

Interestingly, the hardest queries to handle from an information storage perspective are queries consisting of a single word in which the only bit vector information available for the query are the bit vectors for that single word. In contrast, a query that is a conjunction of multiple words (e.g., 3 or 4 words, which is more typical), each additional word requires less information to handle the query. If a query has a large number of words and the system retrieves all bit vectors for each word, performing the query may entail bringing in a massive amount of information and the query may become inefficient. However, not all of that information is needed to perform the query well.

Some aspects of the technology described herein employ what is referred to herein as row trimming and row augmentation, which is directed to using less (trimming) or more (augmentation) of the available bit vectors for each term for a query when performing matching for the query. For instance, suppose a query includes three words that each have an IDF of four such that each word is stored in five bit vectors (based on an example rule of thumb in which the number of row intersections for a word corresponds to its IDF). Accordingly, there are 15 bit vectors available to intersect for this query. However, 14 bit vector intersections of the 15 bit vectors are more than required.

Instead of using all the bit vectors available for the three words, a portion of the available bit vectors may be used. Generally, the IDF of the query may be used to determine the number of bit vectors to intersect. For instance, in the previous example of a query with three words, a target false positive rate of 1 in 10,000 would require only four intersections of five bit vectors. The five bit vectors may be selected from the 15 bit vectors available for the three words (e.g., two bit vectors from a first word; two bit vectors from a second word; and one bit vector from a third word).

Bit vectors for terms may be spread out across different types of storage media (e.g., DDR RAM, SSD, and HDD). For more typical queries having multiple terms, row trimming allows only the bit vectors in the faster storage media (e.g., DDR RAM and/or SSD) to be retrieved. For queries requiring more information for a term (e.g., a single term query), row augmentation retrieves the bit vectors from the slower storage media (e.g., SSD or HDD) in addition to the rows in the faster storage media. Because queries requiring more information are typically rarer, it's acceptable to store the additional bit vectors in the slower storage media. For example, suppose a term has seven bit vectors, with five bit vectors stored in DDR RAM and two bit vectors in HDD. Some queries may only require two or three of the bit vectors located in DDR RAM. More typical queries may require four or five of the bit vectors located in DDR RAM. Some rare queries may require all seven bit vectors.

One consideration when constructing the term to row mappings (e.g., in a term table) is determining how many bit vectors to use for each term and on which storage media to store the bit vectors for each term. The determination of the number of bit vectors for a term may be based on the term's frequency in a corpus. Rarer terms require more bit vectors. The determination of which storage media to store the bit vectors for a term may be based on the term's frequency in queries. Terms that appear less often in queries can reside on slower media. This weighs the cost of storing bit vectors for a term against the likelihood/frequency of using the term's bit vectors when processing queries. Generally, the number of bit vectors and their locations on various storage media may be encoded in the band table.

One consideration when a query is received is determining how many bit vectors to include for each term in the matcher plan. The determination may be treated as an optimization problem that weighs the benefit of reduced noise from additional bit vectors with the cost of retrieving those bit vectors from slower storage media. The benefit of the additional bit vectors may be quantified by a relevance metric (e.g., false positive rate; error rate; fix-up cost; or other metric).

Figure 26:
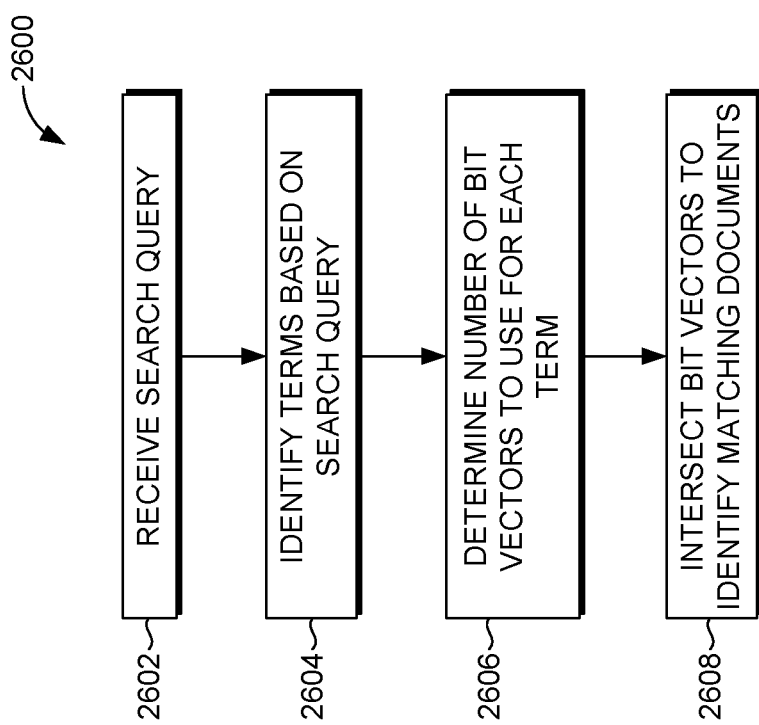
FIG. 26 is a flow diagram illustrating a method for row trimming/augmentation for a search query in accordance with an aspect of the technology described herein.

Turning to FIG. 26, a flow diagram is provided illustrating a method 2600 for row trimming/augmentation for a search query. The method 2600 may be performed at least partially using, for instance, the matcher 4404 of FIG. 44. Initially, as shown at block 2602, a search query is received. One or more terms are identified from the search query, as shown at block 2604.

A number of bit vectors to use for each term is determined, as shown at block 2606. As described above, this may be based on factors such as the benefit of noise reduction from additional bit vectors and a cost of retrieving additional bit vectors (which may consider the type of storage media at which the bit vectors are stored). The determination may employ a heuristic and/or may be based on intersecting an initial number of bit vectors to estimate a number or percentage of matching documents and then re-running the intersections using a different number of bit vectors that is based on the estimate. In some instances, a priority may be set to the available bit vectors, and bit vectors may be selected in accordance with that priority. The bit vectors are intersected at block 2608 to identify matching documents.

Figure 27:
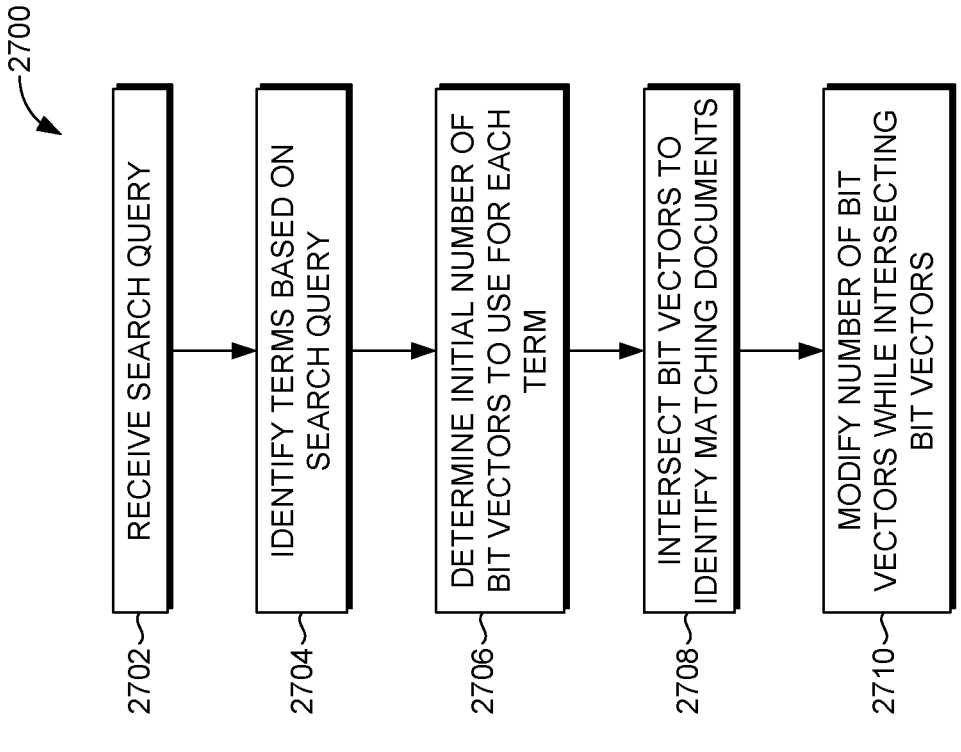
FIG. 27 is a flow diagram illustrating another method for row trimming/augmentation for a search query in accordance with an aspect of the technology described herein.

Another approach would be to dynamically adjust the number of bit vectors based on bit densities observed while performing bit vector intersection (although this approach may not provide query stability). Such an approach is different from determining an initial number of bit vectors and then re-running using a new number of bit vectors, in that the matching process is not re-run. Instead, bit vectors are added or removed while the matching process continues. This approach is shown in FIG. 27, which provides a flow diagram illustrating another method 2700 for row trimming/augmentation for a search query. The method 2700 may be performed at least partially using, for instance, the matcher 4404 of FIG. 44. Initially, as shown at block 2702, a search query is received. One or more terms are identified from the search query, as shown at block 2704.

An initial number of bit vectors is determined for each term, as shown at block 2706. This initial number may be determined, for instance, using a heuristic. The determination may consider how many matching documents are expected to be returned, a relevance metric, and/or a cost of retrieving bit vectors from storage.

The initial number of bit vectors is used to begin a matching process by intersecting the bit vectors, as shown at block 2708. While the matching process is performed, the number of bit vectors being used is adjusted, as shown at block 2710. This may include adding additional bit vectors and/or removing bit vectors. The number of bit vectors may be adjusted any number of times during the matching process. The adjustment may be based on different considerations, such as the number or percentage of matching documents being returned and/or the cost/cost savings of retrieving more/fewer bit vectors from storage. In some instances, a priority may be assigned to the available bit vectors, and bit vectors may be added or removed in accordance with that priority.

Updating Search Index

Search indexes need to be updated as new documents become available and previously indexed documents are modified or become stale (and therefore may be removed). Updating a search index built using posting listings has traditionally been problematic. Posting lists are typically sorted (e.g., by document ID or static rank), which makes it hard to add and remove documents. Adding a document to a posting list involves determining the location in the posting list to add the document ID then moving other document IDs to allow for the addition of the document ID. If a document needs to be removed from a posting list, the document ID is removed and other document IDs then need to be moved based on the removal. Moving document IDs based on additions and removals impacts skip lists and/or other mechanisms used by the search system, and the skip lists and/or other mechanisms need to be updated based on the movement of the document IDs. As a result, updating a posting list-based search index may require bringing a server offline, rebuilding the search index, and then bringing the server back online. The process of rebuilding the search index may be time consuming if the server indexes a large collection of documents, resulting in the server being offline for a long period of time. If the length of time is sufficiently long, the search index may be updated less frequently, causing the search index to become stale.

An advantage of using a bit vector-based search index, such as the bit vector search index 4410 of FIG. 44, is that the search index may be incrementally updated without the need to take a server down for any period of time, which is the case of some search systems. Because the bit vectors may all be a constant width in the context of representing the same number of documents such that the space for new documents is pre-allocated, adding and removing documents may be performed by simply setting and clearing bits, as will be discussed in further detail below.

In contrast to posting lists, the bit vectors do not suffer from the problem associated with maintaining documents in sorted order. There is no need to shift document IDs or to update pointers as may be required when updating posting lists. Adding or removing documents may be performed even while the system is running. If a search query is received when performing an update, one of two outcomes is possible depending on the progress of the update. The first possible outcome is the set of matches that would have been identified prior to the update. That is, the search query was performed before the bits were changed in a manner that would impact the results. The second possible outcome is the results that would have been identified after the update. That is, the search query was performed after the bits were sufficiently changed to impact the outcome. There is no point in time when any other result set could be provided. Because updating the bit vectors may be done quickly with minimal or no downtime, the data center design is simplified since it does not need to account for substantial downtime and there is no concern with the search index becoming stale due to infrequent updates.

Figure 28:
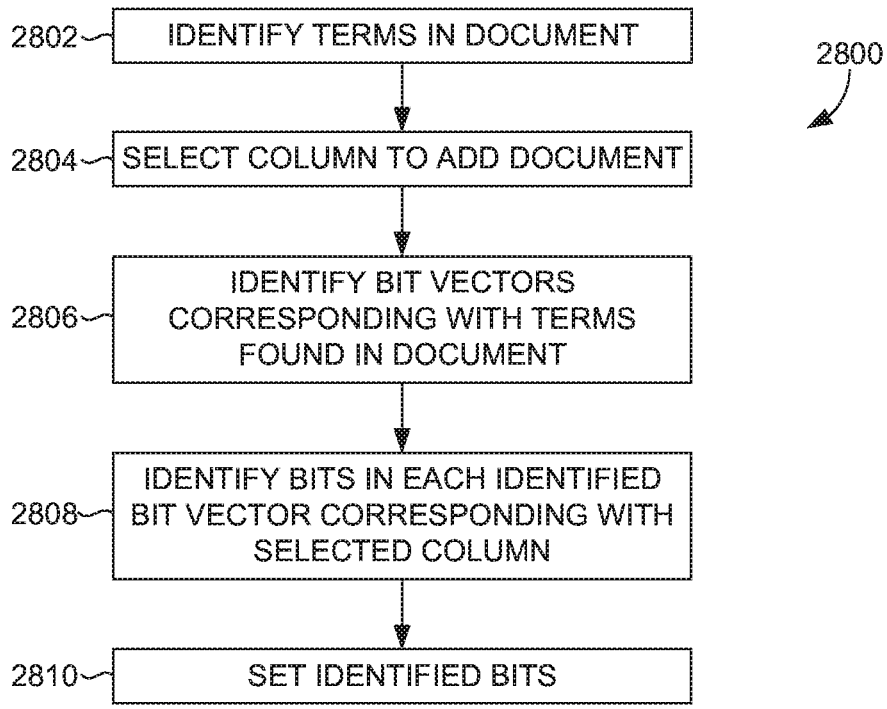
FIG. 28 is a flow diagram illustrating a method for adding a document to a bit vector-based search index in accordance with an aspect of the technology described herein.

Turning to FIG. 28, a flow diagram is provided that illustrates a method 2800 for adding a document to a bit vector-based search index. The method 2800 may be performed, for instance, by the indexer 4418 to update the bit vector search index 4410 in the search system 4400 shown in FIG. 44. As shown at block 2802, terms in a document are identified. The location (e.g., body, non-body, meta) of each term may also be identified. As shown at block 2804, a column to add the document is selected.

Figure 29:
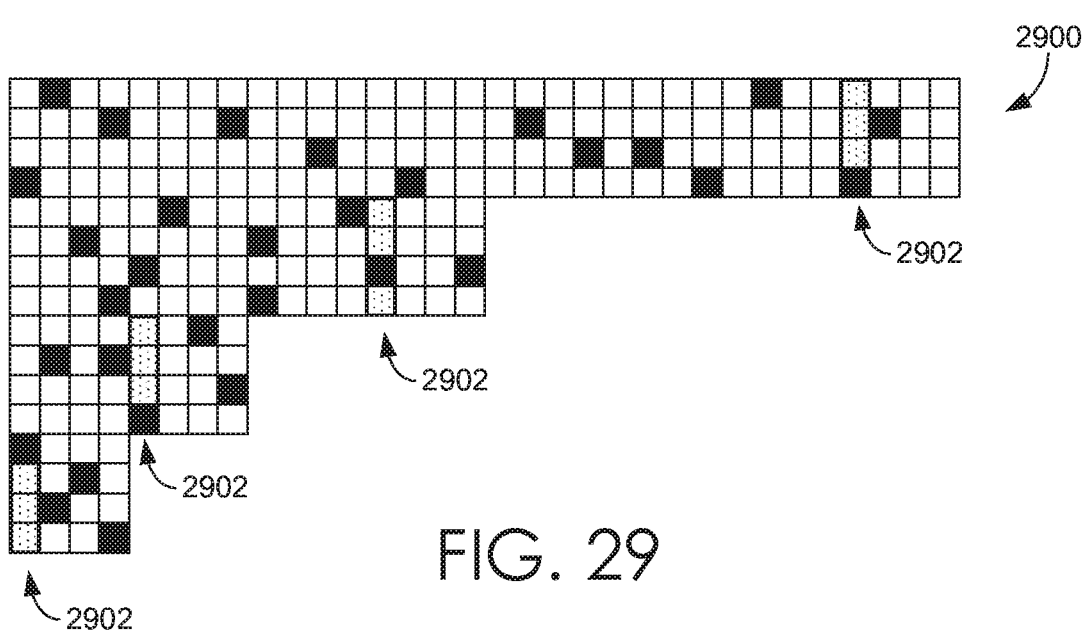
FIG. 29 is diagram illustrating a simplified search index with a collection of bit vectors of varying length with a "column" for a document identified.

By way of example to illustrate identification of a column, FIG. 29 illustrates a simplified search index 2900 with a collection of bit vectors of varying length. The highlighted portion 2902 is a column allocated for indexing a particular document, including the bits in each bit vector that corresponds to that document. As can be understood, the bits of the column in the short row bit vectors are shared with other documents.

In some configurations, the bit vectors in a search index may include a number of "empty" columns to allow for the addition of documents. The columns are empty in the sense of having of their bits set to zero. Note an empty column may have bits set in some short row bit vectors based on the presence of other documents sharing those bits.

The bit vectors corresponding to terms found in the document are identified, as show at block 2806. The bits in each of the identified bit vectors corresponding to the column selected for the document are identified, as shown at block 2808, and the identified bits are set, as shown at block 2810 (i.e., by setting each of the bits to "1").

Figure 30:
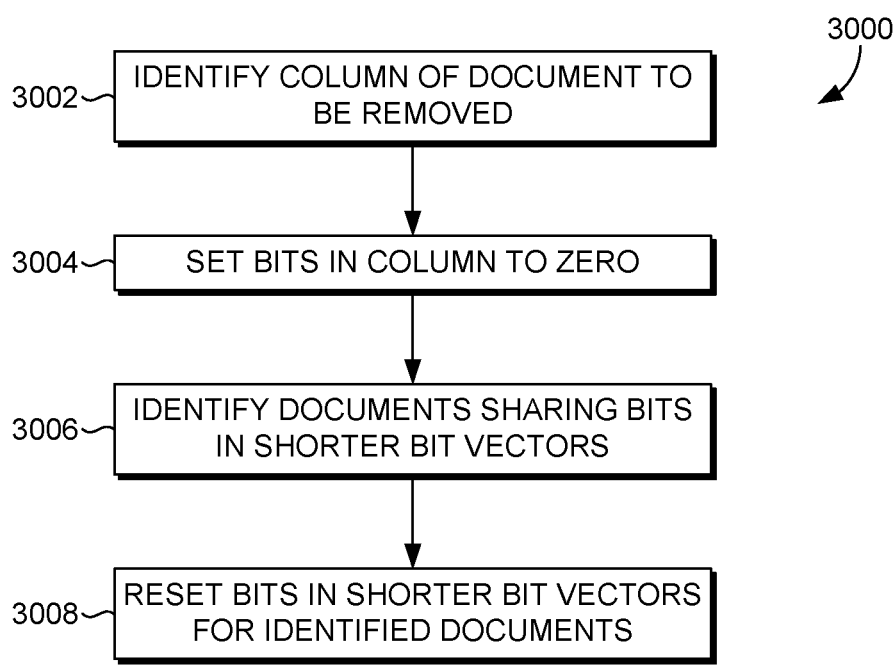
FIG. 30 is a flow diagram illustrating a method for removing a document from a bit vector search index in accordance with an aspect of the technology described herein.
Figure 31A:
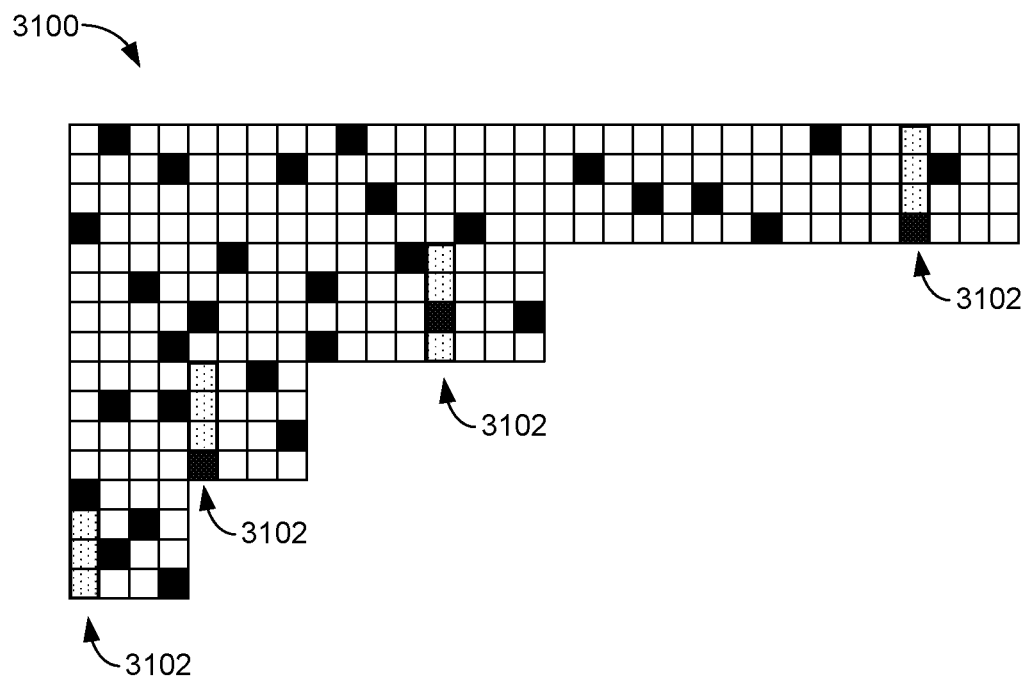
FIGS. 31A-D are diagrams illustrating removing a document from a bit vector search index in accordance with an aspect of the technology described herein.

With reference now to FIG. 30, a flow diagram is provided that illustrates a method 3000 for removing a document. The method 3000 may be performed at least partially using, for instance, the indexer 4418 of FIG. 44. As shown at block 3002, a column corresponding to a document to be removed is identified. As noted above, a column refers to the bits in each bit vector corresponding to a particular document. By way of example, FIG. 31A illustrates a simplified search index 3100 with a set of bit vectors of varying length (the shorter bit vectors being stretched out to show corresponding bits). The column (i.e., collection of bits) corresponding to a document to be removed are highlighted by the area 3102.

Figure 31B:
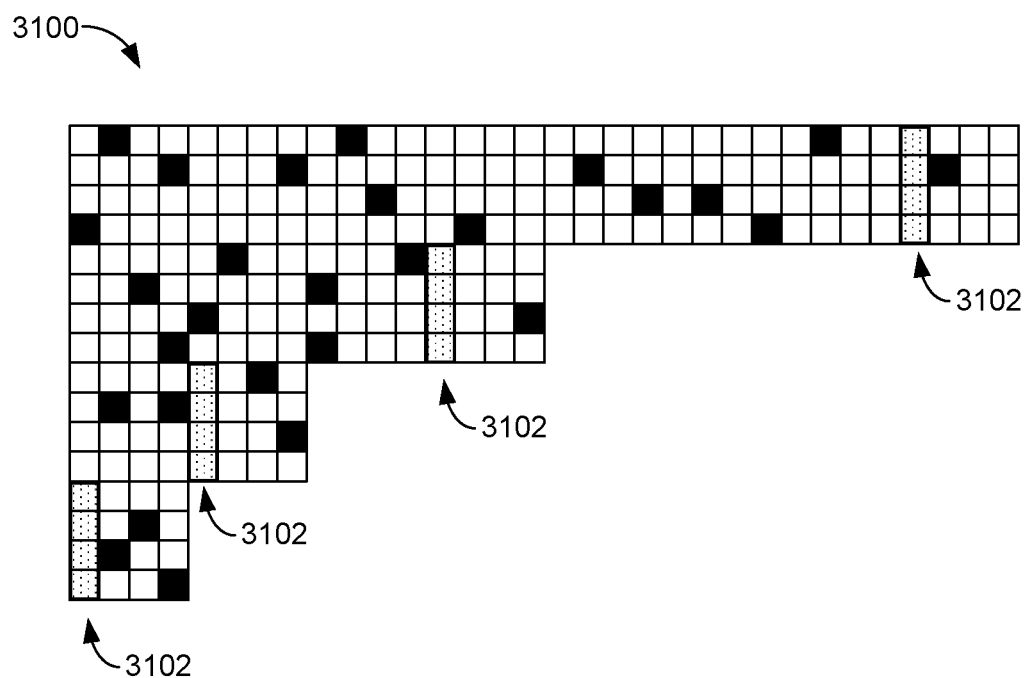
Figure 31C:
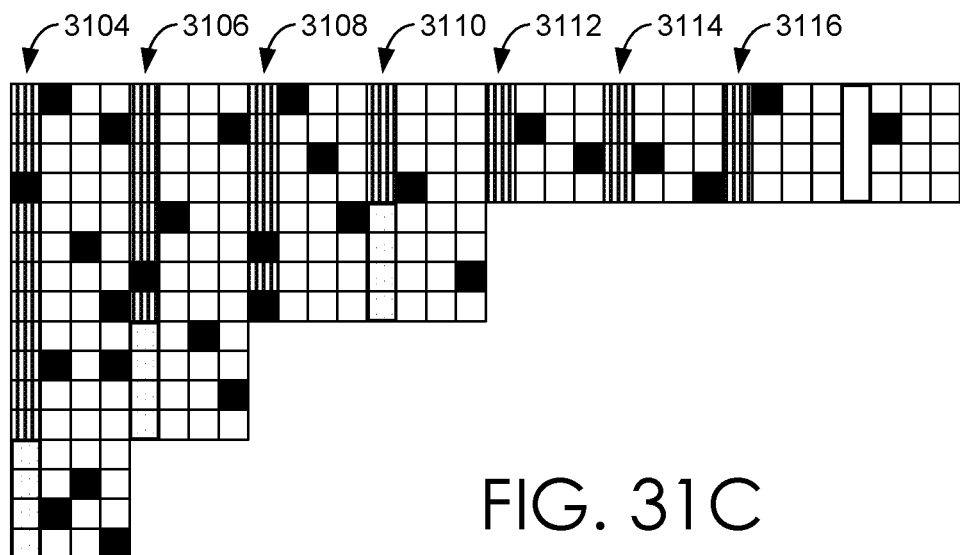
Figure 31D:
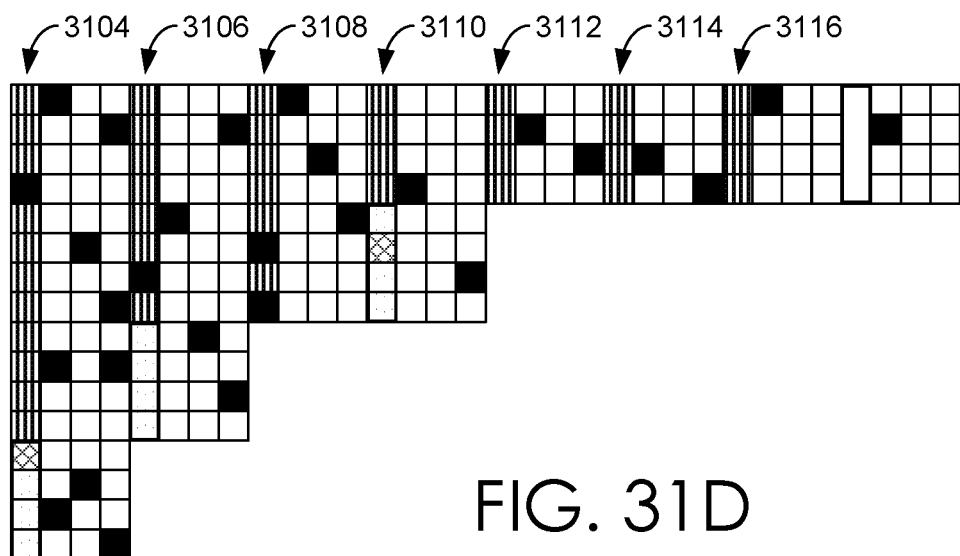

Each of the bits in the identified column is set to zero, as shown at block 3004. Setting all bits in the column to zero is represented in FIG. 31B. Because the bits in the shorter bit vectors are shared by other documents, some of which will remain in the index, the bits in the shorter bit vectors may need to be restored for those documents. Accordingly, the collection of documents sharing bits in the shorter bit vectors are identified, as shown at block 3006. These are the documents corresponding to the columns 3104, 3106, 3108, 3110, 3112, 3114, 3116 shown in FIG. 31C. The bits in the shorter bit vectors corresponding to the terms contained in those identified documents are reset, as shown at block 3008. This may be done, for instance, by identifying the bit vectors corresponding to terms contained in the documents, identifying the bits in those bit vectors corresponding to the documents, and setting those bits (similar to the approach for adding documents discussed above with reference to FIG. 28). FIG. 31D illustrates bits that have been reset in the search index 3100 based on the documents corresponding to columns 3104, 3106, 3108, 3110, 3112, 3114, 3116.

The above approach for removing a particular document may be an expensive operation since it requires the documents sharing bits with the document removed to be re-indexed. Therefore, the approach may be employed in limited circumstances, for instance, when a document needs to be removed from the search index for legal reasons.

Another approach for removing documents from the search index that would remove the complications of having to re-index documents sharing bits with removed documents is to remove documents in batches. In that way, all documents sharing bits are removed at the same time by setting all the bits to zero and no documents would need to be re-indexed. For instance, an expiration approach could be employed in which a policy dictates that documents are removed every so often (e.g., every 24 hours, weekly, monthly, etc.). According to the policy, all documents older than the set time threshold would be removed by setting the bits for those documents to zero. The timing threshold may coincide with how frequently documents are indexed. By way of example to illustrate, documents may be indexed every 24 hours. As such, documents that were indexed 24 hours ago would be removed from the search index (i.e., by setting the bits to zero in the columns for the documents) around the same time the documents are crawled again and re-indexed. When a document is crawled again, it may be indexed using the same column previously employed. However, a simpler approach may be to simply zero out the bits in the previous column and index the document in a new column in the search index. This facilitates removing documents in batches as documents are added to contiguous locations in the search index based on when they're crawled.

Another approach to removing documents from the search index is to not truly remove the indexed information but instead to prevent certain documents from being returned in response to search queries. In particular, a long bit vector may be stored in the search index and intersected during matching for all search queries. The bits in the long bit vector may be initially set to one, and if a document is to be removed, the bit for that document is set to zero. As such, when a search query is received and that long bit vector is intersected, any document with a bit set to zero is effectively removed. While this approach provides a relatively simple way to "remove" documents, it has a cost because the "removed" documents are taking up space in the search index. However, this may be acceptable for random access deletions (e.g., need to remove a document for legal reasons) because the instances of random access deletions may be relatively rare.

When the index is stored entirely in RAM, updates to the index is relatively straight forward. For instance, if an expiration policy is employed, the search index in RAM may conceptually just be considered as a 2D array of bits in which documents are added to the right-hand side and documents are removed on the left-hand side. However, larger search indexes may not practically fit entirely in RAM, and other storage devices, such as SSDs and/or HDDs, may be employed to store portions of the search index. In particular, SSDs and HDDs have larger storage capacities and cost relatively less. However, SSDs and HDDs are generally slower than RAM both in the limit on the number of requests per second each can handle (i.e., IOPS—input/output operations per second) and the rate at which data can be transferred (i.e., throughput measured, for instance, in bytes per second or MB per second).

Performance considerations for incremental index update include, but are not limited to, the cost of adding columns to a two-dimensional array and the inefficiencies due the block oriented nature of data storage devices like RAM, SSD, and HDD. By way of example to illustrate such considerations, FIG. 32A shows a 4×4 array arranged in row-major order. When an array is laid out in row-major order, consecutive column positions within a row reside in consecutive storage locations. As an example, columns A-D reside in positions 0-3 in row 1 and positions 4-7 in row 2. In accordance with configurations described herein, postings are arranged in row-major order where columns correspond to sets of documents and rows correspond to sets of terms. This arrangement is used to optimize the speed of row scans during query processing.

During the course of document ingestion, it may be necessary to add another column to the array. FIG. 32B shows the layout of data from the original array after adding a fifth column. In order to maintain a row-major layout, it was necessary to move the data that was originally in storage positions 4-15. As an example, consider the position B2. In the original 4×4 array in FIG. 32A, position B2 corresponded to storage location 5. In the new 4×5 array in FIG. 32B, position B2 corresponds to storage location 6.

Because of these data moves, the amount of work to add a single column is on the order of the amount of work to copy the entire array. One way to avoid the costs associated with adding columns is to start with a larger array that reserves space for additional columns. FIG. 33A shows an example of such an array. In this particular example, the array has space for 6 columns, but only two are in use. FIG. 33B shows that adding a third column involves only writing to the storage locations associated with that column. Other storage locations remain untouched. After adding another three columns, the array will become full, as shown in FIG. 33C.

Figure 34A:
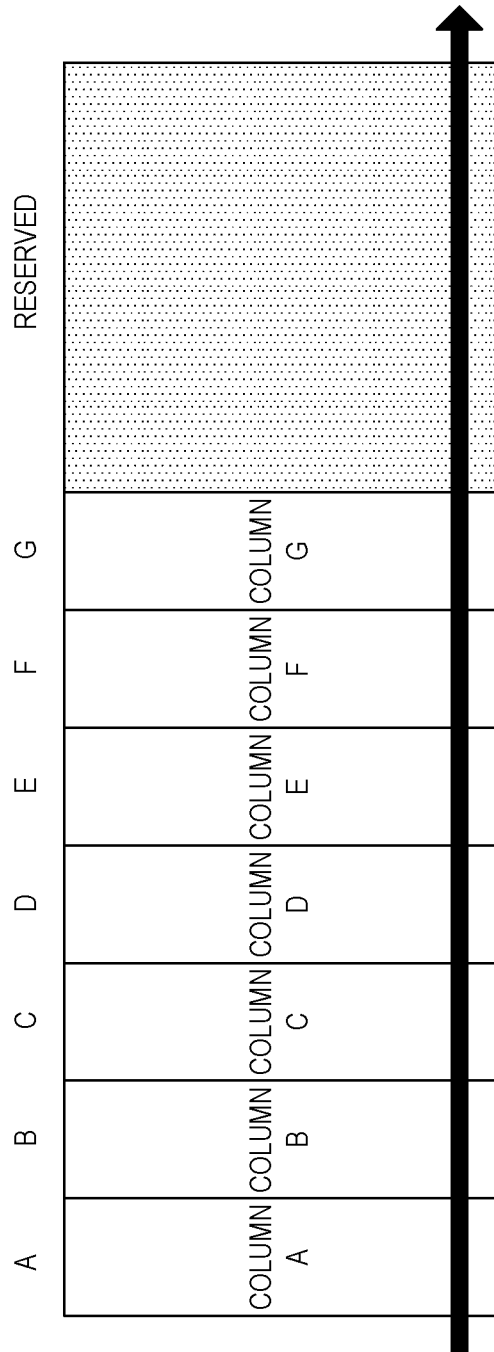
FIGS. 34A and 34B are diagrams illustrating copying documents to a larger array and starting a new array, respectively.
Figure 34B:
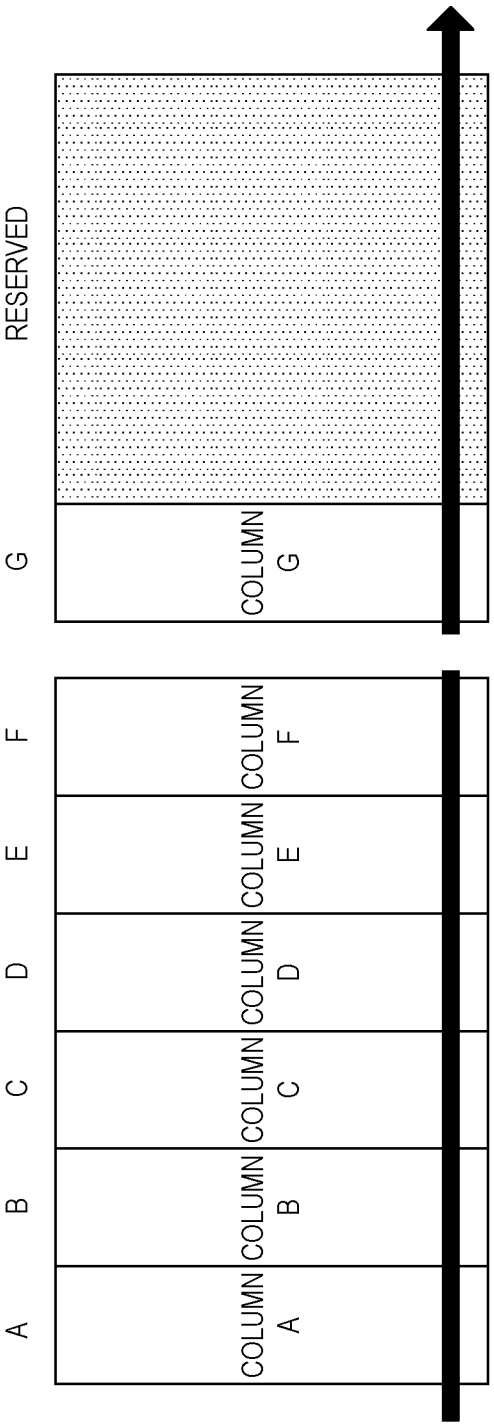

At this point the array can be copied to a larger buffer as shown in FIG. 34A. Alternatively, a new buffer can be started, as shown in FIG. 34B. Copying the array, as shown in FIG. 34A, is expensive, but has the advantage that each row maps to a contiguous block of storage which can be scanned efficiently. Starting a new buffer, as shown in FIG. 34B, is inexpensive, but has the disadvantage that each row now maps to a pair of blocks. The storage within each block is contiguous, but the blocks themselves are not in adjacent storage locations. Some devices, like SSD and HDD, incur a significant setup cost for each block of contiguous storage accessed. For these devices, the arrangement in FIG. 34B would incur twice the setup cost as the arrangement in FIG. 34A.

In order to provide acceptable performance while reading rows, the number of blocks of storage in the index needs to be limited. At the same time, to provide acceptable performance while ingesting documents, the number of times a block is copied needs to be limited. Configurations described herein use a hierarchy of arrays to minimize the number of block copy operations while enforcing a limit on the number of blocks that make up a row. As an example, some configurations can employ space for two small arrays, two medium arrays, and two large arrays, as shown in FIG. 35A. In this example, small arrays hold half as many columns as medium arrays. Large arrays hold five times as many columns as small arrays.

Initially, the system is empty, as shown in FIG. 35A. As documents arrive, they are indexed into a newly created small array as shown in FIG. 35B. As in FIG. 33A, the small array consists of a set of columns containing documents that have already been indexed and a set of columns reserved for documents that will be indexed in the future. At this point, a row can be accessed with a single block read.

At some point, the first small array becomes full and a new small array is created to accept additional documents, as shown in FIG. 35C. At this point, accessing a row requires two block read operations. Eventually the second small array becomes full as shown in FIG. 35D. At this point, a medium sized array is created and initialized with a copy of the contents of the two small arrays as shown in FIG. 35E. The two smaller arrays are then cleared and document ingestion continues in the first small array. In this configuration, a row access requires two block read operations. Eventually the small arrays will fill up again and a second medium block will be created, as shown in FIG. 35F. At this point, a row access requires three block read operations. At some point, both small arrays will become full again, but this time both medium arrays will be full as well, as shown in FIG. 35G. In this situation, there are no medium arrays available to hold the contents of the small arrays. A row access now requires four block read operations. At this point, a new large array is created and initialized with the contents of the two small arrays and the two medium arrays. The small and medium arrays are then cleared and ingestion continues in the first small array as shown in FIG. 35H. A row access now requires two block read operations.

Data storage devices typically provide read/write access to data at a granularity greater than a single bit. Bits on these devices are grouped into blocks which represent the smallest amount of data that can be read or written in a single operation. As an example, the DDR3 memory protocol arranges data into blocks of 512 bits. Reading a single bit from DDR3 memory requires a reading of all 512 bits in the block containing the bit. Likewise, writing a single bit requires writing all 512 bits in the block. SSD and HDD have even larger block sizes. For example, a typical SSD may arrange data into blocks of 4,096 bytes, or 32,768 bits. Reading or writing a single bit on such an SSD would involve reading or writing 32,768 bits. A typical HDD block is even larger.

As noted above, configurations described herein arrange posting data as a two-dimensional array of bits, where rows correspond to sets of terms and columns correspond to sets of documents. The 2D array of bits is laid out in row major order. That is, the bits within a single row occupy consecutive storage locations, and the rows which make up the array occupy consecutive storage locations. The consequence of this layout is that operations on a single row involve access to a sequence of consecutive storage locations, while operations on column require access to a sequence of storage locations that are not consecutive. The act of adding, updating, or removing a document involves writing to bits within a single column, and therefore requires access to non-consecutive storage locations.

This operation is inefficient because reading or writing a single bit involves reading or writing a complete block of bits. In the case of updates to DDR memory, reading or writing a single bit involves an operation on 512 bits. Therefore, 511/512th of the storage device throughput is wasted, compared to an operation reading or writing 512 consecutive bits. This inefficiency is acceptable for postings stored in DDR memory because document ingestion rates are fairly low, relative to the high throughput rate of the DDR memory.

When postings are placed on SSD or HDD, however, the inefficiencies due to block access become unacceptable for two reasons. The first reason is that SSD and HDD typically have much larger block sizes. For instance, SSD may use blocks of 4 Kb (32 k bits) and HDD may use blocks of 16 Kb (132 k bits). These blocks are 64 and 256 times larger, respectively, than the typical DDR3 blocks. The consequence is that reading or writing a single bit stored on SSD or HDD is 64 to 256 times less efficient than reading or writing a single bit stored in DDR3 memory. The second reason is that the time to read or write a block on SSD or HDD is much greater than reading or writing a block of DDR3 memory. For example, a typical SSD operation may take 20 ms while a typical DDR3 operation may take 10 ns. In other words, reading or writing a block of SSD may be 2 million times slower than accessing a block of data in DDR3 memory. HDD is even slower.

With an index arranged as a hierarchy of arrays as shown in FIGS. 35A-35H, it is possible to mitigate the inefficiencies associated with offline storage devices by placing the small arrays in DDR storage and the medium and large arrays on SSD and HDD, as shown in FIG. 36. The reason this works is that individual column write operations only happen in the smallest arrays. Since the smallest arrays are stored in DDR, the costs for the column writes are low. The larger arrays are only initialized by copying the entire contents of a set of smaller arrays. These large copy operations are efficient for offline storage devices. In some configurations (such as in the examples of FIGS. 35A-35H), data may be written from a collection of arrays to a larger-sized array (e.g., small to medium or medium to large) such that the data written to the larger-sized array fills that array, limiting the number of writes to the larger-sized array.

Figure 37:
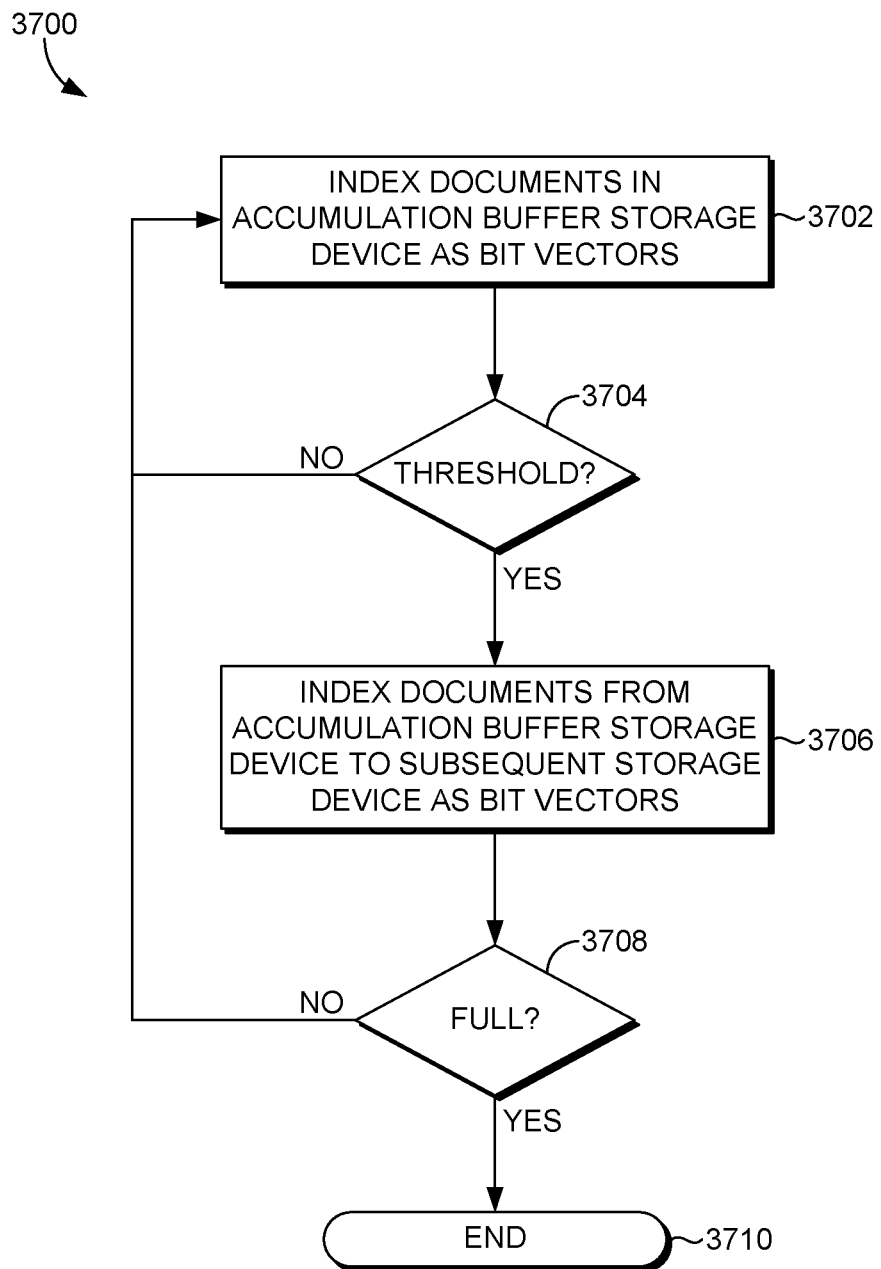
FIG. 37 is a flow diagram illustrating a method for using an accumulation buffer to index documents in a bit vector search index in accordance with an aspect of the technology described herein.

Each of the arrays can be referred to herein as an accumulation buffer as each array serves to accumulate documents until some point is reached and the contents are then written to a larger array. Turning now to FIG. 37, a flow diagram is provided that illustrates a method 3700 for using accumulation buffers to index documents in a bit vector search index. The method 3700 may be performed at least partially using, for instance, the indexer 4418 of FIG. 44. Initially, documents are indexed in an accumulation buffer storage device, as shown at block 3702. The accumulation buffer storage device stores document information as bit vectors in which each bit vector comprises an array of bits with each bit indicating whether at least one of one or more documents contain at least one of one or more terms corresponding to the bit vector. In the instance in which the accumulation buffer storage device is an initial storage device, each document may be indexed in the accumulation buffer storage device one at a time by setting bits for each document. For instance, bits for a document may be set in the accumulation buffer storage device after crawling the document. In other instances, the accumulation buffer storage device at which documents are indexed at block 3702 may be preceded by one or more previous accumulation buffers. In such instances, the documents may be collectively indexed in the accumulation buffer storage device based on the bits set in a previous accumulation buffer.

A determination is made at block 3704 regarding whether a threshold has been satisfied. If not, the process of indexing documents in the accumulation buffer storage device is continued as represented by the return to block 3702. Alternatively, if the threshold has been satisfied, indexed document information from the accumulation buffer storage device is collectively indexed in a subsequent storage device, as shown at block 3706. As can be understood, when the subsequent storage device is larger than the accumulation buffer storage device, data may be moved from consecutive bits in the accumulation buffer storage device to non-consecutive bits in the subsequent storage device.

Different thresholds maybe employed in various configurations. In some instances, the threshold is a certain number of documents, such that when the certain number of documents have been indexed in the accumulation buffer storage device, the threshold is satisfied and information is indexed from the accumulation buffer storage device to the final storage device. In other instances, the threshold is a certain period of time (e.g., an hour, a day, etc.) such that when the time period has passed, the information is indexed from the accumulation buffer storage device to the final storage device. In still further instances, the threshold may be a certain storage amount (e.g., the storage capacity set for the accumulation buffer storage device or a collection of accumulation buffer storage devices), such that when the storage amount has been met, the information is indexed from the accumulation buffer storage device to the final storage device.

As shown at block 3708, a determination is made regarding whether the subsequent storage device is full. If not, the process of indexing documents in the accumulation buffer storage device (e.g., by flushing the accumulation buffer storage device and indexing new documents) until a threshold is satisfied and indexing information from the accumulation buffer storage device to the subsequent storage device may be repeated. This process may be continued until the subsequent storage device is full, at which time the process ends as shown at block 3710. Other thresholds besides whether the final storage device is full may be employed in determining whether to repeat the process. For instance, a time-based threshold could be used instead (e.g., the final storage device may be configured to hold a day's worth of documents) or a document threshold (e.g., the final storage device may be configured to hold a threshold number of documents).

It should be understood, that the number and size of accumulation buffers may be configurable based on design goals. Generally, more accumulation buffers may be desirable to a certain point where other costs make it less desirable to have additional accumulation buffers. In particular, accumulation buffers may be used to serve search queries (i.e., a search query would be served based on documents indexed in not only a final storage device (i.e. large storage device) but also the documents currently stored in the accumulation buffers that have not yet been provided to the final storage device). As such, more accumulation buffers may slow down query processing speed as each accumulation buffer is accessed to serve the search query. Depending on design goals, an optimal number of accumulation buffers may be selected. For example, if the search index will experience a high volume of queries but data is not updated too often, the optimal design may be fewer accumulation buffers. As another example, if the search index will experience infrequent search queries but data is updated often, the optimal design may be more accumulation buffers. Additionally, SSD are susceptible to burnout after a certain number of writes. Therefore, the number of accumulation buffers on SSD will affect burnout, and the burnout rate of SSDs may be taken into consideration when selecting the number of SSD accumulation buffers to employ in the design.

Preliminary Ranker Algorithm

As discussed herein, a search system may use a matcher, such as the matcher 4404 of FIG. 44, to initially identify a group of matching documents for a search query. As this group of documents is, in most cases, too large to be returned as a set of search results, one or more rankers may be utilized to further narrow the group of documents so that only the most relevant documents are returned in response to the search query. In one configuration, at least two rankers are used, including a preliminary ranker, such as preliminary ranker 4422 of FIG. 44. While the preliminary ranker is able to closely approximate what subsequent rankers, such as the final ranker 4426 of FIG. 44, would do in terms of scoring and ranking documents, the preliminary ranker is less expensive to operate. For example, the preliminary ranker, in one aspect of the technology described herein, eliminates all documents from consideration for the subsequent rankers that the subsequent rankers would also eliminate. As such, the algorithm used by the preliminary ranker is designed to eliminate (e.g., assign low scores to) all documents that would also be eliminated by the algorithms used by subsequent rankers, such as final ranker 4426 of FIG. 44. This allows for the set of candidate documents at the preliminary ranker to be significantly reduced without eliminating a document that is particularly relevant to the query and that should be included in a set of candidate documents at the final or other subsequent ranker.

Figure 38:
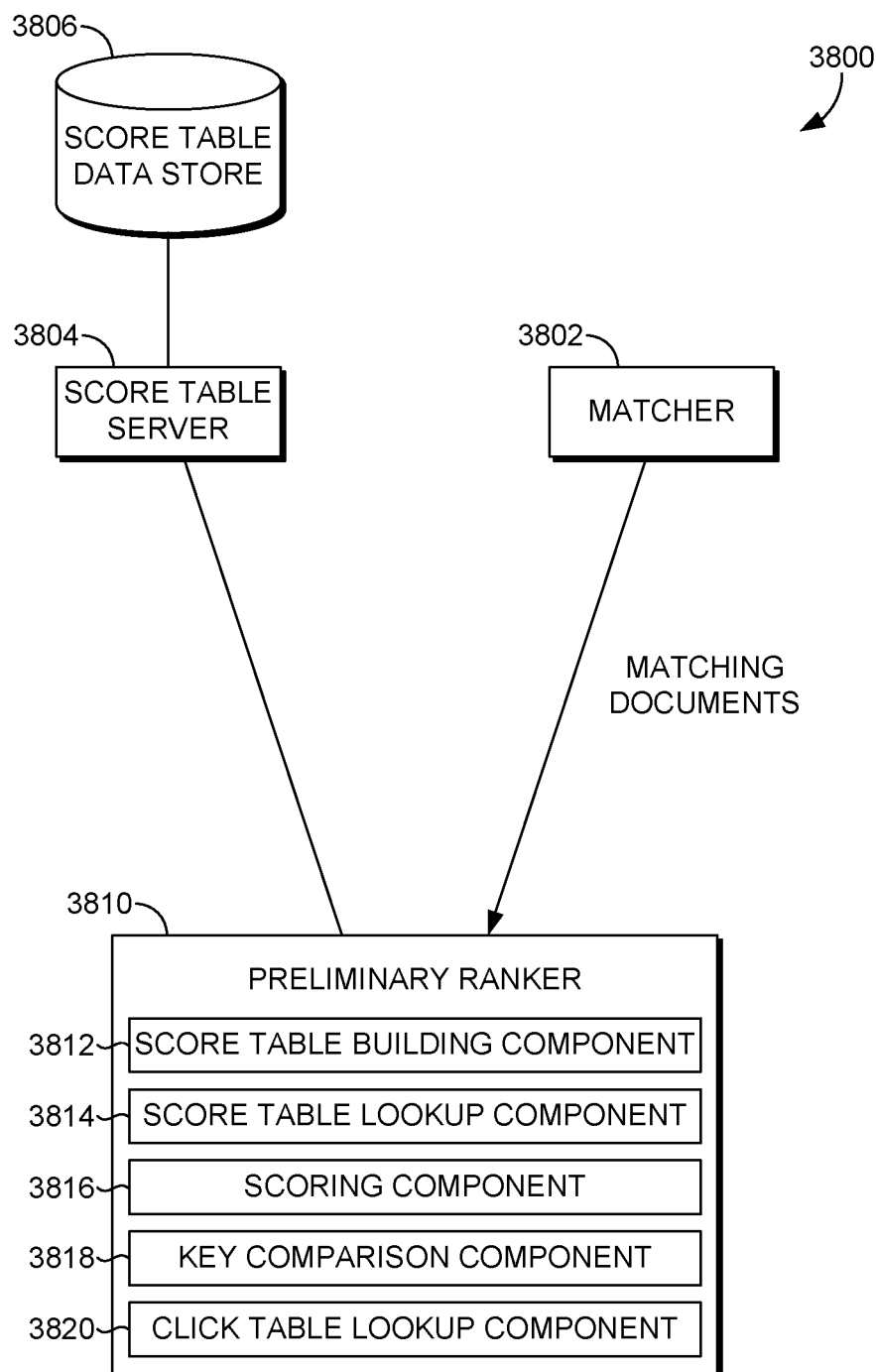
FIG. 38 is a block diagram illustrating an exemplary system providing preliminary ranking in accordance with an aspect of the technology described herein.

Referring now to FIG. 38, an exemplary system 3800 is illustrated for carrying out aspects of the technology described herein. A matcher 3802 (which may correspond to the matcher 4404 of FIG. 44), a score table server 3804, and a preliminary ranker 3610 (which may correspond to the preliminary ranker 4422 of FIG. 44) are provided, and may communicate by way of a network 3608. The matcher 3802 has been previously described herein, and thus will not be described in relation to system 3800. Identifications of documents found to be relevant by the matcher 3802 are returned to the preliminary ranker 3810. For each document indicated as being potentially relevant to a particular search query, the score table server 3804 accesses a score table associated with each document. In one configuration, the score tables are stored in a score table data store, such as data store 3806.

The preliminary ranker 3810 has many functions, as described in more detail herein. For instance, the preliminary ranker 3810 comprises, among other components not shown in FIG. 38, a score table building component 3812, a score table lookup component 3814, a scoring component 3816, a key comparison component 3818, and a click table lookup component 3820. The functionality of each of these components will be described in more detail below.

While traditional rankers may utilize a payload of data associated with each item in posting lists to score and rank documents, aspects of the technology described herein instead use tables with pre-computed data. Posting lists may utilize inverted indices that could represent an entire corpus of documents. A posting list, for example, may first be arranged by document, and then by occurrence of each term in the document. The list may also include a pointer that can be used to move from a first occurrence of a term to subsequent occurrences of that same term. While posting lists may assist with reducing the number of candidate documents, they also consume a great deal of memory, and are slower to use than the score tables described herein.

Instead of using a posting list, as described above, some configurations utilize hash tables, also termed score tables. In one aspect, each document has its own score table that comprises pre-computed data, such as frequency data. As mentioned, these score tables may be stored in data store 3806. Score tables may also comprise other data that has been pre-computed. In regards to the frequency, the frequency may be pre-computed, but may be stored in the score table not as the actual frequency of a term in a document, but as, for example, an IDF. An IDF increases proportionally to the number of times a term appears in the document, but is offset by the frequency of the word in the corpus. Stated in a different way, the value stored in the table may reflect the frequency of a particular term in a document in relation to the relative infrequency of that term in the corpus. Other ways of representing the pre-computed frequency of terms in the score table are also contemplated. As such, the data stored in the score table in relation to the frequency of a term may be indicative of the frequency of the term in the document, but may be stored in such a way as to require some type of computation to determine the actual frequency. The algorithm used by the preliminary ranker may use data indicative of the frequency in its computation of a score for each document, and thus may not need to compute the actual frequency of the term. Even further, for efficiency purposes, such as to reduce the memory required, the frequency data may be clipped at a maximum frequency for the terms in the score tables so that frequency data can be represented with less bits in the score tables.

As mentioned, each document may have an associated score table that stores data for pre-computed components that are used to score and rank documents by the preliminary ranker. In order to produce an efficient ranker, the score table building component 3812 may not include all terms in a document in the score table. For instance, data for only those terms that occur more than once in the body of a particular document may be stored in that document's score table. Approximately 85% of terms in a document may be found just once in the body of the document, so eliminating the pre-computation of various components associated with these terms saves memory, and makes the preliminary ranker operate much faster than it otherwise would. As a result, both the terms that appear only once in the body of a document and the terms that do not appear at all in a document may be treated the same, and thus may be given the same score, as the preliminary ranker may not be able to distinguish between these. Because the system knows that the terms occurring only once in the body of a document are not included in the score table for each document, the system, in one configuration, treats all terms not found in a particular score table as occurring once in the body. This means that terms not contained in a document would be treated as occurring once in the body. This is acceptable since it will not significantly impact the ranking. Terms from other locations (e.g., non-body, and metawords) may be scored higher and information stored even if the terms appear only once in these other locations.

By way of example to illustrate, if a particular search query includes both terms "cat" and "dog," a document may be returned that was found to have the term "cat." The preliminary ranker may access the score table for that particular document to find that "dog" is not listed in the score table, and may assume that "dog" is only mentioned once in the body of the document. In this scenario, the preliminary ranker may give the document a score of "1" instead of "0," which would typically be given to a document in which the term does not occur at all. As such, in one configuration, no documents are given scores of "0" for a particular term not being found in a score table.

While the frequency of each term in a document has been discussed, other pre-computed data may also be stored in the score tables. For instance, an indication of where each term occurs in a document may be encoded in the score tables. For instance, in one type of a document, a term could be located in the title stream, body stream, anchor stream, URL stream, etc. A term that is located in the title of a document may indicate, for example, that the document has a good chance of being relevant to that term, and thus to the user's intent associated with the search query. Further, a particular term occurring multiple times in a single paragraph or in a particular section of a document may indicate particular relevancy of that document to the search query.

In addition to the pre-computed components discussed above, such as the frequency of the term in the document and in which portion of the document the term is located, one or more real-time components may also be taken into account when a final score is computed for a document in relation to a search query, such as by the scoring component 3616. Real-time components are those that are computed once a search query is entered and received, as they cannot generally be pre-computed. For example, the location of a particular term in the search query is not able to be computed until runtime, as the query is not known until that time. Further, how well the geographic local of a document matches the geographic local of the origin of the query cannot be determined until runtime, and as such, is calculated in real time. Another example is how well the language of a document matches the language of the query. This also would not be calculated until a search query is entered, and the preliminary ranker runs an algorithm to determine how relevant a set of documents is to the search query.

The final score of a document in relation to the search query, as computed by the scoring component 3816, may be dependent upon both of one or more pre-computed components and one or more real-time components. For instance, each component, whether pre-computed or not, may be assigned an individual score by the algorithm used by the preliminary ranker. The algorithm, such as the scoring component 3816, then considers the individual scores to compute a final score for each document in relation to a particular search query. The final score may be used to rank documents, or otherwise to eliminate some documents from consideration by a subsequent ranker. In one configuration, the final score is a number that indicates how well a particular document corresponds to the search query.

A click table may also be used by the preliminary ranker in determining a score for each document. A click table may function much the same as the score table as described above. Data is stored in slots of a click table for each term of a document. In one configuration, all terms found in a document are included in a click table, but in another configuration, only those terms that occur more than once are included in a click table. For each term, the click table stores data that indicates how often that document is selected by users who submit the same or similar search queries. How often a particular document is selected by other users who submit the same or similar search queries can be a valuable indicator as to whether or not that document should be considered relevant for the present search query. As such, a click table may be accessed by, for example, the click table lookup component 3820, as one component that can contribute to a final score of a document for a particular search query.

Figure 39:
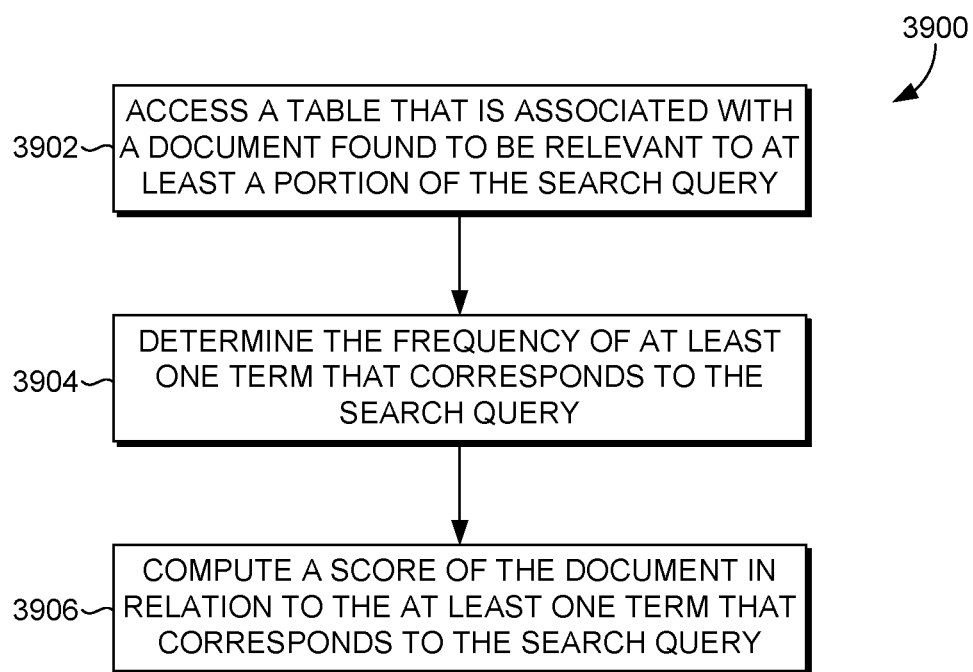
FIG. 39 is a flow diagram illustrating a method for scoring a plurality of documents based on relevancy to a search query in accordance with an aspect of the technology described herein.

FIG. 39 illustrates a flow diagram of a method 3900, for instance using the preliminary ranker 3810 of FIG. 38, to score a plurality of documents based on relevancy to a search query. Initially at block 3902, a table is accessed that is associated with a document found to be potentially relevant to at least a portion of a received search query. The table may store data used to derive a frequency of each term of a subset of terms in the document. In one configuration, each term in the subset of terms occurs more than once in the document. In one instance, less than half of all terms in a document are included in the subset of terms. The document may be one of a plurality of documents that have been found by, for instance, matcher 4404 of FIG. 44, to have a potential of being relevant to the search query based on a keyword match. At block 3904, the frequency of at least one term corresponding to the search query is determined. In one configuration, the determination of the frequency may simply refer to the frequency data from the table being accessed and retrieved. How the data is processed is dependent upon the algorithm. For instance, the algorithm, may need the data in the table to be transformed to a different representation of a frequency, such as from an IDF to just the frequency of the term in the document. Alternatively, the algorithm may use the IDF in its calculation of the score for the document. As previously described, data indicative of the frequency may be pre-computed, and may be stored in the table, and as such, at block 3904, the data in the table is used to determine a frequency by an algorithm used by the preliminary ranker. This frequency data stored in the table may provide an indication of not just the frequency of a term in the document, but a frequency of a term in the document in relation to a relative infrequency of that term in a corpus of documents.

At block 3906, a score of the document in relation to the search query is computed. This is based on, at least, the frequency of the at least one term in the document and other data associated with the document and terms of the search query. The frequency is a pre-computed component. Other pre-computed components include a location of the term in the document, such as whether the term is found in the title, body, abstract, anchor, URL, etc. At least a portion of the score may be based on one or more real-time components that are computed in real-time, such as at runtime. These may include, for example, a location of at least one term in the search query, a position of each term in relation to one another, a comparison of a language of the document to the language of the search query, and a comparison of a geographical local associated with the document to the geographic local associated with the search query. In one aspect of the technology described herein, the final score may be computed using many individual component scores of both the pre-computed components and the real-time components that are computed after the search query is received.

Figure 40:
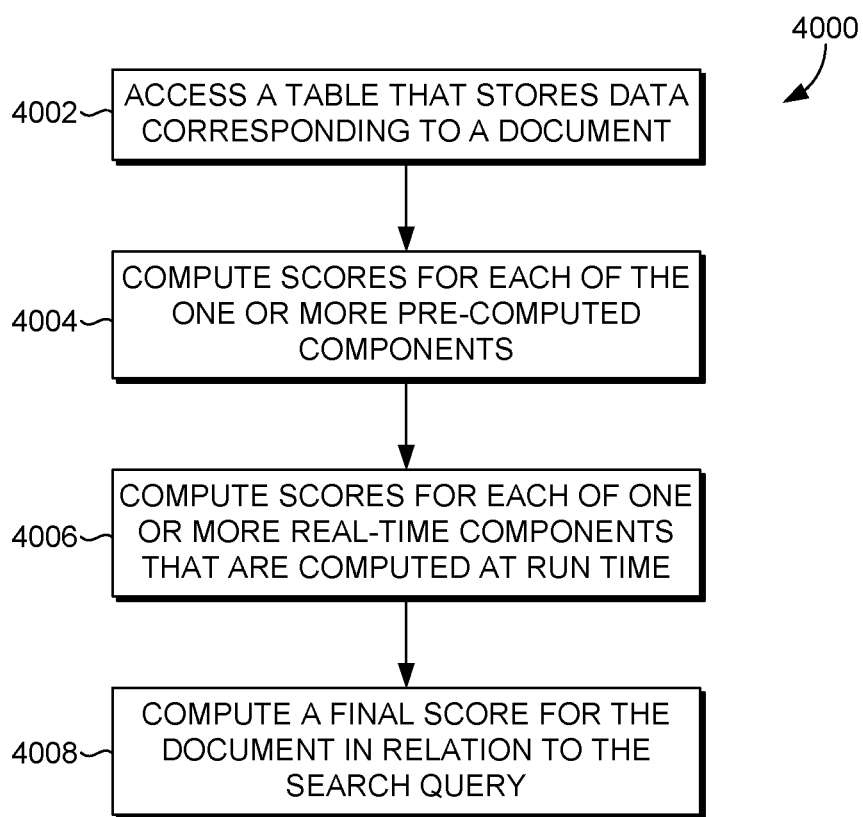
FIG. 40 is a flow diagram illustrating a method for scoring a plurality of documents based on relevance to a search query in accordance with another aspect of the technology described herein.

Referring now to FIG. 40, a flow diagram is provided illustrating another method 4000, for instance using the preliminary ranker 3810 of FIG. 38, to score a plurality of documents based on relevance to a search query. At block 4002, a table is accessed that stores data corresponding to a document. The data is pre-computed to be indicative of the frequency of a term in the document, although the data stored may not be the actual frequency, but instead may be, for example, an IDF. This frequency data contributes to a score of the document in relation to the search query. For exemplary purposes only, pre-computed components may comprise a frequency of terms in a document, a portion of the document in which the terms are located, such as the title, body, anchor, URL, abstract, etc., and how often the terms occur in those portions of the document. At block 4004, scores for each of the pre-computed components are computed, and at block 4006, scores for each of the real-time components are computed in real-time, or at runtime. At block 4008, a final score is computed for the document in relation to the search query based on the scores for the pre-computed and real-time components. As mentioned, the final score may also consider click data in a click table. This click data indicates how often the document is selected by other users for the terms associated with the search query.

In addition to storing data in the score table for only a portion of terms that are found in the document, such as those terms that appear two or more times in the document, the preliminary ranker is further adapted to use less memory than typical rankers by allowing for collisions to occur when score tables are built and accessed. A collision may occur, for example, when data for one term found in a document is written over data for another term. As such, the score table used in accordance with aspects of the technology described herein operates much differently than other score tables in a number of ways. Initially, score tables typically have slots, each of which has a key associated therewith. In one configuration, each term from the document has its own key that is used when data for other terms is being added to the table. Typically, when a slot already has data stored therein, that slot is not used to store data for another term, but instead another slot, such as an empty slot, is utilized. However, the score tables used in configurations herein allow for these collisions to occur. Collisions may occur when the score tables are being built, such as by the score table building component 3812, as well as when lookups occur, such as when the score table lookup component 3814 accesses the score tables to determine frequency and other pre-computed information for a particular term in a document.

While typically a key may be stored as 64 bits, aspects of the technology described herein provide for a much smaller amount of bits to be stored. For example, in one configuration, just five bits of a 64-bit key may be stored for a slot of a score table. When five bits of a larger key is stored and is compared to another five bit key, such as by the key comparison component 3818, there is a higher chance that the keys will match than when a larger amount of bits is stored and compared to other keys. While five bits is used in the example above, it should be noted that any number of bits may be used that is smaller than the total number of bits. For instance, even using 60 bits of a 65 bit key would allow for collisions to occur, as there would be a chance two different keys would have the same 60 bit portion, and as such, in this case, a collision would occur.

While collisions are allowed to occur, as described above, precautions are taken to ensure that documents that are not relevant to the search query, such as documents that the final ranker would discard, are excluded from the set of documents sent from the preliminary ranker to the final ranker. For example, when a score table is being built for a particular document, and when it has been determined that data for a second term found in a document is to be added to a slot that already has been associated with a first term that is different from the second term (e.g., the slot already stores data associated with a different term), it may be determined if the frequency of the second term in the document is greater than the frequency of the first term in the document. If the frequency of the second term is greater, that larger frequency will be stored in the slot, but both terms will remain associated with that same slot. Here, the frequency of the first term is being rewritten with the frequency of the second term.

If, however, the frequency of the second term being added to the slot is less than the frequency of the first term already associated with the slot, the higher frequency of the first term will remain stored in that slot, although the second term may be added to that slot. Here, while the second term will be associated with that slot, its frequency will not be stored in the score table because it is lower than the frequency already stored. If the lower frequency were to be stored over the higher frequency, the document associated with that score table could be erroneously excluded for a particular search query, even though it may be a relevant document for the search query. By only storing the higher frequency for both terms, the frequency returned or computed for one of the terms may be higher than it should be (e.g., if the returned frequency is for a different term), but the document will not be excluded when it should have been returned in the set of relevant documents sent to the subsequent ranker for further processing. Instead, the document may be ranked higher than it should be, and as such, may be returned in the set of relevant documents even if it is not as relevant as the other documents. As such, all documents found to be relevant, such as those having a score above a particular threshold, will be returned, but some that may not be as relevant may also be included.

Figure 41:
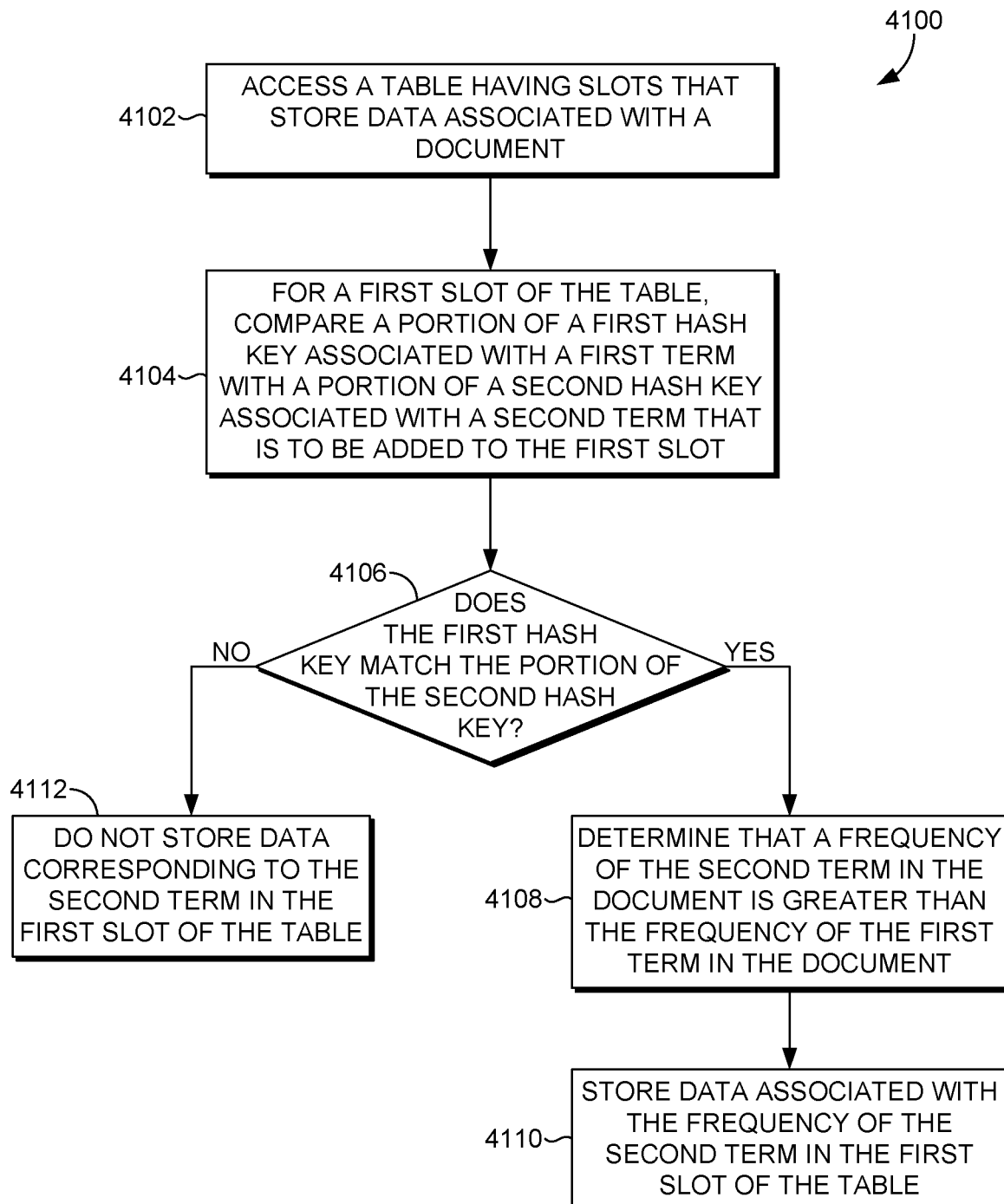
FIG. 41 is a flow diagram illustrating a method for adding data for a term to slots of a score table in accordance with an aspect of the technology described herein.

Turning to FIG. 41, a flow diagram is provided illustrating a method 4100, for instance using the preliminary ranker 3810 of FIG. 38, for adding data for a term to slots of a score table. Initially at block 4102, a table having slots is accessed, where the table stores data associated with a document. At block 4104, for a first slot of the table, a portion of a first hash key associated with a first term is compared to a portion of a second hash key associated with a second term that is to be added to the first slot. As mentioned herein, aspects of the technology described herein allow for more than one term to be associated with the same slot, while only data indicative of the frequency of one of the terms is stored therein. At block 4106, it is determined whether the portion of the first hash key matches the portion of the second hash key. If the portions of the hash keys do not match, data (e.g., data indicative of frequency) corresponding to the second term is not stored in the first slot of the score table, shown at block 4112. If, however, the portions of the hash keys do match, it is determined, at block 4108, that a frequency of the second term in the document is greater than the frequency of the first term in the document. At block 4110, data associated with the frequency of the second term is stored in association with the first slot of the table. In one configuration, this frequency data rewrites the existing data, which corresponds to the frequency data of the first term also associated with the first slot.

In accordance with aspects of the technology described herein, if the portion of the first hash key does not match the portion of the second hash key, a second slot is considered, and thus the portion of the second hash key is compared to a portion of a third hash key associated with a third term whose corresponding data is stored in a second slot of the table. If these hash key portions match, it is determined whether a frequency of the third term in the document is greater than the frequency of the second term. If the frequency of the second term is greater, the frequency data associated with the second term is stored in the second slot of the table, rewriting the frequency data associated with the third term. If, however, the portion of the second hash key does not match the portion of the third hash key, data corresponding to the second term is not stored in the second slot of the table. This process may continue until a slot is located where the portions of the hash keys match.

Even though only data associated with a subset of terms found in a document is stored in the score table, and even though collisions are allowed to occur, results of the preliminary ranker are unexpectedly better than traditional ranking systems, thus providing a set of documents that are more relevant. For instance, when the preliminary ranker is used in conjunction with a search system, such as the search system described herein with respect to FIG. 44, the documents that are found to be relevant by the preliminary ranker are unexpectedly more relevant than documents found to be relevant by other ranking systems, and are found much faster. In some configurations, the preliminary ranker functions at two times, or at five times, or at seven times, or even at ten times faster than other ranking systems, enabling the entire search system described herein to operate at a much faster rate than traditional search systems.

In aspects of the technology described herein, the preliminary ranker may be taught by a machine learning algorithm to identify the most relevant documents for a particular search query. Generally, the preliminary ranker is provided with input, which may include search queries, documents, and which documents were found by a human to be most relevant to each search query. From this input, the preliminary ranker is trained to come up with the same relevant documents as a human would. In one configuration, the machine learning algorithm uses singular value decomposition, but others may be used as well.

Match Fix-Up

In a search system, such as the search system 4400 of FIG. 44, a matcher such as the matcher 4404, may be employed as an early step in a search pipeline to identify matching documents based on terms from a search query. As previously explained, the set of documents identified by a matcher is, often times, too large to return as search results or to send to an expensive ranker (i.e., expensive from the standpoint of the amount of processing required to rank each document), such as the final ranker 4426 of FIG. 44, since it would take too long for the ranker to process the large number of documents. Additionally, if the matcher employs a probabilistic approach, such as employing a bit vector-based search index as described hereinabove, the set of matching documents may, in fact, include one or more invalid matching documents, which are not true matches for the search query. In other words, the invalid matching documents may be false positives since those documents do not contain one or more terms from the search query. Sending invalid matching documents to an expensive ranker, such as the final ranker 4426 of FIG. 44, would waste resources because of the expense to process each document required by such a ranker.

To remove invalid matching documents and thereby reduce the number of matching documents sent to a downstream ranker, some aspects of the technology described herein employ what is referred to herein as a match fix-up stage. Generally, a match fix-up component, such as the match fix-up component 4424, may receive at least a portion of a set of matching documents from a matcher, such as the matcher 4404 of FIG. 44, that includes invalid matching documents, and evaluates each document based on stored information identifying terms contained in each document to remove at least some of the invalid matching documents. The stored information may be, for instance, a forward index.

A match fix-up component may be employed in a variety of different locations between a matcher and a final ranker in accordance with aspects of the technology described herein. As an example, FIG. 44 illustrates a pipeline in which a matcher 4404 provides a set of matching documents 4420 that are evaluated using a preliminary ranker 4422 to remove some irrelevant documents, evaluated using the match fix-up component 4424 to remove at least a portion of the invalid matching documents, and then evaluated using a final ranker 4426 to provide a set of search results. However, a search system may employ match fix-up at other locations using any number of rankers. For instance, matching documents from the matcher 4404 could be provided directly to the match fix-up component 4424 without any preliminary ranker first removing documents. Additionally, documents from the match fix-up component 4424 may be provided to one or more preliminary rankers before the final ranker 4426. Any and all such variations are contemplated to be within the scope of the technology described herein.

Resources used in search (e.g., cost, processing time, storage, etc.) may be balanced with the need to provide accurate and relevant search results in an efficient way. The use of a match fix-up component may further optimize search results processes without adding the need for additional resources and may, ultimately, reduce resources currently used. Put simply, the match fix-up component is intended to be a component that further refines potential search results. The match fix-up component may provide better performance with respect to filtering the potential search results; but the match fix-up component may require additional storage and may be slightly slower than the preliminary ranker. However, any additional resources that may be used by the match fix-up component (e.g., more expensive) may be offset or less than resources that are spared by a subsequent expensive ranker, such as the final ranker 4426 of FIG. 44. For example, by taking a little more time to refine the set of documents at the match fix-up component, less time will be needed by a subsequent ranker. Further, a subsequent ranker may use less memory if the documents received and refined by the subsequent ranker are narrower than what would be received without match fix-up.

In application, a match fix-up component, such as the match fix-up component 4426 of FIG. 44 may receive a set of documents downstream from a matcher, such as the matcher 4404 (without or without any filter using a preliminary ranker, such as the preliminary ranker 4420, between the matcher and match fix-up component). As mentioned, the set of documents may include invalid matching documents. The inclusion of invalid matching documents at this point is appropriate in the system since an objective is to move quickly when appropriate, even if the results are slightly off, and spend more time when appropriate to correct the results and, thus, optimize the system and results. By adding a match fix-up component, the set of documents sent on to a subsequent ranker may be reduced and a preliminary ranker may be able to perform its task a little faster, but a little less perfect, since the match fix-up component may further refine the potential search results. If potential search results were going directly from a preliminary ranker to a final ranker without the use of match fix-up, additional resources would need to be expended to ensure that the potential search results sent to the final ranker were very accurate (e.g., within 10% accuracy). Adding the match fix-up component allows a preliminary ranker to not be as accurate and perform faster.

As noted, the match fix-up component is particular useful when a previous stage (e.g., the matcher) is based on information theory-based compression. The match fix-up component may not be as valuable in a system that does not have an information theory-based compression engine such as, for example, a posting list since a matcher using a posting list may be deterministic so there are not invalid matching documents; meaning that the resources were expended to get a perfect result so there is no opportunity for match fix-up.

The match fix-up component may perform either lossless or lossy fix-up. Lossless fix-up, as used herein, refers generally to situations when original data can be perfectly reconstructed from compressed data. Lossy fix-up, on the other hand, refers herein to situations where inexact approximations are used to represent content. The match fix-up component may, thus, fix-up perfectly or less perfectly. Either choice may be compensated for in another area. For instance, if the match fix-up component performs less perfectly (e.g., a higher number of invalid matching documents are sent on to a subsequent ranker than would be otherwise) then additional bit vectors may be added in the matcher stage to reduce the number of false positives (invalid matching documents) that are sent on to the match fix-up component in the first place. Alternatively, a perfect fix-up would allow the system to use fewer bit vectors in the matcher stage while also being aware to not send too many documents to the match fix-up component that would result in too much cost at that stage. Thus, in that situation, a maximum cost may be associated with a threshold number of documents such that the matcher stage may have as few bit vectors as would allow that a maximum number of documents, up to the threshold number of documents, is sent on to the match fix-up component. This would allow the cost at the match fix-up component to be below what is designated and also allow the least amount of time and cost at the matcher stage since the maximum number of documents that can be sent are being sent.

Once the set of documents is received, the match fix-up component may access a representation of each document within the set of documents. The representation may be a data structure. The representation may include a forward index for a document. The forward index stores a list of one or more terms that are present/associated with each document. The match fix-up component may then compare the forward index with the search query to determine whether the document is a valid matching document or an invalid matching document. Valid matching documents are true matches to a search query while invalid matching documents are not true matches. Thus, the match fix-up component may review the forward index to determine if the forward index for a document indicates the document matches the search query (e.g., whether the forward index for the document contains a first term or a second term, etc.). Upon determining that one or more terms associated with the search query are not present in a document, the match fix-up component may identify the document as an invalid matching document. Invalid matching documents may be discarded by the match fix-up component and not sent on to the subsequent ranker. Likewise, when one or more terms associated with a search query are present in a forward index, the document associated with the forward index may be identified as a valid matching document and sent on to the subsequent ranker.

Typically, it would not be reasonable to evaluate a data structure for each document to determine whether it is a valid or invalid match. However, the use of the matcher and the preliminary ranker in the present application reduce the number of possible documents to a number that is acceptable to evaluate individually. For instance, assume 100 documents are sent on the match fix-up component and 50 are good and 50 are bad. The match fix-up component may access, for instance, a storage location of the document representations (e.g., SSD) and evaluate the representation for each document. The entire document may be stored in the SSD or, as an alternative, every n number of words may be stored in the SSD (where n is any number). The amount of the document stored is configurable based on, for example, design goals, tradeoffs between the matcher and the match fix-up component, and the like.

The introduction of the match fix-up component provides opportunities for the system to be more efficient by allowing stages preceding the match fix-up (e.g., the matcher and preliminary ranker) to perform worse than they were without match fix-up. Additionally opportunities to optimize the system exist such as evaluating a cost of error rates versus a cost of memory. For example, if for a particular system it is identified that the cost of 10% error rate is 1 gb and the cost of 20% error rate is 2 gb then the system can be optimized to perform at an error rate that is still efficient but utilizes an optimal memory so that the total amount of memory/resources uses is below the uncompressed value.

Figure 42:
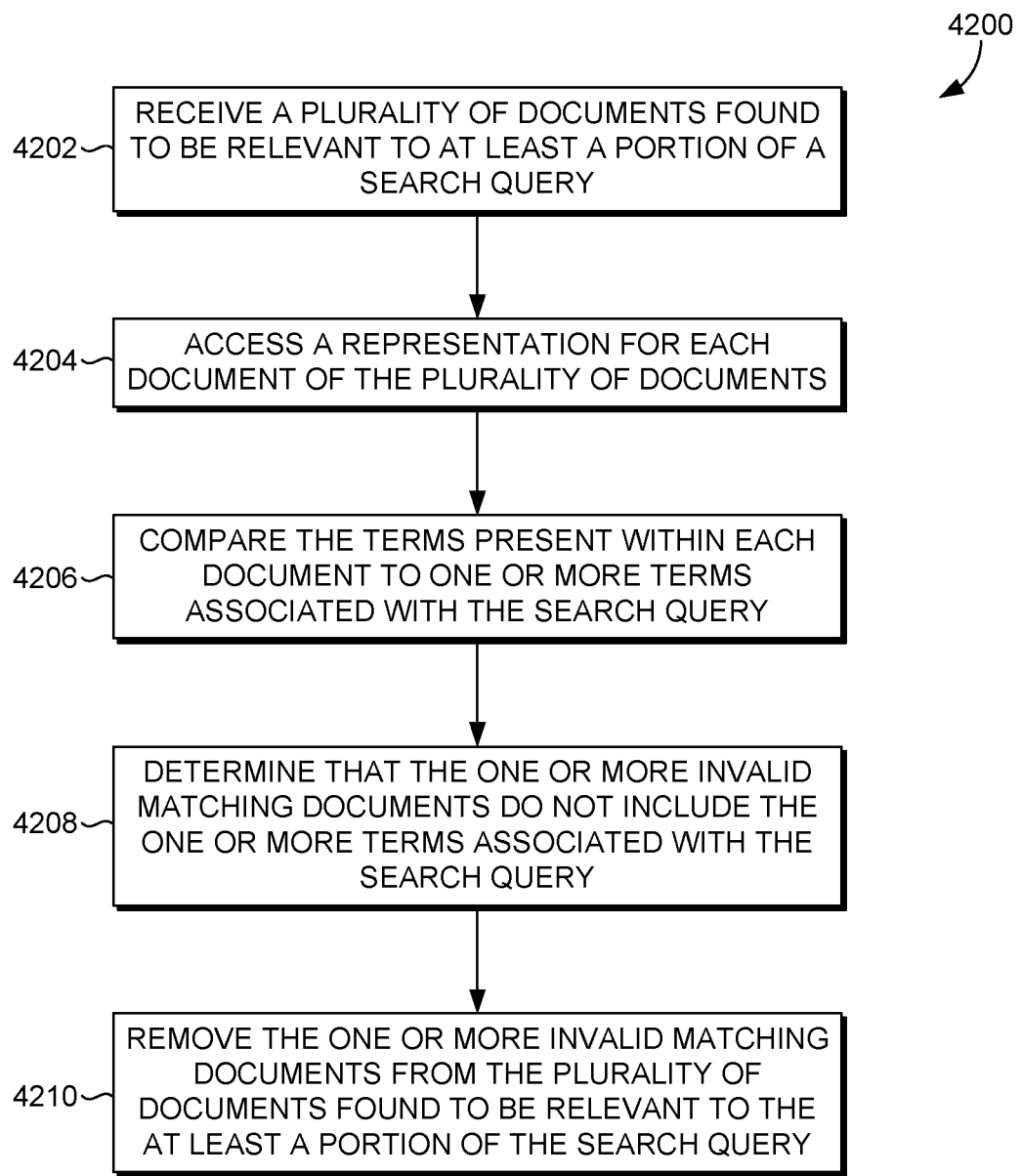
FIG. 42 is a flow diagram illustrating a method for employing match fix-up to remove invalid matching documents downstream from a probabilistic matcher in accordance with an aspect of the technology described herein.

Turning now to FIG. 42, a flow diagram is provided illustrating a method 4200 for employing match fix-up to remove invalid matching documents downstream from a probabilistic matcher. The method 4200 may be performed at least partially using, for instance, the match fix-up component 4424 of FIG. 44. Initially, at block 4202, a plurality of documents found to be relevant to at least a portion of a search query is received. The plurality of documents may include one or more invalid matching documents. At block 4204, a representation for each document is accessed. The representation for a document includes terms present within the document. At block 4206, the terms present within each document are compared to one or more terms associated with the search query. At block 4208, it is determined that the one or more invalid matching documents do not contain the one or more terms associated with the query. At block 4210, upon determining that the one or more invalid matching documents do not contain the one or more terms associated with the query, the one or more invalid matching documents are removed from the plurality of documents found to be relevant to the at least a portion of the search query.

Figure 43:
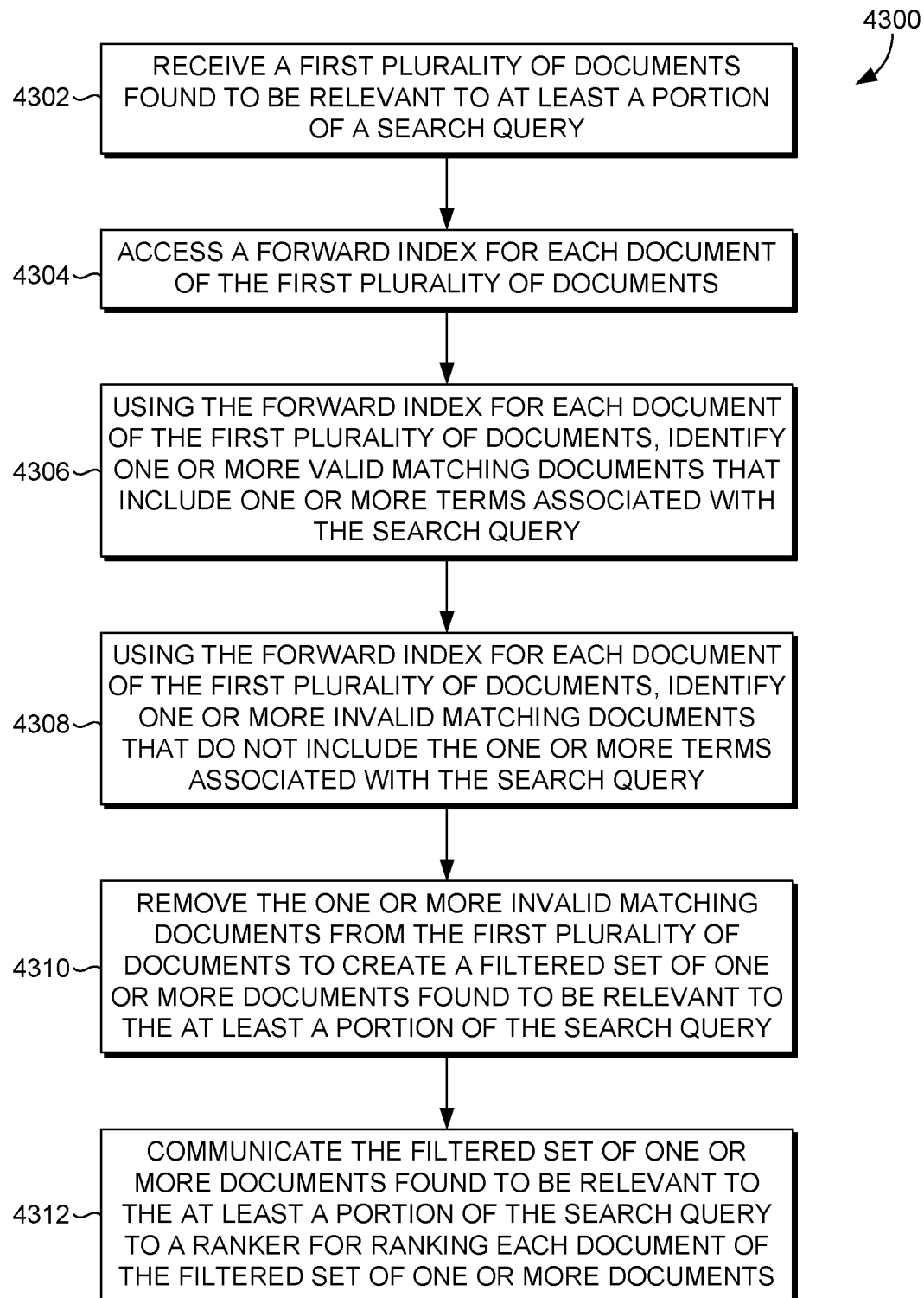
FIG. 43 is a flow diagram illustrating another method for employing match fix-up to remove invalid matching documents downstream from a probabilistic matcher in accordance with an aspect of the technology described herein.

Turning now to FIG. 43, a flow diagram is provided illustrating another method 4300 for employing match fix-up to remove invalid matching documents downstream from a probabilistic matcher. The method 4300 may be performed at least partially using, for instance, the match fix-up component 4424 of FIG. 44. Initially, at block 4302, a first plurality of documents found to be relevant to at least a portion of a search query is received. The first plurality of documents may include one or more invalid matching documents. At block 4304, a forward index for each document of the first plurality of documents is accessed. The forward index may store a list of one or more terms contained in each document. At block 4306, using the forward index for each document of the first plurality of documents, one or more valid matching documents that contain one or more terms associated with the search query is identified while at block 4308, using the forward index for each document of the first plurality of documents, one or more invalid matching documents that do not contain the one or more terms associated with the search query is identified. At block 4310, the one or more invalid matching documents is removed from the first plurality of documents to create a filtered set of one or more documents found to be relevant to the at least a portion of the search query. At block 4312, the filtered set of one or more documents found to be relevant to the at least a portion of the search query is communicated for ranking each document of the filtered set of one or more documents for the search query.

Bit Vector Search System Configurations

The use of a bit vector based search index, preliminary ranker, and match fix-up as discussed hereinabove allows for various configurations depending on design goals. The data used by each stage is needed for a decreasing the number of documents for subsequent consideration, so the bit vector data used by the matcher is optimized for inexpensive reduction of the set of all possible documents. However, these bit vectors are populated based on information value, so compression of the size of the bit vector memory simply increases the false positive rate. False positive rate is halved by increasing the buffer by a fixed size (log-linear). False positive results are finally removed at the match fix-up stage, and there is a fixed cost for each false positive removed. Preliminary ranking is a fixed cost per item scored (e.g., approximately 150 ns per document per thread if the score data used by the preliminary ranker is resident in memory)

Below are examples of five different configurations based on different design goals to illustrate the elasticity of a bit vector-based search system. As discussed previously, "D" refers to storage consumption (e.g., the number of documents that may be indexed per machine) and "Q" refers to processing speed (e.g., queries per second—QPS). Table 1 provides a summary of the configurations.

TABLE 1

Configurations

| Configuration | Bit Vectors | Score Data for Preliminary Ranker | Match Data for Match Fix-Up | Particulars |
|---|---|---|---|---|
| High DQ | Low compression DDR memory | DDR memory | None. Low False positive rate is fixed by L2 | 10M @ 18K QPS Freshness tier |
| High DQ (with SSD) | DDR. SSD for phrases Highly compressed | DDR | SSD | 50M @ 4K QPS All tiers |
| High Q | Low compression DDR memory | DDR memory | DDR Memory | 10M @ 18K QPS Low latency search svc for graphs, queues or objects |
| High D | High compression SSD memory | SSD memory | SSD memory | 500M @ 50 QPS Partitioned for personal or shared docs |
| Deep D | High compression HDD memory | HDD memory | HDD memory | 2B++ @ 1 QPS Deep archive |
| Deep DQ | Extreme compression SSD memory ids region of HDD to scan | HDD memory | HDD memory 1 seek per match | 1B++ @ 100 results per second (tail web queries) |

1. High DQ—Efficient Web Search

A High DQ configuration maximizes total efficiency. This configuration is limited by the DDR bus throughput rate. This approach was ran at 180K DQ, with 10 million documents per machine at 18K QPS on a V13 machine. The version with SSD is still limited by the DDR bus, but uses SSD to remove pressure for the DDR capacity, thus allowing for 5 times the document count at one fifth the speed. There are numerous performance improvements in the pipeline that involve tighter control of the query planning and more aggressive early termination. These changes could each increase performance by another 25%. Early termination is used to limit the cost of a query, in a way that minimizes damage to the relevance of the result set.

2. Deep DQ—Tail Web Search

Deep DQ can operate on the same box as High DQ without significant impact to the head search capability, although this argument will be stronger when faster SSDs are available. Deep DQ primarily is using HDD, although it does use very narrow bit vectors in SSD to find areas of HDD to scan. It uses tuples and phrases to avoid low IDF terms (equivalent of long posting lists). A HDD seek occurs for each result. With a 1 T web index, 1000 machines can hold the internet. This approach is intended for queries that are unlikely to find many results, or many deep DQ bit vectors are needed.

3. High Q—SubSQL

The high Q configuration is similar to the high DQ configuration, except that it does not use SSD. Without SSD the engine is configured to have consistently low latency. Even difficult graph queries like "List all of the friends of Madonna" would complete in under 10 ms, and most will complete in 500 usec.

This configuration may be designed to work within Object Store Natively, such that the combined entity has many of the capabilities of NoSQL (especially Document stores like MongoDB, the most popular NoSQL software).

SubSQL moves further away from typical SQL by providing low level high performance primitives, as opposed to generalized interfaces to data. For example, a Join operation is not performed by SubSQ; however, complex join-like capability can be built into an index to provide low latency and high performance cloud operations. Finer grained ranking and sorting operations are primarily used in SubSQL as a way to inexpensively discover items within a large result set.

4. High D—Digital Life and Digital Work.

The world of personal documents and personal emails is going to intersect with graphs which are going to both allow sharing of more content along a graph, but also help each of us find what we need without asking for it. This configuration may integrate graphs (served by SubSQL) with documents served by a High D search engine. Each machine holds a ton of documents, but does not serve them very quickly. This works very well for unshared personal documents, because a single machine can hold all of a single person's documents, and a query only needs to access that single machine. Each person executes few queries per day, and 100,000 people can be shared tenants on a single machine.

The big breakthrough happens when people share documents with each other. When a person queries for a document, the search usually will need to look through the documents of anybody who may have shared documents with me. People are partitioned with affinity to their graphs, and people who are sharing documents very broadly are replicated on many partitions.

General Operating Environment

Figure 45:
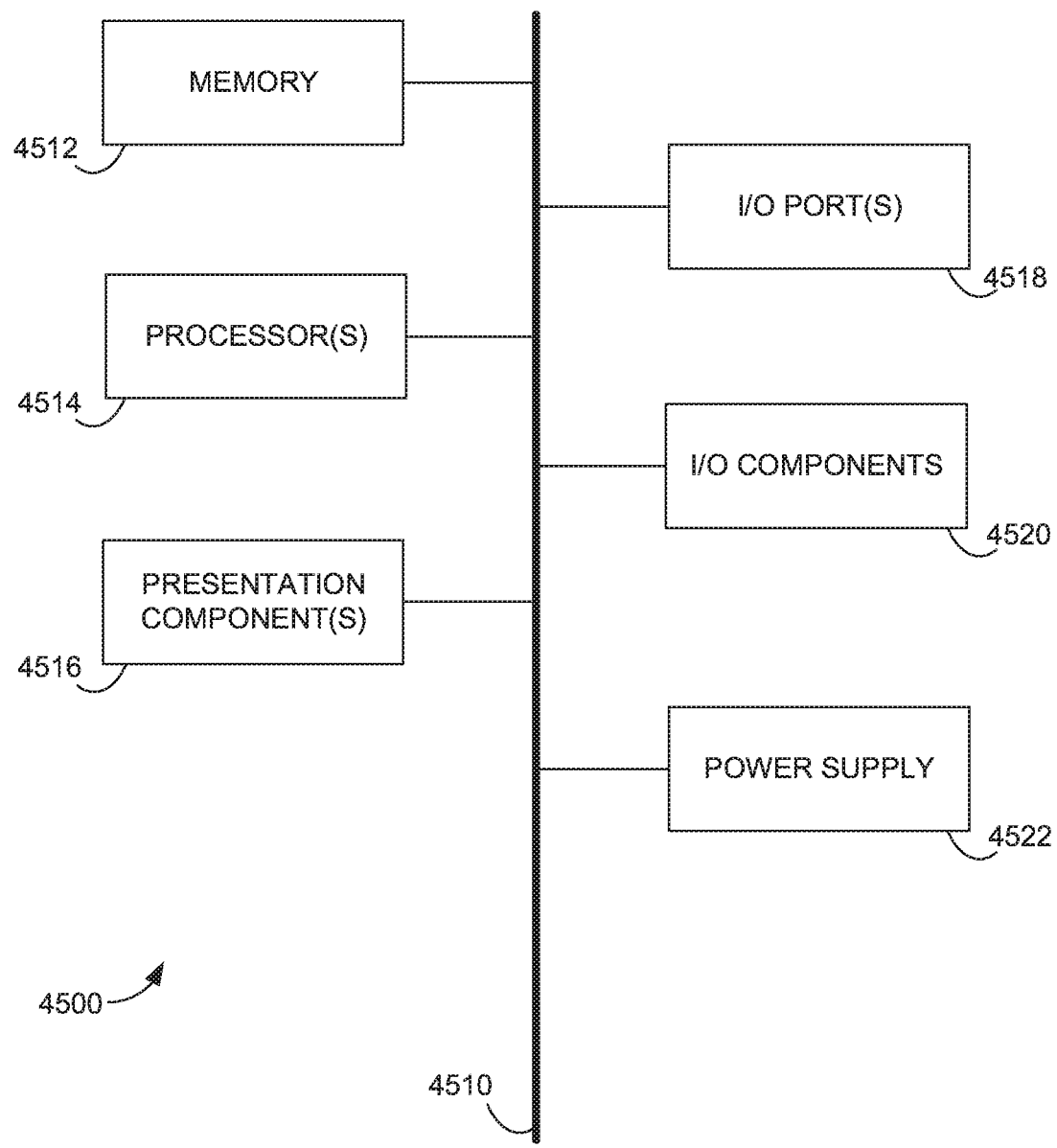
FIG. 45 is a block diagram of an exemplary computing environment suitable for use in implementing aspects of the technology described herein.

Having briefly described an overview of aspects of the technology described herein, an exemplary operating environment in which aspects of the technology described herein may be implemented is described below in order to provide a general context for various aspects of the technology described herein. Referring initially to FIG. 45 in particular, an exemplary operating environment for implementing aspects of the technology described herein is shown and designated generally as computing device 4300. Computing device 4300 is but one example of a suitable computing environment and is not intended to suggest any limitation as to the scope of use or functionality of aspects of the technology described herein. Neither should the computing device 100 be interpreted as having any dependency or requirement relating to any one or combination of components illustrated.

Aspects of the technology provided herein may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Aspects of the technology described herein may be practiced in a variety of system configurations, including hand-held devices, consumer electronics, general-purpose computers, more specialty computing devices, etc. Aspects of the technology described herein may also be practiced in distributed computing environments where tasks are performed by remote-processing devices that are linked through a communications network.

With reference to FIG. 45, computing device 4500 includes a bus 4510 that directly or indirectly couples the following devices: memory 4512, one or more processors 4514, one or more presentation components 4516, input/output (I/O) ports 4518, input/output components 4520, and an illustrative power supply 4522. Bus 4510 represents what may be one or more busses (such as an address bus, data bus, or combination thereof). Although the various blocks of FIG. 45 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 45 is merely illustrative of an exemplary computing device that can be used in connection with one or more aspects of the technology described herein. Distinction is not made between such categories as "workstation," "server," "laptop," "hand-held device," etc., as all are contemplated within the scope of FIG. 45 and reference to "computing device."

Computing device 4500 typically includes a variety of computer-readable media. Computer-readable media can be any available media that can be accessed by computing device 4500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 4500. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 4512 includes computer-storage media in the form of volatile and/or nonvolatile memory. The memory may be removable, non-removable, or a combination thereof. Exemplary hardware devices include solid-state memory, hard drives, optical-disc drives, etc. Computing device 4500 includes one or more processors that read data from various entities such as memory 4512 or I/O components 4520. Presentation component(s) 4516 present data indications to a user or other device. Exemplary presentation components include a display device, speaker, printing component, vibrating component, etc.

I/O ports 4518 allow computing device 4500 to be logically coupled to other devices including I/O components 4520, some of which may be built in. Illustrative components include a microphone, joystick, game pad, satellite dish, scanner, printer, wireless device, etc. The I/O components 4520 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 4500. The computing device 4500 may be equipped with depth cameras, such as, stereoscopic camera systems, infrared camera systems, RGB camera systems, and combinations of these for gesture detection and recognition. Additionally, the computing device 4500 may be equipped with accelerometers or gyroscopes that enable detection of motion. The output of the accelerometers or gyroscopes may be provided to the display of the computing device 4500 to render immersive augmented reality or virtual reality.

The technology has been described in relation to particular aspects, which are intended in all respects to be illustrative rather than restrictive. Alternative configurations will become apparent to those of ordinary skill in the art to which the technology described herein pertains without departing from its scope.

From the foregoing, it will be seen that the technology described herein is well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The invention claimed is:

1. A method of indexing information about documents in a bit vector search index, the method comprising:
   indexing information about a plurality of documents using bit vectors on a first accumulation buffer storage device, each bit vector on the first accumulation buffer storage device comprising an array of bits in which each bit represents whether one or more documents from the plurality of documents includes one or more terms; and
   when a threshold is satisfied, indexing the information about the plurality of documents using bit vectors on a subsequent storage device based on the information indexed in the first accumulation buffer storage device, each bit vector on the subsequent storage device comprising an array of bits in which each bit represents whether one or more documents from a set of documents larger than the plurality of documents includes one or more terms.

2. The method of claim 1, wherein the threshold comprises a threshold number of documents and the threshold is satisfied when the plurality of documents satisfies the threshold number of documents.

3. The method of claim 1, wherein the threshold comprises a time threshold and the threshold is satisfied when a period of time has passed that satisfies the time threshold.

4. The method of claim 1, wherein the threshold comprises a storage consumption threshold and the threshold is satisfied when the storage consumption for the information about the plurality of documents on the first accumulation buffer storage device satisfies the storage consumption threshold.

5. The method of claim 1, wherein the information about the plurality of documents is indexed on the first accumulation buffer storage device one document at a time.

6. The method of claim 1, wherein the information about the plurality of documents is indexed on the first accumulation buffer storage device by collectively indexing at least a portion of the information from a second accumulation buffer storage device.

7. The method of claim 1, wherein the information about the plurality of documents are stored in consecutive bits on the first accumulation buffer storage device and wherein indexing the plurality of documents using bit vectors on the subsequent storage device comprises storing the information about the plurality of documents in non-consecutive bits on the subsequent storage device.

8. The method of claim 1, wherein the method further comprises:
   indexing information about a second plurality of documents using bit vectors on the first accumulation buffer storage device; and
   when the threshold is satisfied again, indexing the information about the second plurality of documents using bit vectors on the subsequent storage device based on the information about the second plurality of documents indexed in the first accumulation buffer storage device.

9. The method of claim 1, wherein the method is repeated until a second threshold is satisfied.

10. One or more computer storage media storing computer-useable instructions that, when used by one or more computing devices, cause the one or more computing devices to perform operations comprising:
    adding term information about a plurality of documents to bit vectors on a first accumulation buffer storage device until a threshold is satisfied, each bit vector on the first accumulation buffer storage device corresponding with one or more terms from a set of terms and each bit in each bit vector on the first accumulation buffer storage device identifying whether one or more documents corresponding with the bit contains at least one of the one or more terms corresponding with the bit vector on the first accumulation buffer storage device; and
    when the threshold is satisfied, adding the term information about the documents to bit vectors on a subsequent storage device, each bit vector on the subsequent storage device corresponding with one or more terms from the set of terms and each bit in each bit vector on the subsequent storage device identifying whether one or more documents corresponding with the bit contains at least one of the one or more terms corresponding with the bit vector on the subsequent storage device.

11. The one or more computer storage media of claim 10, wherein the threshold comprises a threshold number of documents and the threshold is satisfied when the plurality of documents satisfies the threshold number of documents.

12. The one or more computer storage media of claim 10, wherein the threshold comprises a time threshold and the threshold is satisfied when a period of time has passed that satisfies the time threshold.

13. The one or more computer storage media of claim 10, wherein the threshold comprises a storage consumption threshold and the threshold is satisfied when the storage consumption for the term information about the plurality of documents on the first accumulation buffer storage device satisfies the storage consumption threshold.

14. The one or more computer storage media of claim 10, wherein the term information about the plurality of documents is added to the first accumulation buffer storage device one document at a time.

15. The one or more computer storage media of claim 10, wherein the term information about the plurality of documents is added to the first accumulation buffer storage device by collectively indexing at least a portion of the information from a second accumulation buffer storage device.

16. The one or more computer storage media of claim 10, wherein the term information about the plurality of documents are stored in consecutive bits on the first accumulation buffer storage device and wherein adding the term information about the documents to bit vectors on the subsequent storage device comprises storing the information about the plurality of documents in non-consecutive bits on the subsequent storage device.

17. The one or more computer storage media of claim 10, wherein the operations further comprise:
adding term information about a second plurality of documents using bit vectors on the first accumulation buffer storage device; and
when the threshold is satisfied again, adding the term information about the second plurality of documents using bit vectors on the subsequent storage device based on the term information about the second plurality of documents indexed in the first accumulation buffer storage device.

18. The one or more computer storage media of claim 10, wherein the operations are repeated until a second threshold is satisfied.

19. One or more computer storage media storing computer-useable instructions that, when used by one or more computing devices, cause the one or more computing devices to perform operations comprising:
identifying a plurality of terms contained within a document;
identifying a bit corresponding to the document in each of a plurality of bit vectors stored on a storage device, a first bit vector from the plurality of bit vectors comprising an array of bits with each bit of the first bit vector corresponding to all terms from a plurality of terms assigned to the first bit vector and each bit representing whether at least one of one or more documents contains any term from the plurality of terms assigned to the first bit vector; and
setting bits identified for the document in bit vectors corresponding with terms contained within the document.

20. The one or more computer storage media of claim 19, wherein identifying the plurality of terms contained within a document includes identifying a location of each term in the document.

* * * * *